United States Patent
Tomura et al.

[11] Patent Number: 5,677,025
[45] Date of Patent: Oct. 14, 1997

[54] OPTICAL INFORMATION RECORDING MEDIUM NEAR INFRARED ABSORBING MATERIAL THEREFOR

[75] Inventors: Tatsuya Tomura; Tsutomu Sato; Noboru Sasa, all of Yokohama, Japan

[73] Assignee: Ricoh Company, Ltd., Tokyo, Japan

[21] Appl. No.: 433,454

[22] PCT Filed: Sep. 9, 1994

[86] PCT No.: PCT/JP94/01500

§ 371 Date: Jun. 12, 1995

§ 102(e) Date: Jun. 12, 1995

[87] PCT Pub. No.: WO95/07189

PCT Pub. Date: Mar. 16, 1995

[30] Foreign Application Priority Data

| Sep. 9, 1993 | [JP] | Japan | 5-248796 |
| Apr. 22, 1994 | [JP] | Japan | 6-107752 |
| May 11, 1994 | [JP] | Japan | 6-121778 |
| May 18, 1994 | [JP] | Japan | 6-128403 |
| Aug. 16, 1994 | [JP] | Japan | 6-214249 |

[51] Int. Cl.$^6$ .................................................. B32B 3/00
[52] U.S. Cl. ...................... 428/64.1; 428/64.2; 428/64.4; 428/64.7; 428/64.8; 428/913; 430/270; 430/271; 430/495; 430/945; 369/283; 369/288
[58] Field of Search .................. 428/64.1, 64.2, 428/64.4, 64.7, 64.8, 457, 412, 913; 430/270, 271, 495, 945; 369/283, 288

[56] References Cited

U.S. PATENT DOCUMENTS

| 5,132,153 | 7/1992 | Hirose et al. | 428/64 |
| 5,232,757 | 8/1993 | Kalyanaraman et al. | 428/64 |
| 5,248,538 | 9/1993 | Kovacs et al. | 428/64 |
| 5,424,171 | 6/1995 | Yanagisawa et al. | 430/271 |

Primary Examiner—Patrick J. Ryan
Assistant Examiner—Elizabeth Evans
Attorney, Agent, or Firm—Cooper & Dunham

[57] ABSTRACT

Disclosed are a phthalocyanine near infrared absorbing material having a phthalocyanine skeleton whose benzene rings contain a silyl group as a bulky substituent and an optical information recording medium containing the material.

The phthalocyanine near infrared absorbing material has excellent association-preventing property and light resistance and exhibits a high index of refraction at a wave length of 770–830 nm and high stability, an optical information recording medium (CD-R recording medium) containing the phthalocyanine has high reflectance, excellent storage stability and excellent reproduction stability. The recording medium also shows strong light absorptivity and light reflectivity in a wave length of 630–700 nm and, thus, is applicable for the pick up with a semiconductor laser of 630–700 nm, permitting such high density recording as to provide 1.6–1.7 times as high recording density as that attained by currently employed recording media which are adapted to 780–810 nm.

9 Claims, 9 Drawing Sheets

OPTICAL INFORMATION RECORDING MEDIUM NEAR INFRARED ABSORBING MATERIAL THEREFOR

TECHNICAL FIELD

The present invention relates to an optical information recording medium (which will be hereinafter sometimes referred to as recording medium) utilized for a computer memory, an image and voice filing memory, an optical card, etc., and to a near infrared absorbing material used therefor.

BACKGROUND ART

There is a known recording medium which has an organic dye film as a recording layer and in which a phthalocyanine compound is used for the organic dye film (JP-A-58-183296, JP-A-58-37851, etc.). While phthalocyanine compounds have advantages that they show extremely high stability against heat and light, they pose problems that they have poor solubility in organic solvents, they have a fault in productivity because they have never been hitherto formed into a film without resorting to a vapor deposition method, and they are apt to be associated so that high refraction index and high reflectance are not obtainable.

Recently, a semiconductor laser having an oscillation wave length which is shorter (near 680 nm) than those utilized in the conventional optical disks began to be put to practical use with a view toward making the recording density high. However, no organic dye films are known which show light absorptivity and light reflectivity in a wave length region of 700 nm or less. There is, therefore, a limit in a high density recording with respect to the material.

In a WORM compact disk-type (CD-R) recording medium having a substrate on which an organic dye film, a metal reflecting layer and a protecting layer are superimposed in this order, a high reflectance is required in order to meet with the CD standard. Thus, there has been a need for the development of an organic dye material which exhibits high reflectance in a reproduction wave length region (700–830 nm) and which is highly stable.

Recently, with a view toward accomplishing the prevention of association and the improvement in refraction index of phthalocyanine compounds, there was an attempt to introduce a bulky alkoxy group into the alpha-position of the phthalocyanine compounds and CD-R-type recording media were proposed in which the phthalocyanine compounds were further halogenated for attaining wave length matching (JP-A-3-62878, 3-215466, 4-34816, 4-226390, 4-15263-6, 5-17477, 5-86301, 5-25177, 5-25179, 5-17700, 5-1272, etc.). While such phthalocyanine compounds in fact provide an improvement in refraction index, they are still not fully satisfactory. A further improvement is desired.

It is, therefore, a first object of the present invention to provide a novel phthalocyanine near infrared absorbing material which has an improved solubility, which has high productivity and which shows high absorptivity for a near infrared ray, without adversely affecting the stability that is inherent to phthalocyanine compounds.

A second object of the present invention is to provide a recording medium whose recording material is a phthalocyanine compound which is highly soluble in organic solvents, which is high in productivity, which permits solvent coating and which retains advantages inherent to phthalocyanine compounds.

A third object of the present invention is to provide a recording medium which is applicable to optical pick up using a semiconductor laser of 630–700 nm and which permits high density recording.

A fourth object of the present invention is to provide a recording medium permitting the accomplishment of CD-R media which show high refraction index in a wave length region of 770–830 nm and which has excellent storage stability, excellent reproduction stability and high reflectance.

DISCLOSURE OF THE INVENTION

A phthalocyanine compound is a large cyclic planer compound and is tend to extremely highly associate. Thus, the phthalocyanine compound has such properties that, when the compound is formed into a film, the absorption spectrum becomes broad and the reflectance (refraction index) becomes lowered.

In this circumstance, in the present invention, a substituent having sterically bulky structure is introduced into the nucleus so as to prevent the association, to realize high absorptivity and high reflectance (refraction index) and to improve solubility in organic solvents.

Thus, in accordance with the present invention, there is provided an optical information recording medium comprising a substrate, a recording layer provided directly or through a primer layer on said substrate, and, optionally, a protecting layer provided on said recording layer, characterized in that said recording layer contains a phthalocyanine compound having the following general formula (i)

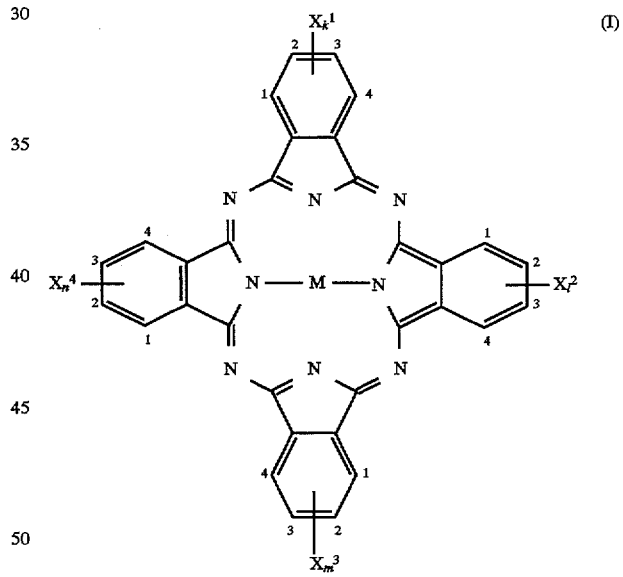

wherein M, $X^1$–$X^4$ and k–n represent as follows:

M: two hydrogen atoms, a metal atom which may contain halogen or oxygen atoms, or a metal atom which may contain —$(OR^5)p$ or —$(OSiR^6R^7R^8)_q$, $R^5$–$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $X^1$–$X^4$: independently from each other, a —$OR^1SiR^2R^3R^4$ group, $R^1$: independently from each other, a substituted or non-substituted divalent aliphatic hydrocarbon group, a substituted or non-substituted divalent aliphatic hydrocarbon group having an ether linkage, a substituted or non-substituted divalent aromatic hydrocarbon group, or a substituted or non-substituted divalent aromatic heterocyclic group, $R^2$–$R^4$: independently from each other, a hydrogen atom, a substituted or non-substituted monovalent aliphatic hydrocarbon group, a substituted or non-substituted monovalent aromatic hydrocarbon group, a substituted or non-substituted monovalent aromatic heterocyclic group, or a —$OR^9$ group, $R^9$: a hydrogen atom, a substituted or non-substituted monovalent aliphatic hydrocarbon group, a substituted or non-substituted monovalent aromatic heterocyclic group, or a silyl group, and k, l, m, n: independently from each other, an integer of 0–4 with the proviso that not all of k, l, m and n are simultaneously zero and that when k, l, m and n are each 3 or less the other substituent or substituents on respective benzene rings are hydrogen atoms or halogen atoms.

According to the present invention there is also provided an optical information recording medium wherein the phthalocyanine compound is one or a mixture of two or more of the four compounds having the following general formulas (II-a)–(II-d):

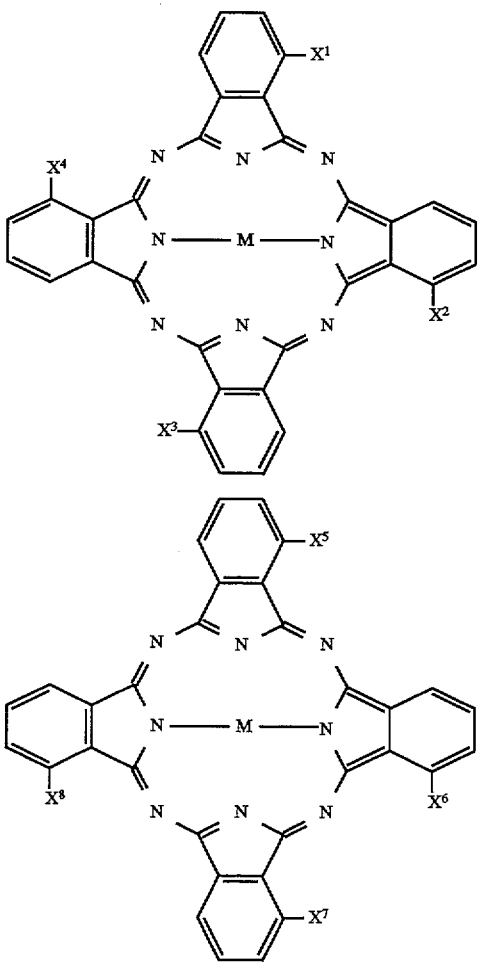

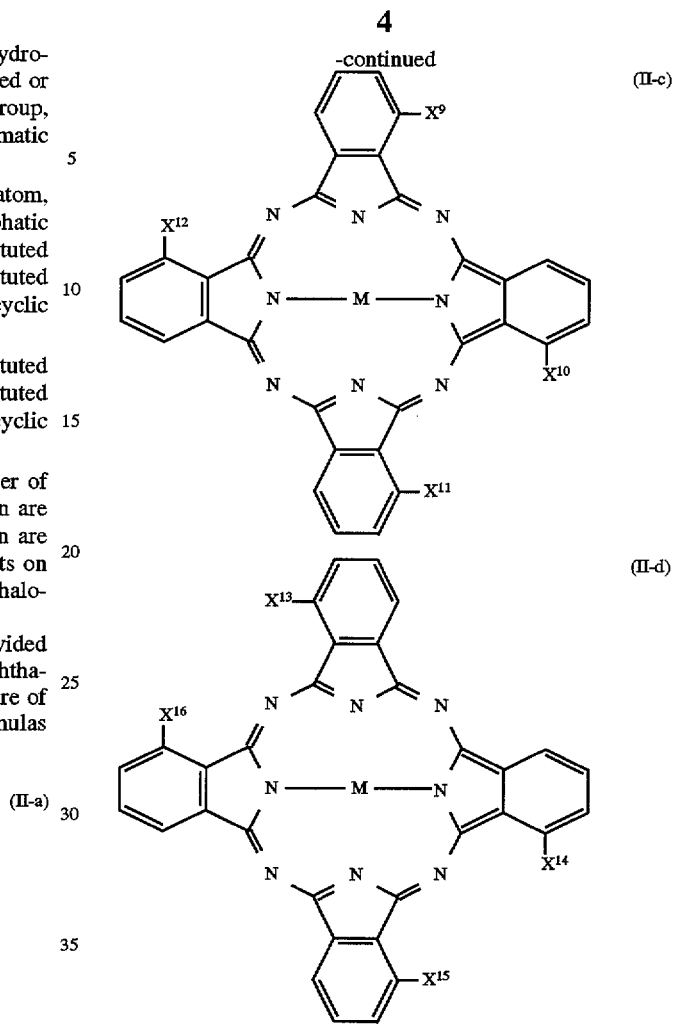

wherein M and $X^1$–$X^{16}$ represent as follows:

M: two hydrogen atoms, a metal atom which may contain halogen or oxygen atoms, or a metal atom which may contain —$(OR^5)_p$ or —$(OSiR^6R^7R^8)_q$, $R^5$–$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $X^1$–$X^{16}$: independently from each other, a —$OR^1SiR^2R^3R^4$ group, $R^1$: independently from each other, a substituted or non-substituted divalent aliphatic hydrocarbon group, a substituted or non-substituted divalent aliphatic hydrocarbon group having an ether linkage, a substituted or non-substituted divalent aromatic hydrocarbon group, or a substituted or non-substituted divalent aromatic heterocyclic group, $R^2$–$R^4$: independently from each other, a hydrogen atom, a substituted or non-substituted monovalent aliphatic hydrocarbon group, a substituted or non-substituted monovalent aromatic hydrocarbon group, a substituted or non-substituted monovalent aromatic heterocyclic group, or a —$OR^9$ group, $R^9$: a hydrogen atom, a substituted or non-substituted monovalent aliphatic hydrocarbon group, a substituted or non-substituted monovalent aromatic heterocyclic group, or a silyl group, and atoms, other than $X^1$–$X^{16}$, bonded to the benzene ring: hydrogen atoms or halogen atoms.

The present invention further provides an optical information recording medium wherein the phthalocyanine compound is one or a mixture of two or more of the four compounds having the following general formulas (III-a)–(III-d):

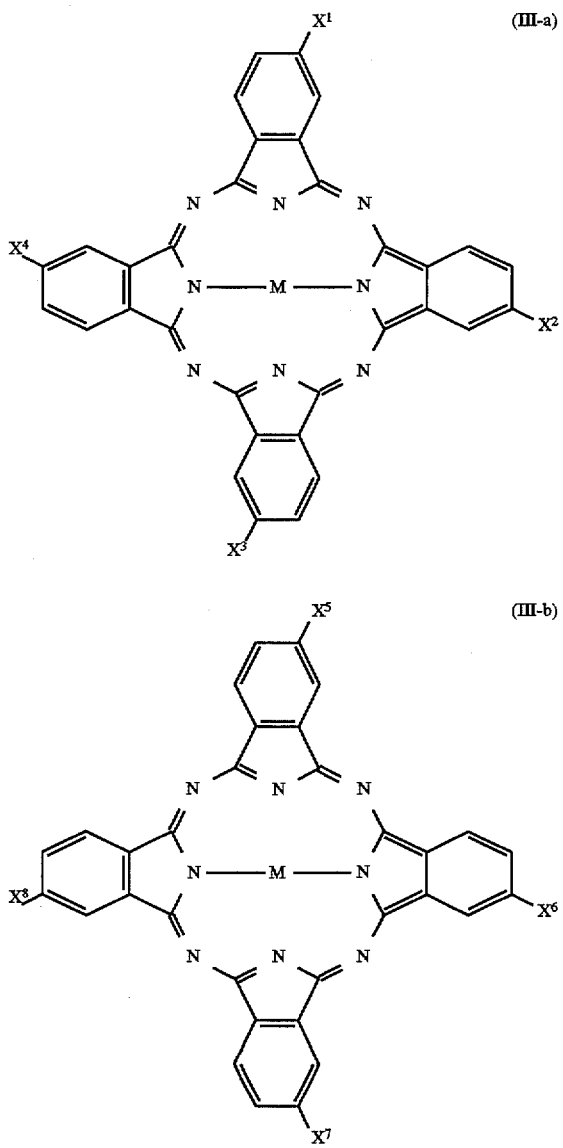

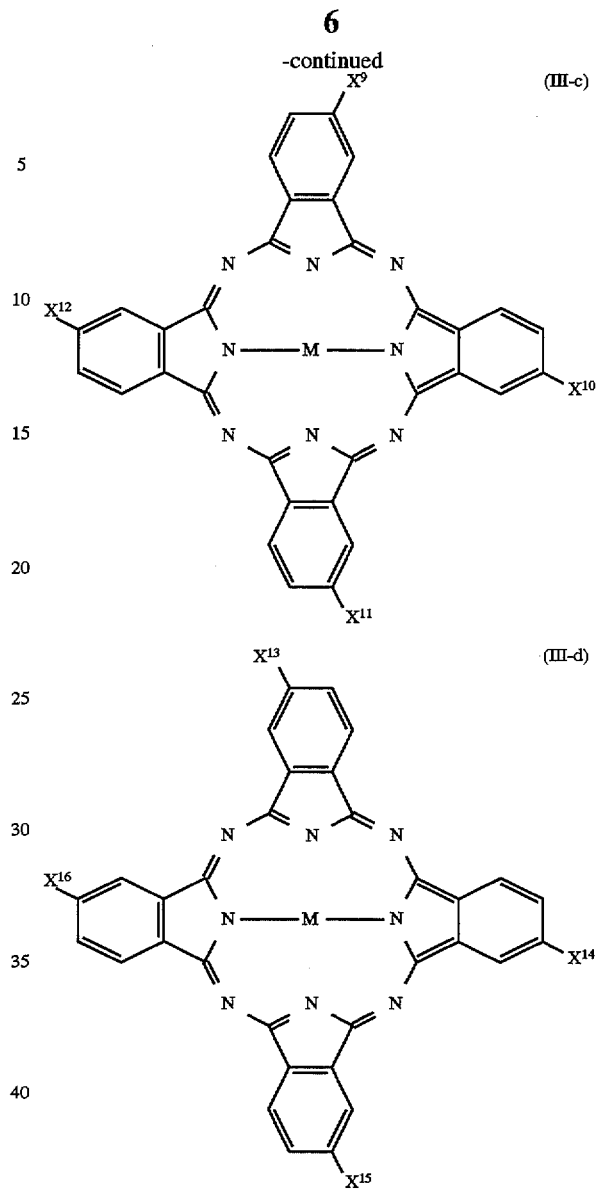

wherein M and $X^1$–$X^{16}$ represent as follows:

M: two hydrogen atoms, a metal atom which may contain halogen or oxygen atoms, or a metal atom which may contain —$(OR^5)_p$ or —$(OSiR^6R^7R^8)_q$, $R^5$–$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $X^1$–$X^{16}$: independently from each other, a —$OR^1SiR^2R^3R^4$ group, R¹: independently from each other, a substituted or non-substituted divalent aliphatic hydrocarbon group, a substituted or non-substituted divalent aliphatic hydrocarbon group having an ether linkage, a substituted or non-substituted divalent aromatic hydrocarbon group, or a substituted or non-substituted divalent aromatic heterocyclic group, R²–R⁴: independently from each other, a hydrogen atom, a substituted or non-substituted monovalent aliphatic hydrocarbon group, a substituted or non-substituted monovalent aromatic hydrocarbon group, a substituted or non-substituted monovalent aromatic heterocyclic group, or a —OR⁹ group, R⁹: a hydrogen atom, a substituted or non-substituted monovalent aliphatic hydrocarbon group, a substituted or non-substituted monovalent aromatic heterocyclic group, or a silyl group, and atoms, other than $X^1$–$X^{16}$, bonded to the benzene ring: hydrogen atoms or halogen atoms.

The present invention further provides an optical information recording medium wherein the phthalocyanine compound is one or a mixture of two or more of the four compounds having the following general formulas (IV-a)–(IV-d):

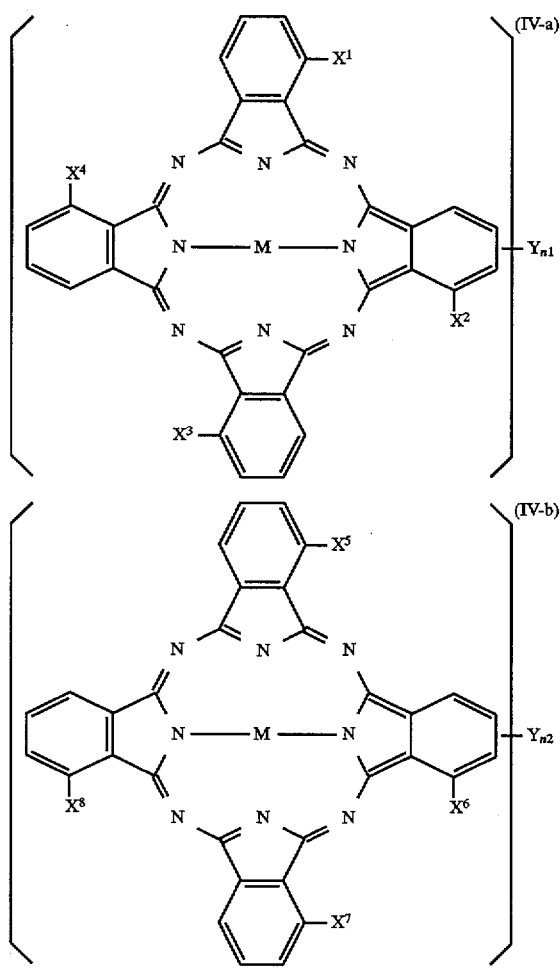

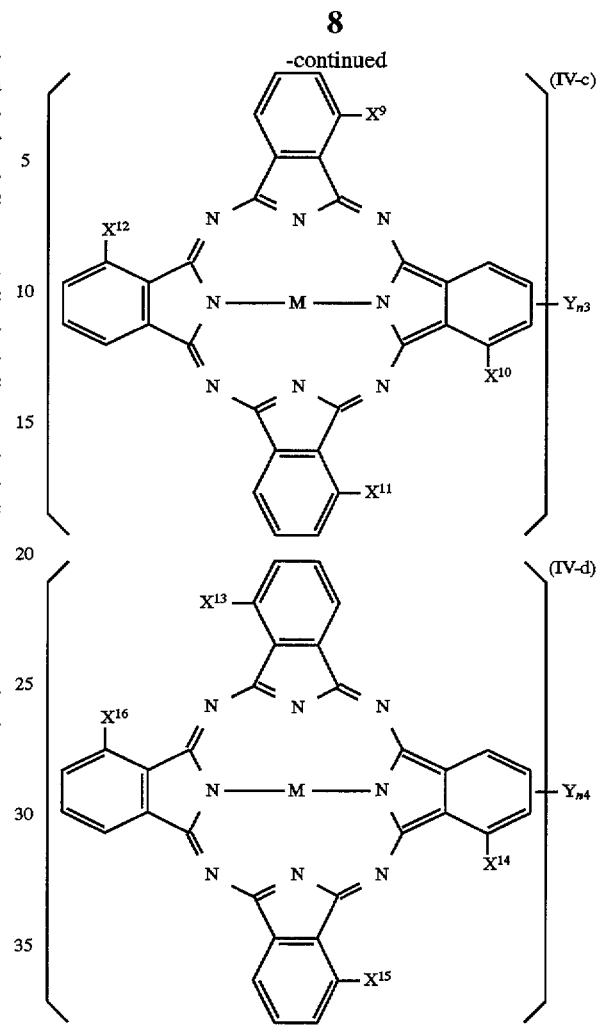

wherein M, $X^1$–$X^{16}$, Y and n1–n4 represent as follows:

M: two hydrogen atoms, a metal atom which may contain halogen or oxygen atoms, or a metal atom which may contain —(OR⁵)$_p$ or —(OSiR⁶R⁷R⁸)$_q$, R⁵–R⁸: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $X^1$–$X^{16}$: independently from each other, a —OR¹SiR²R³R⁴ group, R¹: independently from each other, a substituted or non-substituted divalent aliphatic hydrocarbon group, a substituted or non-substituted divalent aliphatic hydrocarbon group having an ether linkage, a substituted or non-substituted divalent aromatic hydrocarbon group, or a substituted or non-substituted divalent aromatic heterocyclic group, R²–R⁴: independently from each other, a hydrogen atom, a substituted or non-substituted monovalent aliphatic hydrocarbon group, a substituted or non-substituted monovalent aromatic hydrocarbon group, a substituted or non-substituted monovalent aromatic heterocyclic group, or a —OR⁹ group, R⁹: a hydrogen atom, a substituted or non-substituted monovalent aliphatic hydrocarbon group, a substituted or non-substituted monovalent aromatic heterocyclic group, or a silyl group, atoms, other than $X^1-X^{16}$, bonded to the benzene ring: hydrogen atoms or halogen atoms, Y: a halogen atom, and n1–n4: independently from each other, an integer of 1–4 showing the number of the halogen substituents.

According to the present invention, there is also provided an optical information recording medium characterized in that a reflecting metal layer is provided between said recording layer and said protecting layer so that said recording medium is of a WORM type compact disc for recording signals of a CD format.

According to the present invention, there is further provided a phthalocyanine-type near infrared absorbing material comprising one or a mixture of two or more of the four compounds having the following general formulas (II'-a)–(II'-d):

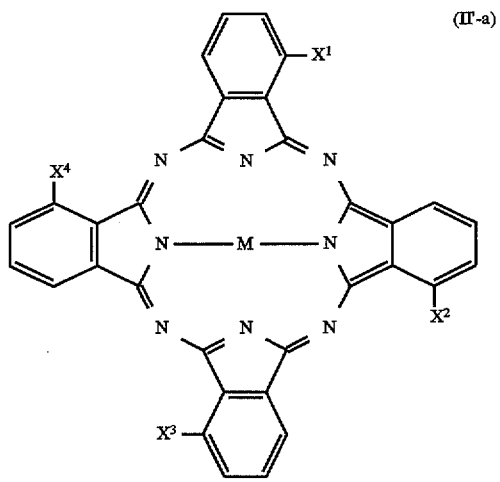

(II'-a)

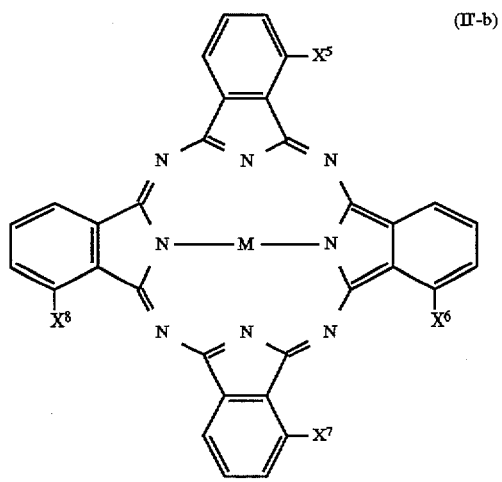

(II'-b)

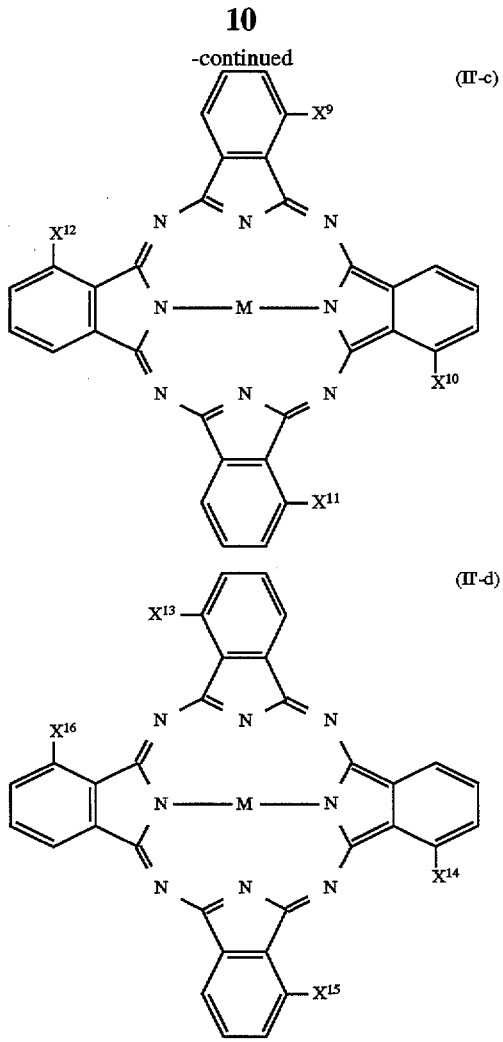

(II'-c)

(II'-d)

wherein M and $X^1-X^{16}$ represent as follows:

M: two hydrogen atoms, a metal atom which may contain halogen or oxygen atoms, or a metal atom which may contain $-(OR^5)_p$ or $-(OSiR^6R^7R^8)_q$, $X^1-X^{16}$: independently from each other, a $-OR^{11}SiR^{12}R^{13}R^{14}$ group, $R^{11}$: a straight chain or branched alkylene group which has 1–8 carbon atoms and which may contain a so-called ether linkage of —C—O—C— and may be substituted with a silyl group, $R^{12}-R^{14}$: independently from each other, a hydrogen atom, an alkyl group having 1–12 carbon atoms, an alkoxy group having 1–3 carbon atoms, a vinyl group, a $-OSi(R^{15})_3$ group or a $-CH^2Si(R^{15})_3$ group, R15: an alkyl group having 1–3 carbon atoms, and atoms, other than $X^1-X^{16}$, bonded to the benzene ring: hydrogen atoms or halogen atoms.

According to the present invention there is further provided a phthalocyanine-type near infrared absorbing material comprising one or a mixture of two or more of the four compounds having the following general formulas (III'-a)–(III'-d):

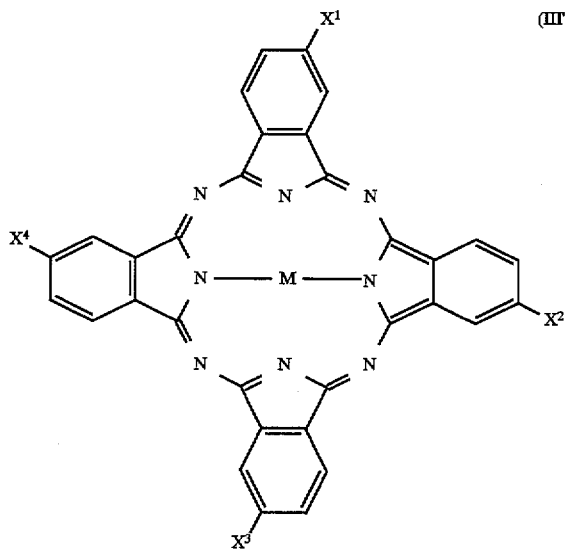

(III-a)

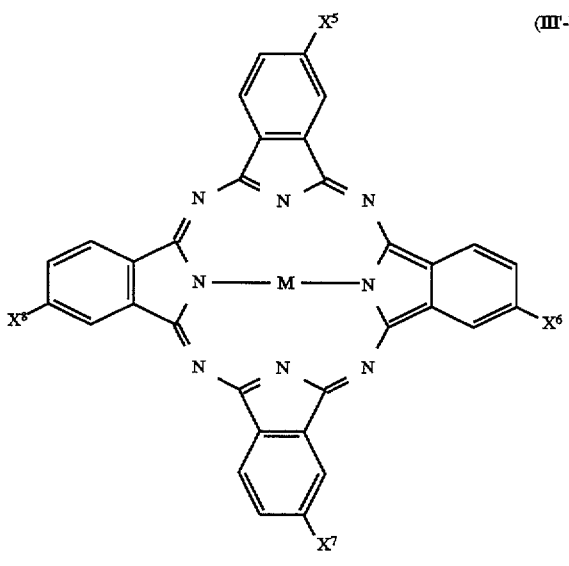

(III-b)

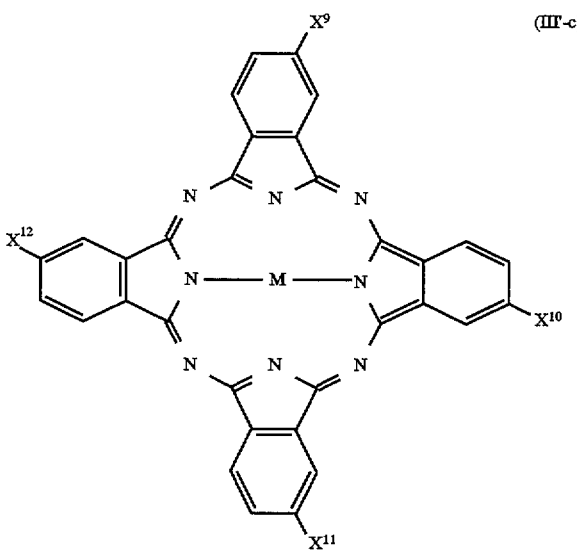

(III-c)

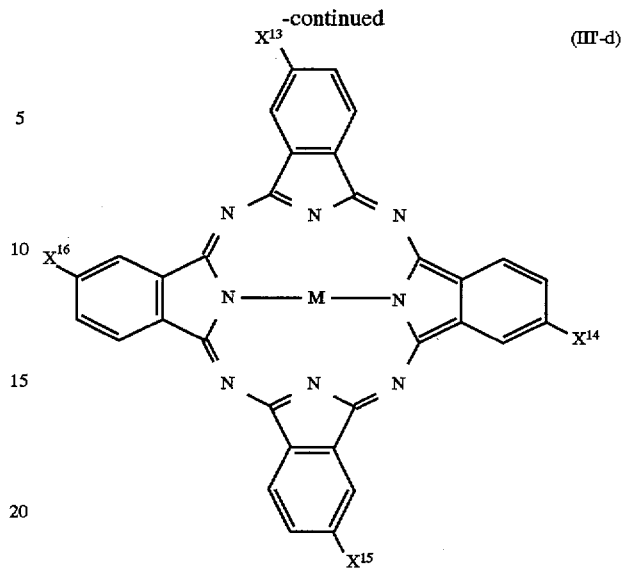

(III-d)

wherein M and $X^1$–$X^{16}$ represent as follows:

M: two hydrogen atoms, a metal atom which may contain halogen or oxygen atoms, or a metal atom which may contain —$(OR^5)_p$ or —$(OSiR^6R^7R^8)_q$, $X^1$–$X^{16}$: independently from each other, a —$OR^{11}SiR^{12}R^{13}R^{14}$ group, $R^{11}$: a straight chain or branched alkylene group which has 1–8 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —$OSi(R^{15})_3$ group or a —$CH^2Si(R^{15})_3$ group, $R^{15}$: an alkyl group having 1–3 carbon atoms, and atoms, other than $X^1$–$X^{16}$, bonded to the benzene ring: hydrogen atoms or halogen atoms.

According to the present invention, there is further provided a phthalocyanine-type near infrared absorbing material comprising one or a mixture of two or more of the four compounds having the following general formulas (IV'-a)–(IV'-d):

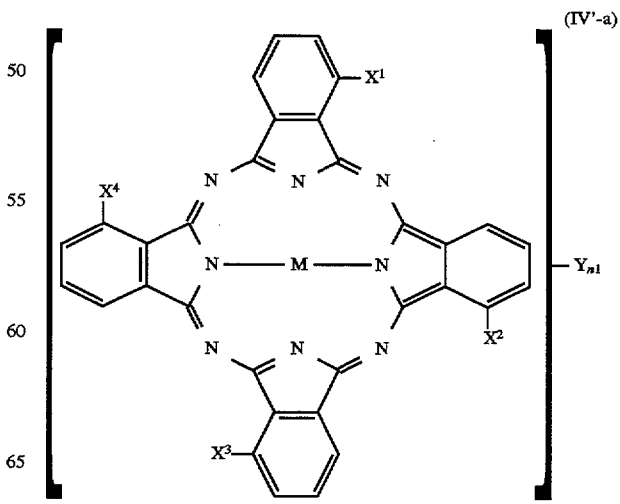

(IV'-a)

-continued

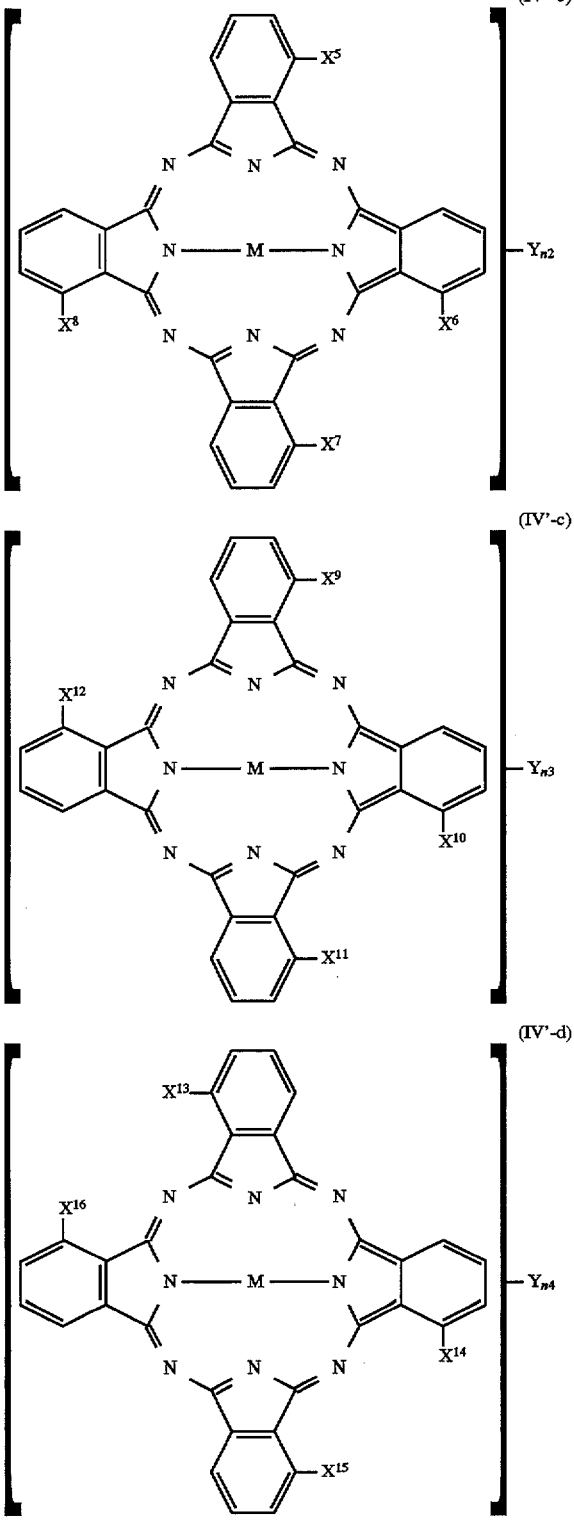

wherein M, $X^1$–$X^{16}$, Y and n1–n4 represent as follows:

M: two hydrogen atoms, a metal atom which may contain halogen or oxygen atoms, or a metal atom which may contain —$(OR^5)_p$ or —$(OSiR^6R^7R^8)_q$, $X^1$–$X^{16}$: independently from each other, a —$OR^{11}SiR^{12}R^{13}R^{14}$ group, $R^{11}$: a straight chain or branched alkylene group which has 1–8 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —$OSi(R^{15})_3$ group or a —$CH_2Si(R^{15})_3$ group, $R^{15}$: an alkyl group having 1–3 carbon atoms, atoms, other than $X^1$–$X^{16}$, bonded to the benzene ring: hydrogen atoms or halogen atoms, Y: a halogen atom, and n1–n4: independently from each other, an integer of 1–4 showing the number of the halogen substitution.

According to the present invention, there is further provided a phthalocyanine-type near infrared absorbing material having the following general formula (V):

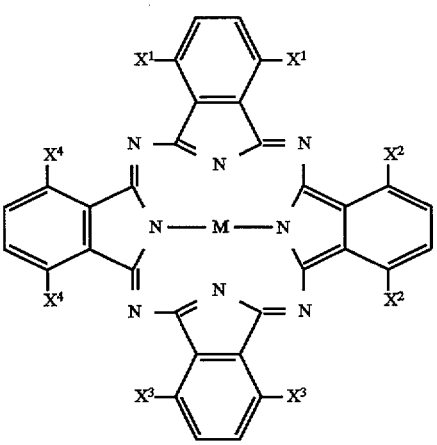

wherein M and $X^1$–$X^4$ represent as follows:

M: two hydrogen atoms, a metal atom which may contain halogen or oxygen atoms, or a metal atom which may contain —$(OR^5)_p$ or —$(OSiR^6R^7R^8)_q$, and $X^1$–$X^4$: independently from each other, a —$OR^{11}SiR^{12}R^{13}R^{14}$ group, $R^{11}$: a straight chain or branched alkylene group which has 1–5 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —$OSi(R^{15})_3$ group or a —$CH_2Si(R^{15})_3$ group, $R^{15}$: an alkyl group having 1–3 carbon atoms.

The phthalocyanine compound used in the present invention contains silyl groups represented by the above-described $X^1$–$X^{16}$ on benzene rings of the phthalocyanine skeleton as bulky substituents and, therefore, has an excellent ability to prevent the association (since a silicon atom is larger than a carbon atom, the phthalocyanine used in the present invention shows better association preventing property than alpha-alkoxyphthalocyanines) and an excellent light resistance. Thus, because the phthalocyanine exhibits a high refraction index in a wave length of 770–830 nm and has a high stability, the CD-R recording medium using the phthalocyanine has a high reflectance, excellent storage stability and excellent reproduction stability. Further, since the phthalocyanine has high absorptivity and light reflectivity in a wave length of 630–720 nm, it is applicable to pick up using a semiconductor laser of 630–720 nm, so that it is possible to attain a density of 1.6–1.7 times as high as that attained by the current recording medium of a 770–830 nm type. Moreover, when the phthalocyanine is used as a CD-R medium, since silyl substituents are present and since a carbon-silicon bond is weaker than a carbon-carbon, carbon-silicon bonds are broken so that the signal characteristics of the recorded information are improved.

The optical information recording medium according to the present invention will first described in detail below.

First the construction of the recording medium will be described.

FIG. 1 is an illustration showing an example of a layer structure applicable to the recording medium of the present invention. A recording layer 2 is provided on a substrate 1 through, if necessary, a primer layer 3. A protecting layer 4 is provided over the recording layer, if necessary.

FIG. 2 is an illustration showing another example of a layer structure applicable to the recording medium of the present invention. A metal reflecting layer 5 is provided on a recording layer 2 of a structure of FIG. 1.

The recording medium of the present invention may be arranged into a structure in which the recording layer (organic film layer) of the structure shown in FIG. 1 or 2 is opposed to another substrate with a space being interposed therebetween thereby to form a sealed air sandwich structure or is adhered to another substrate through a protecting layer thereby to form a laminate structure.

Next, the required characteristics and constituting materials of each of the constituting layers will be described.

(1) Substrate

With regard to the required characteristics of the substrate, the substrate must be transparent to a laser beam used when the recording and reproduction are carried out from the substrate side. However, the transparency is not required when the recording and reproduction are performed from the recording layer side. The material of which the substrate is formed may be, for example, a plastic such as a polyester, an acrylic resin, a polyamide, a polycarbonate resin, a polyolefin resin, a phenol resin, an epoxy resin or a polyimide, a glass, a ceramic or a metal. The surface of the substrate may be provided with guide grooves, guide pits or preformats such as an address signal.

(2) Recording layer

The recording layer is of a type which causes an optical change upon irradiation with a laser beam and in which information is able to be recorded by the change. It is necessary that the recording layer should contain a phthalocyanine compound of the above general formula (I). For the formation of the recording layer, one or a combination of two or more of the compounds of the present invention may be used. Further, the compound of the present invention may be used in conjunction with another dye such as a polymethine pigment, a dye of a naphthalocyanine-series, a squalilium-series, a croconium-series, a pyrylium-series, a naphthoquinone-series, an anthraquinone (indanthrene)-series, a xanthene-series, a triphenylmethane-series, an azulene-series, a tetrahydrocholine-series, a phenanthlene-series or a triphenothiazine-series, or a metal complex compound. These dyes may be used singly or in combination of two or more.

The compound according to the present invention may be dispersed in, mixed with or laminated with a metal or a metal compound, such as In, Al, Te, Bi, Al, Be, TeO$_2$, SnO, As or Cd. Further, a polymeric material such as an ionomer resin, a polyamide resin, a vinyl resin, a natural polymer, a silicone or a liquid rubber, or a silane coupling agent may be dispersed in or mixed with the compound of the present invention. For the purpose of improving the characteristics, a stabilizer (such as a transition metal complex), a dispersing agent, a flame-proof agent, a lubricant, an antistatic agent, a surfactant, a plasticizer, etc. may be used in conjunction with the compound of the present invention.

The recording layer may be formed by ordinary method such as vapor deposition, sputtering, CVD or solvent coating. When a solvent coating method is adopted, the above compound, etc. are dissolved in an organic solvent and the solution is applied by a conventional coating method such as spraying, roller coating, dipping or spinner coating. As the organic solvent, there may be used an alcohol such as methanol, ethanol or isopropanol; a ketone such as acetone, methyl ethyl ketone or cyclohexanone; an amide such as N,N-dimethylacetamide or N,N-dimethylformamide; a sulfoxide such as dimethylsulfoxide; an ether such as tetrahydrofuran, dioxane, diethyl ether or ethyleneglycol monomethyl ether; an ester such as methyl acetate or ethyl acetate; an aliphatic halogenated hydrocarbon such as chloroform, methylene chloride, dichloroethane, carbon tetrachloride or trichloroethane; an aromatic such as benzene, xylene, monochlorobenzene or dichlorobenzene; or a cellosolve such as methylcellosolve or ethylcellosolve.

The thickness of the recording layer is 100 Å–100 µm, preferably 200 Å–1,000 Å in the case of the structure of the medium as shown in FIG. 1 and is 300 Å–5 µm, preferably 500 Å–2,000 Å in the case of the structure of the medium as shown in FIG. 2.

(3) Primer layer

The primer layer is used for the purpose of (a) improving adhesion, (b) forming a barrier against water or gases, (c) improving storage stability of the recording layer, (d) improving reflectance, (e) protecting the substrate from solvents, or (f) forming guide grooves, guide pits or preformats. For the purpose of (a), various high molecular weight substances, such as ionomer resins, polyamides, vinyl resins, natural resins, natural polymers, silicones and liquid rubbers, and silane coupling agents may be used. For the purpose of (b) or (c), inorganic compounds such as SiO$_2$, MgF$_2$, SiO, TiO$_2$, ZnO, TiN and SiN, metals or semimetals such as Zn, Cu, Ni, Cr, Ge, Se, Au, Ag and Al may be used in addition to the above-described high molecular weight substances. For the purpose of (d), metals such as Al and Ag, organic films having metallic gloss such as those of methine dyes and xanthene dyes may be used. For the purpose of (e) or (f), ultraviolet radiation-curable resins, thermosetting resins and thermoplastic resins may be used. The primer layer has a thickness of 0.01–30 µm, preferably 0.05–10 µm.

(4) Metal reflecting layer

The metal reflecting layer may be formed of an elemental metal or semimetal which shows a high reflectance and which is hard to be corroded. Examples of the material include Au, Ag, Cu, Al, Cr and Ni. Au and Al are preferred. These metals or semimetals may be used singly or as an alloy of two or more. The layer may be formed by vacuum deposition, sputtering, etc. The thickness of the layer is 50–3,000 Å, preferably 100–1,000 Å.

(5) Protecting layer or hard coat layer on substrate

The protecting layer or hard coat layer on the substrate is used for the purpose of (a) protecting the recording layer from injury, dust and dirt, (b) improving the Storage stability of the recording layer, and (c) improving the reflectance. For these purpose, the materials shown above with reference to the primer layer may be used. As an inorganic material therefor, SiO or SiO$_2$ may be used. As an organic material, there may be used an acrylic resin, a polycarbonate, an epoxy resin, a polystyrene, a polyester resin, a vinyl resin, a cellulose, an aliphatic hydrocarbon resin, an aromatic hydrocarbon resin, a natural rubber, a styrene-butadiene resin, a chloroprene rubber, a wax, an alkyd resin, a drying oil, or a heat-softenable or fusible resin such as a rosin. Among the above materials, an ultraviolet ray-hardenable resin which is excellent in productivity is most preferably used as the protecting layer or the hard coat layer on the substrate. The thickness of the protecting layer or the hard coat layer on the substrate is 0.01–30 μm, preferably 0.05–10 μm.

Similar to the recording layer, the primer and protecting layers in the present invention may contain a stabilizing agent, a dispersing agent, a flame retardant, a lubricant, an antistatic agent, a surfactant, a plasticizer, etc.

In the present invention, the recording layer contains a phthalocyanine compound shown by the general formula (I), in which the metal atom represented by M may be Al, Si, Ca, Cd, Ti, V, Mn, Fe, Co, Ni, Cu, Zn, Ge, Mo, Ru, Rh, Pd, in, Sn, Pt, Pb, etc.

Examples of the compounds shown by the general formula (I) include those given in Tables 1-1 and 1-2.

TABLE 1-1

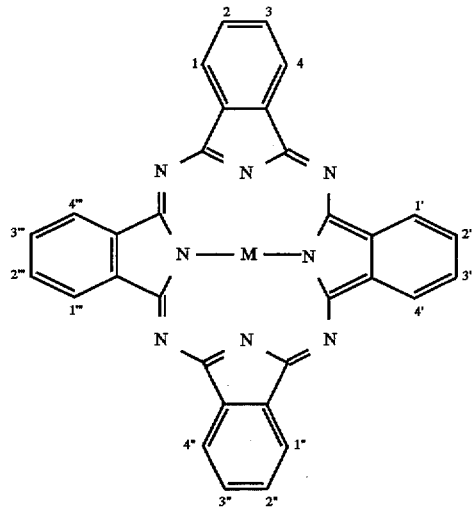

| 化合物No. | M | 1—1''' | 2—2''' | 3—3''' | 4—4''' |
|---|---|---|---|---|---|
| 1 | Cu | —OCH$_2$Si(CH$_3$)$_3$ | H | H | —OCH$_2$Si(CH$_3$)$_3$ |
| 2 | Ni | —OCH$_2$Si(CH$_3$)$_3$ | Br | H | H |
| 3 | Pd | 1 と 1' = —OCH$_2$Si(CH$_3$)$_3$<br>1'' と 1''' = H | H | H | 4 と 4' = H<br>4'' と 4''' = —OCH$_2$Si(CH$_3$)$_3$ |
| 4 | Ni | H | H | —O—CH$_2$Si(CH$_3$)$_3$ | H |
| 5 | Pd | $\begin{array}{c}\text{Me}\\|\\ —OCH_2SiCH_2Si(Me)_3\\|\\\text{Me}\end{array}$ | Br | H | H |
| 6 | Co | —OCH$_2$OCH$_2$CH$_2$Si(CH$_3$)$_3$ | H | H | —OCH$_2$OCH$_2$CH$_2$Si(CH$_3$)$_3$ |
| 7 | Pt | —O—⟨C$_6$H$_4$⟩—Si(OMe)$_3$ | H | H | —O—⟨C$_6$H$_4$⟩—Si(OMe)$_3$ |
| 8 | $\begin{array}{c}\text{Si(nBu)}_3\\/\\ \text{O}\\/\\ \text{Si}\\/\\ \text{O}\\|\\ \text{Si(nBu)}_3\end{array}$ | —OCH$_2$CH$_2$CH$_2$Si(OMe)$_3$ | H | H | —OCH$_2$CH$_2$CH$_2$Si(OMe)$_3$ |
| 9 | VO | —OCH$_2$CH$_2$CH$_2$Si(OMe)$_3$ | Cl | Cl | —OCH$_2$CH$_2$CH$_2$Si(OMe)$_3$ |

TABLE 1-2

| No. | M | 1—1''' | 2—2''' | 3—3''' | 4—4''' |
|---|---|---|---|---|---|
| 10 | $H_2$ | $-O-\underset{\parallel}{C}(=CH_2)-Si(CH_3)_3$ | H | H | $-O-\underset{\parallel}{C}(=CH_2)-Si(CH_3)_3$ |
| 11 | Ni | $-OCH_2CH_2Si(OMe)_2$ \| Me | H | H | $-OCH_2CH_2Si(OMe)_2$ \| Me |
| 12 | Pd | $-OCH_2CH_2Si(OEt)_3$ | H | H | $-OCH_2CH_2Si(OEt)_3$ |
| 13 | Si(OH)(OH) | $-OCH_2Si(Me)_2OEt$ | H | H | $-OCH_2CH_2Si(OEt)_3$ |
| 14 | Cu | 1~1''' = $-OCH_2Si(CH_3)_3$; 1'''' = $-O-C_6H_4-Si(OMe)_3$ | H | H | H |
| 15 | TiO | $-OCHSi(Me)_3$ \| Me | H | H | H |
| 16 | Pd | $-OCHSi(Me)_3$ \| Me | Br | H | Br |
| 17 | Zn | $-OCH_2Si(Me)_2C_{12}H_{25}$ | Br | H | $-OCH_2Si(Me)_2C_{12}H_{25}$ |
| 18 | Cu | $-OCH_2Si(Me)(Me)-O-Si(Me)_3$ | H | H | $-OCH_2Si(Me)(Me)-O-Si(Me)_3$ |

The compound represented by the above general formula (I) may be obtained by reacting a corresponding phthalocyanine compound or diiminoisoindoline compound with an aforementioned metal or a derivative thereof in an organic solvent. The compound of the general formula (I) in which M represents two hydrogen atoms may be obtained by reacting a corresponding phthalonitrile compound or diiminoisoindoline compound with lithium or sodium.

From the standpoint of matching of the absorption wave length and the yield of the phthalocyanine used in an optical information recording medium, it is preferred that the compound represented by the general formula (I) be one or a mixture of two or more of the four compounds represented by the general formulas (II-a)–(II-d) or one or a mixture of two or more of the four compounds represented by the general formulas (III-a)–(III-d). The one or the mixture of two or more of the four compounds of the formulas (II-a)–(II-d) and (III-a)–(III-d) may be obtained by reacting one to four corresponding phthalonitrile compounds or diiminoisoindoline compounds with the aforementioned metal or a derivative thereof in an organic solvent.

From the standpoint of capability of shifting the maximum absorption wave length to a long wave length side, it is preferred that the compound represented by the general formula (i) be one or a mixture of two or more of the four compounds represented by the general formulas (IV-a)–(IV-d). The one or the mixture of two or more of the four compounds of the formulas (IV-a)–(IV-d) may be obtained by halogenating one or a mixture of two or more of the compounds of the formulas (II-a)–(II-d) and (III-a)–(III-d). For the halogenation reaction, the examples recited in JP-A-3-62878 may be adopted as such.

Examples of the compounds of the formulas (II-a)–(II-d), (III-a)–(III-d) and (IV-a)–(IV-d) include those given in Table 2 (Tables 2-1 and 2-2). Whilst there are isomers of the compounds shown in Table 2, they are not shown in Table 2.

TABLE 2-1

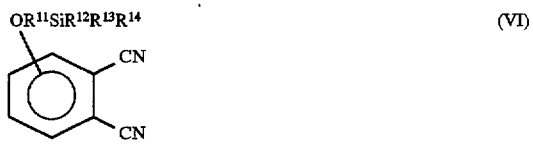

| Compound No. | M | Position of Substituent | Z | n | Substituent (OR¹SiR²R³R⁴) |
|---|---|---|---|---|---|
| 19 | Ni | alpha position | none | 0 | OCH$_2$SiMe$_3$ |
| 20 | Cu | beta position | none | 0 | OCH$_2$SiMe$_3$ |
| 21 | Pd | alpha position | none | 0 | OCH$_2$SiMe$_3$ |
| 22 | Pd | alpha position | none | 0 | OCH(Me)SiMe$_3$ |
| 23 | Pd | alpha position | none | 0 | OC$_3$H$_6$SiMe$_3$ |
| 24 | Pd | alpha position | Br | 1–4 | OCH$_2$SiMe$_3$ |
| 25 | Pd | alpha position | Br | 1–4 | OCH(Et)SiMe$_3$ |
| 26 | Pd | alpha position | Br | 1–4 | OCH(Pr)SiMe$_3$ |
| 27 | Co | beta position | none | 0 | OCH$_2$SiMe$_3$ |
| 28 | Zn | alpha position | none | 0 | OC$_2$H$_4$SiMe$_3$ |
| 29 | VO | beta position | none | 0 | OC$_3$H$_6$SiMe$_3$ |
| 30 | Cu | alpha position | none | 0 | OCH(SiMe$_3$)$_2$ |
| 31 | Ni | alpha position | Cl | 1–4 | OCH$_2$SiMe$_3$ |
| 32 | TiO | beta position | none | 0 | OCH$_2$SiMe$_3$ |
| 33 | Mn | beta position | none | 0 | OCH$_2$SiMe$_3$ |
| 34 | Fe | beta position | none | 0 | OCH$_2$SiMe$_3$ |
| 35 | Si(X)$_2$ | beta position | none | 0 | OC$_3$H$_6$SiMe$_3$ |
| 36 | Ni | alpha position | Br | 1–4 | OCH$_2$SiMe$_3$ |
| 37 | Pd | alpha position | Br | 1–4 | OCH$_2$SiMe$_3$ |
| 38 | Pd | alpha position | Br | 1–4 | OCH(Me)SiMe$_3$ |
| 39 | Pt | alpha position | none | 0 | OCH$_2$OCH$_2$SiMe$_3$ |

*X: —O—Si(n-hexyl)$_3$
Remarks:
(1) The compound has four substituents —OR¹SiR²R³R⁴.
(2) Z represents a halogen atom and n is an integer of 1–4.

Next, the phthalocyanine near infrared absorbing material according to the present invention will be described in detail.

The phthalocyanine near infrared absorbing material of the present invention is composed of one or a mixture of two or more of the four compounds of the above general formulas (II'-a)–(II'-d), composed of one or a mixture of two or more of the four compounds of the above general formulas (III'-a)–(III'-d) or composed of one or a mixture of two or more of the four compounds of the above general formulas (IV'-a)–(IV'-d).

The phthalocyanine near infrared absorbing material represented by the above general formulas (II'-a)–(II'-d), (III'-a)–(III'-d) and (IV'-a)–(IV'-d) exhibit a high solubility in an organic solvent and, of course, a high absorptivity for an near infrared ray without loosing the stability inherent to the phthalocyanine compounds. Thus, because of the improved solubility, it is possible to adopt a solvent coating method for the formation of a film so that a film having both good stability and high absorptivity may be obtained with a good productivity and it becomes possible to apply to various electronic materials.

The phthalocyanine near infrared absorbing material represented by the above general formulas (II'-a)–(II'-d) and (III'-a)–(III'-d) may be easily obtained by reacting at least one phthalonitrile compound represented by the formula (VI) shown hereinafter or at least one diiminoisoindoline compound represented by the formula (VII) shown hereinafter with the above (substituted) metal, such as selected from divalent metals, monosubstituted trivalent metals, disubstituted quadrivalent metals and oxymetals, or a derivative thereof.

In the above case, the phthalonitrile compound used as a starting material is a novel compound represented by the following formula (VI):

wherein $R^{11}$–$R^{14}$ represent as follows:

$R^{11}$: a straight chain or branched alkylene group which has 1–8 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —OSi($R^{15}$)$_3$ group or a —CH$_2$Si($R^{15}$)$_3$ group, $R^{15}$: an alkyl group having 1–3 carbon atoms.

In the above definition, examples of the straight chain or branched alkylene group having 1–8 carbon atoms include a methylene group, an ethylene group, a trimethylene group, a propylene group, a tetramethylene group, a 1,2-butylene group, a 1,3-butylene group, a 2,3-butylene group, a heptamethylene group and an octamethylene group.

Illustrative of the alkyl groups having 1–12 carbon atoms are a methyl group, an ethyl group, a propyl group, an isopropyl group, a butyl group, an isobutyl group, a sec-butyl group, a tert-butyl group, an amyl group, an octyl group, a decyl group and a dodecyl group. Illustrative of the alkyl group having 1–3 carbon atoms are those which are exemplified above and which has 1–3 carbon atoms. Illustrative of the alkoxy group having 1–3 carbon atoms are a methoxy group, an ethoxy group and a propoxy group.

The 3- or 4-silyl-substituted alkoxyphthalonitrile represented by the general formula (VI) may be obtained by reacting 3- or 4-hydroxyphthalonitrile with at least one compound expressed by the following general formula (VIII) in an organic solvent in the presence of an alkali:

$$ZR^{11}SiR^{12}R^{13}R^{14} \qquad (VIII)$$

wherein $R^{11}$–$R^{14}$ and Z represent as follows:

$R^{11}$: a straight chain or branched alkylene group which has 1–8 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —OSi($R^{15}$)$_3$ group or a —CH$_2$Si($R^{15}$)$_3$ group, $R^{15}$: an alkyl group having 1–3 carbon atoms Z: a halogen atom.

Namely, by reacting $ZR^{11}SiR^{12}R^{13}R^{14}$ with a solution obtained by dissolving 3- or 4-hydroxyphthalonitrile and potassium carbonate or sodium hydroxide in an organic solvent, there is obtainable a desired silyl-substituted alkoxyphthamonitrile.

The organic solvent used for this purpose may be, for example, N,N-dimethylformamide, N,N-dimethylacetamide, 1-methyl-2-pyrrolidone or dimethylsulfoxide. Above all, the use of N,N-dimethylformamide or N,N-dimethylformamide or a mixture of one of the two solvents with at least one of the other three solvents is preferred. $ZR^{11}SiR^{12}R^{13}R^{14}$ is generally used in the same molar amount as the hydroxyphthalonitrile but is preferably used in an amount greater than the stoichiometric amount, i.e. 1.5–3 times as much molar proportion, for reasons of an improvement of the yield. The reaction temperature is 20°–200° C., preferably 40°–180° C.

Illustrative of $ZR^{11}SiR^{12}R^{13}R^{14}$ are as follows: $ClCH_2SiMe_3$, $ClC_2H_4SiMe_3$, $ClC_3H_6SiMe_3$, $ClCH(Et)SiMe_3$, $ClCH(Pr)SiMe_3$, $ClCH(iPr)SiMe_3$, $ClCH(SiMe_3)SiMe_3$, $ClCH(Me)SiMe_3$, $ClCH_2OCH_2SiMe_3$, $ClCH_2Si(Me)_2OEt$, $ClCH_2Si(Me)_2H$, $ClCH_2Si(Me)_2CH=CH_2$, $ClCH_2Si(Me)_2C_{12}H_{25}$, $ClCH_2Si(OEt)_3$, $ClCH_2Si(OEt)_2Me$, $ClCH_2Si(OiPro)_2Me$, $ClCH_2Si(Me)_2CH_2Si(Me)_3$, $ClCH_2Si(Me)_2OSi(Me)_3$, $ClC_3H_6Si(Me)_2OMe$, $ClC_3H_6SiMe(OMe)_2$, $ClC_3H_6Si(OEt)_3$, $ClC_3H_6Si(OMe)_3$, $ClC_3H_6Si(OSiMe)_3$, $ClCH_2Si(Me)_2OMe$, $ClCH_2Si(OMe)_3$, $ClC_2H_4OSi(Me)_3$, $ClCH_2CH(OSiMe_3)Me$, $ClC_3H_6OSiMe_3$, $ClCH_2Si(Me)_2 C_4H_9$, $ClC_3H_6(Me)[(CH_2)_3CH_3]_2$, $ClCH_2Si(Me)_2H$ and $ClCH(Bu)SiMe_3$, wherein Me stands for a methyl group, Et stands for an ethyl group, Pr stands for a propyl group, iPr stands for an isopropyl group and Bu stands for a butyl group.

The 3- or 4-silyl-substituted alkoxyphthalonitrile represented by the general formula (VI) may be obtained by reacting 3- or 4-hydroxyphthalonitrile with sodium nitrite and potassium carbonate or a sodium metal compound and, then, further with at least one compound represented by the formula:

$$ZR^{11}SiR^{12}R^{13}R^{14} \qquad (VIII)$$

Namely, in this method, the nitro group of the 3- or 4-nitrophthalonitrile is first converted into a potassium-oxy group or sodium-oxy group and, thereafter, a silicon compound of the general formula (VIII) is added so that a desired silyl-substituted alkoxyphthalonitrile is directly synthesized in one pot (one vessel). More particularly, 3- or 4-nitrophthalonitrile is dissolved in an organic solvent, to which is then added sodium nitrite. After being heated to 100°–200° C., potassium carbonate or a sodium metal compound, such as metallic sodium, sodium hydride or $CH_3ONa$, is added so that the nitro group of the starting material is converted into a potassium-oxy group or a sodium-oxy group. Subsequently, $ZR^{11}SiR^{12}R^{13}R^{14}$ is added and the mixture is reacted at 20°–200° C., thereby to obtain a desired silyl-substituted alkoxyphthalonitrile. The solvent to be used in the present reaction (one pot reaction) may be that used in the above-described production of a silyl-substituted alkoxyphthalonitrile from a hydroxyphthalonitrile.

A method is proposed for the production of an alkoxyphthalonitrile from nitrophthalonitrile in which nitrophthanonitirle is reacted with an alcohol in an organic solvent (e.g. dimethylformamide) in the presence of sodium hydride according to the reaction formula (I) shown below (JP-A-3-215466):

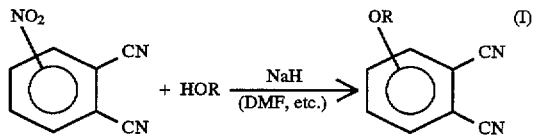

wherein R represents an alkyl group or an aryl group.

When the above method is applied to the production of the silyl-substituted alkoxyphthalonitrile of the present invention (namely, when nitrophthanonitrile is reacted with $HOR^{11}SiR^{12}R^{13}R^{14}$ in an organic solvent in the presence of NaH), the C—Si bond is broken so that almost no silyl-substituted alkoxyphthanonitrile is produced and, rather, phthanonitriles having substituents of $—OR^{12}$, $—OR^{13}$, $—OR^{14}$, etc. are produced The diiminoisoindoline compound useful as a starting material for the phthalocyanine compound of the present invention is also a novel compound expressed by the following general formula (VII):

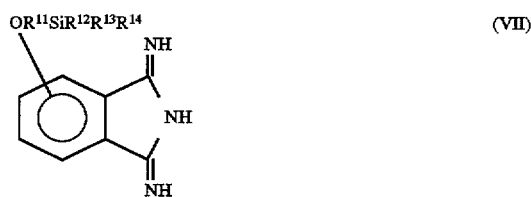

wherein $R^{11}$–$R^{14}$ and Z represent as follows:

$R^{11}$: a straight chain or branched alkylene group which has 1–8 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —$OSi(R^{15})_3$ group or a —$CH_2Si(R^{15})_3$ group, $R^{15}$: an alkyl group having 1–3 carbon atoms. Examples of $R^{11}$–$R^{15}$ may be the same as those described in connection with the general formula (VI).

The diiminoisoindoline compound represented by the general formula (VII) may be obtained by reacting at least one phthalonitrile compound expressed by the above general formula (VI) with ammonia gas in an alcohol solvent in the presence of sodium (metallic sodium or sodium alkoxide) according to the reaction formula (II) below:

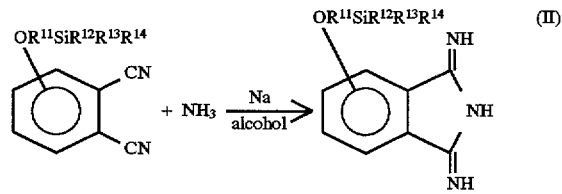

The typical alcohol used in the above reaction is generally methanol.

As described above, the novel phthalocyanine near infrared absorbing material according to the present invention is composed of one or a mixture of two or more of the four compounds of the above general formulas (II'-a)–(II'-d), composed of one or a mixture of two or more of the four compounds of the above general formulas (III'-a)–(III'-d) or composed of one or a mixture of two or more of the four compounds of the above general formulas (IV'-a)–(IV'-d).

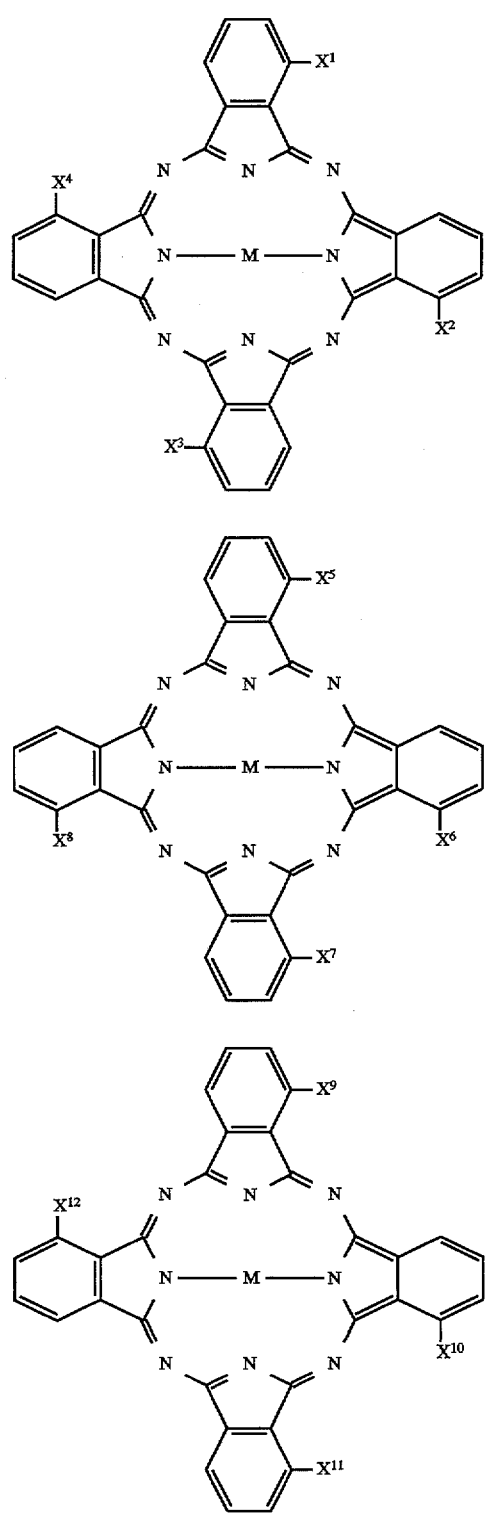
(II'-a)
(II'-b)
(II'-c)
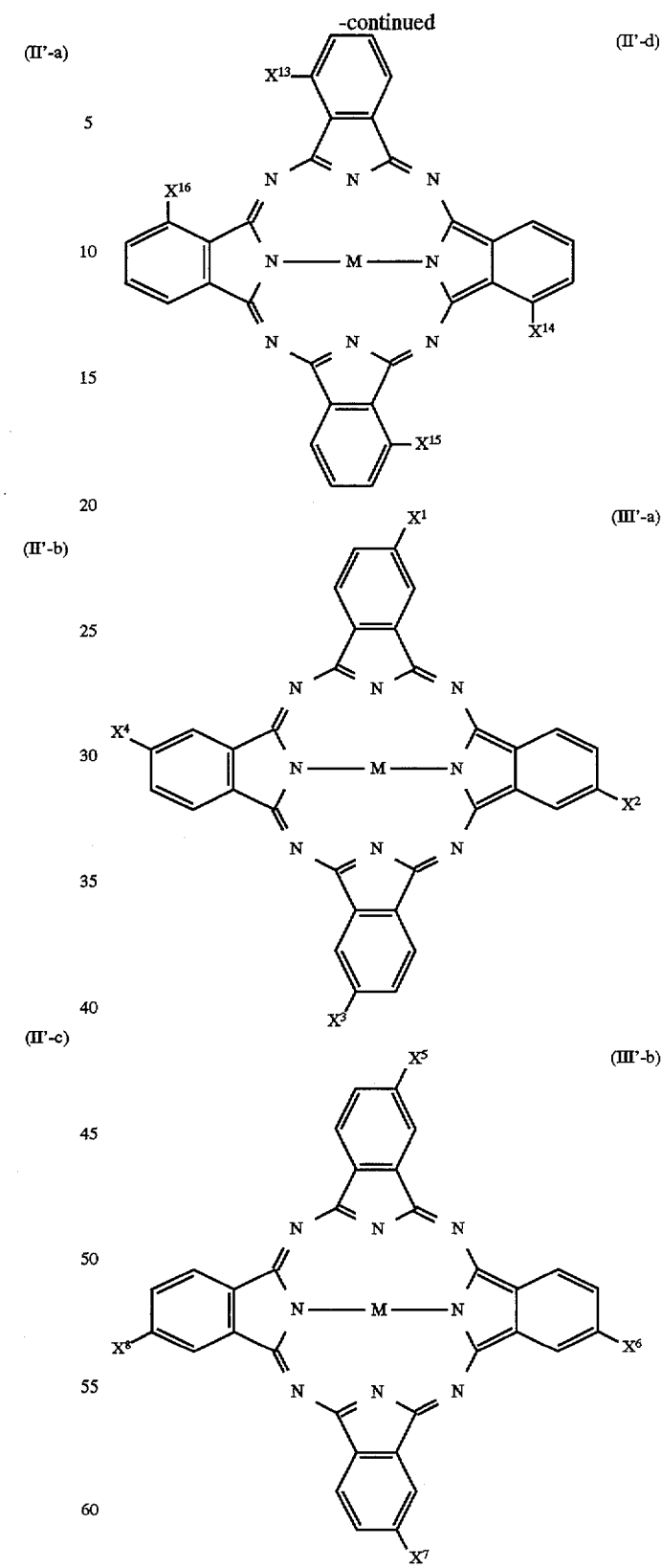
(II'-d)
(III'-a)
(III'-b)

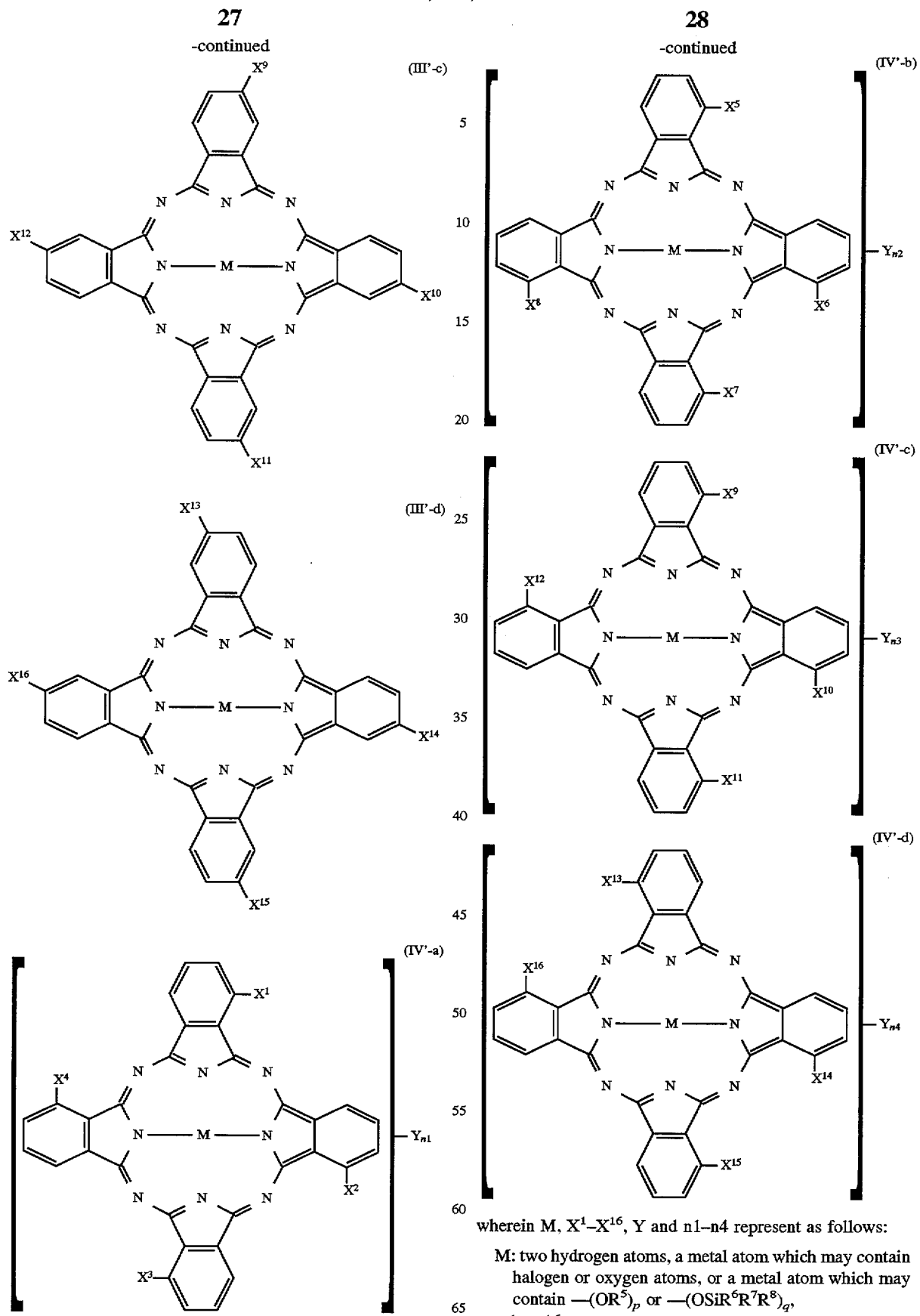
wherein M, $X^1$–$X^{16}$, Y and n1–n4 represent as follows:
M: two hydrogen atoms, a metal atom which may contain halogen or oxygen atoms, or a metal atom which may contain —$(OR^5)_p$ or —$(OSiR^6R^7R^8)_q$,
$X^1$–$X^{16}$: independently from each other, a —$OR^{11}SiR^{12}R^{13}R^{14}$ group, $R^{11}$: a straight chain or branched alkylene group which has 1–8 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —OSi($R^{15}$)$_3$ group or a —CH$_2$Si($R^{15}$)$_3$ group, $R^{15}$: an alkyl group having 1–3 carbon atoms, atoms, other than $X^1$–$X^{16}$, bonded to the benzene ring: hydrogen atoms or halogen atoms, Y: a halogen atom, and n1–n4: independently from each other, an integer of 1–4 showing the number of the halogen substitution.

In the compounds of the above general formulas (II'-a)–(II'-d), (III'-a)–(III'-d) and (IV'-a)–(IV'-d), the metal atom represented by M may be Al, Si, Ca, Cd, Ti, V, Mn, Fe, Co, Ni, Cu, Zn, Ge, Mo, Ru, Rh, Pd, In, Sn, Pt, Pb, etc. $R^{11}$–$R^{15}$ have the same meaning as those in the general formula (VI). Y is a halogen atom such as bromium, chlorine, fluorine or iodine. For reasons of an effect of shifting the maximum absorbing wave length to a long wave length side, the use of bromine is particularly preferred.

As mentioned previously, the phthalocyanine near infrared absorbing material represented by the above general formulas (II'-a)–(II'-d) and (III'-a)–(III'-d) may be obtained by reacting at least one phthalonitrile compound represented by the formula (VI) or at least one diiminoisoindoline compound represented by the formula (VII) with the above (substituted) metal or a derivative thereof. The formation of the phthalocyanine ring is preferably performed in an organic solvent. Thus, at least one (one to four) phthalonitrile or diiminoisoindoline compound as a starting material is reacted with a metal or a derivative thereof in a solvent at a temperature of 90°–240° C. When the reaction temperature is lower than 90° C., a disadvantage is caused because the reaction proceeds slowly or does not proceed. A temperature above 240° C. causes the formation of a large amount of decomposed products and, therefore, causes a disadvantage that the yield is lowered. The amount of the solvent is 1–100 times, preferably 3–25 times the weight of the phthalonitrile or diiminoisoindoline compound. While any solvent may be used as long as it has a boiling point of 90° C. or more, an alcohol is preferably used. Illustrative of alcohols are n-butyl alcohol, n-amyl alcohol, n-hexanol, cyclohexanol, 2-methyl-1-pentanol, 1-heptanol, 2-heptanol, 1-octanol, 2-ethylhexanol, benzyl alcohol, ethylene glycol, propylene glycol, ethoxyethanol, propoxyethanol and butoxyethanol. The metal or metal derivative used for the reaction may be, for example, Al, Si, Ca, Cd, Ti, V, Mn, Fe, Co, Ni, Cu, Zn, Ge, Mo, Ru, Rh, Pd, In, Sn, Pt, Pb, halides thereof, carboxylic derivatives thereof, sulfates thereof, nitrates thereof, carbonyl compounds thereof, oxides thereof and complexes thereof.

The amounts of the metal or metal derivative and the phthalonitrile or diiminoisoindoline compound are preferably such as to provide a molar ratio of 1:3 to 1:6.

As a catalyst for the ring formation reaction, a strong base auxiliary material such as an organic base, e.g. diazabicycloundecene or diazabicyclononene, may be added in an amount of 0.1–10 moles, preferably 0.5–2 moles per mole of the phthalonitrile or diiminoisoindoline compound.

The compound of the above general formulas (II'-a)–(II'-d) and (III'-a)–(II'-d) in which M stands for two hydrogen atoms, namely a so-called metal-free phthalocyanine, may be obtained by reacting at least one phthalonitrile compound represented by the formula (VI) or at least one diiminoisoindoline compound represented by the formula (VII) with lithium or sodium.

This reaction, too, is preferably performed in an organic solvent, especially an alcohol. Thus, the phthalonitrile or diiminoisoindoline compound is reacted in the presence of Na, Li, CH$_3$ONa, NaH or butyllithium in an alcohol at a temperature of 70°–150° C. The amount of metallic Li or Na is suitably 0.5–4 moles per mole of the phthalonitrile or diiminoisoindoline compound. The specific examples of the alcohol and the amount of the alcohol are the same as those adopted in the production of the metallophthalocyanine. The reaction temperature is not higher than 150° C., since otherwise the decomposition products are produced in a large amount.

The phthalocyanine near infrared absorbing material represented by the above general formulas (IV'-a)–(IV'-d) may be obtained by halogenating the phthalocyanine compound of the formulas (II'-a)–(II'-d) or (III'-a)–(III'-d). The halogenation may be effected by utilizing the disclosed examples shown in JP-A-3-62878, 3-215466, 4-348168, 4-226390, 4-15263, 4-152264, 4-5265, 4-125266, 5-17477, 5-86301, 5-25177, 5-25179, 5-17700 and 5-1272 as such. Thus, the material may be obtained by reacting the phthalocyanine compound with a halogenating agent such as bromine in one or a mixture of two or more of halogen-series solvents, hydrocarbons and water.

The phthanocyanine near infrared absorbing material of the present invention includes a compound represented by the above general formula (V).

The phthanocyanine near infrared absorbing material represented by the general formula (V) has a high solubility in an organic solvent without adversely affecting the stability inherent to phthalocyanine compounds and, of course, has a high absorptivity of near infrared ray. Namely, this phthalocyanine compound has a high absorbing power (absorbancy is more than 10$^5$) in near infrared region and permits coating using a hydrocarbon-type, cellosolve-type or halogen-type solvent.

The phthanocyanine near infrared absorbing material represented by the general formula (V) may be obtained by reacting at least one phthalonitrile compound expressed by the general formula (IX) given below or at least one diiminoisoindoline compound expressed by the above general formula (X) with the above-described (substituted) metal, such as selected from divalent metals, monosubstituted trivalent metals, disubstituted quadrivalent metals and oxymetals, or a derivative thereof.

The phthalonitrile compound used as the starting material is a novel compound expressed by the following formula (IX):

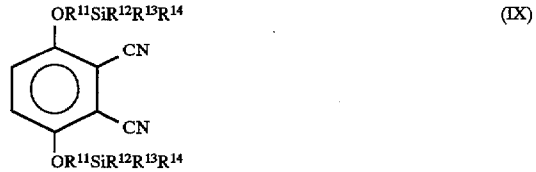

(IX)

wherein $R^{11}$–$R^{14}$ represent as follows:

$R^{11}$: a straight chain or branched alkylene group which has 1–5 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —OSi($R^{15}$)$_3$ group or a —CH$_2$Si($R^{15}$)$_3$ group, $R^{15}$: an alkyl group having 1–3 carbon atoms.

In the above definition, examples of the straight chain or branched alkylene group having 1–5 carbon atoms include a methylene group, an ethylene group, a trimethylene group, a propylene group, a tetramethylene group, a 1,2-butylene group, a 1,3-butylene group, a 2,3-butylene group and a pentamethylene group.

Illustrative of the alkyl groups having 1–12 carbon atoms are a methyl group, an ethyl group, a propyl group, an isopropyl group, a butyl group, an isobutyl group, a sec-butyl group, a tert-butyl group, an amyl group, an octyl group, a decyl group and a dodecyl group. Illustrative of the alkyl group having 1–3 carbon atoms are those which are exemplified above and which has 1–3 carbon atoms. Illustrative of the alkoxy group having 1–3 carbon atoms are a methoxy group, an ethoxy group and a propoxy group.

The 3,6-disilyl-substituted alkoxyphthalonitrile represented by the general formula (IX) may be obtained by reacting 2,3-dicyanohydroquinone with at least one compound expressed by the following general formula (XI) in an organic solvent:

$$ClR^{11}SiR^{12}R^{13}R^{14} \qquad (XI)$$

wherein $R^{11}$–$R^{14}$ and Z represent as follows:

$R^{11}$: a straight chain or branched alkylene group which has 1–5 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —OSi($R^{15}$)$_3$ group or a —CH$_2$Si($R^{15}$)$_3$ group, $R^{15}$: an alkyl group having 1–3 carbon atoms. It is preferred that potassium carbonate be present in the reaction system.

The organic solvent used for this purpose may be, for example, N,N-dimethylformamide, N,N-dimethylacetamide, 1-methyl-2-pyrrolidone or dimethylsulfoxide. Above all, the use of N,N-dimethylformamide or N,N-dimethylformamide is preferred. $ClR^{11}SiR^{12}R^{13}R^{14}$ is generally used in an amount of two moles per mole of the 2,3-dicyanohydroquinone but is preferably used in an amount greater than the stoichiometric amount, i.e. 2–4 times as much molar proportion, for reasons of an improvement of the yield. The reaction temperature is 0°–150° C., preferably 40°–120° C.

Illustrative of $ClR^{11}SiR^{12}R^{13}R^{14}$ are as follows: ClCH$_2$SiMe$_3$, CH$_3$CHClSiMe$_3$, ClCH$_2$Si(Me)$_2$OEt, ClCH$_2$Si(Me)$_2$H, ClCH$_2$Si(Me)$_2$CH=CH$_2$, ClCH$_2$Si(Me)$_2$C$_{12}$H$_{25}$, ClCH$_2$Si(OEt)$_2$Me, ClCH$_2$Si(OiPro)$_2$Me, ClCH$_2$Si(Me)$_2$CH$_2$Si(Me)$_3$, ClCH$_2$Si(Me)$_2$OSi(Me)$_3$, ClCH$_2$Si(OEt)$_3$, ClCH$_2$Si(Me)$_2$OMe, ClC$_3$H$_6$SiMe(OMe)$_2$, ClC$_3$H$_6$Si(OEt)$_3$, ClC$_3$H$_6$Si(OMe)$_3$, ClC$_3$H$_6$Si(Me)$_3$, ClC$_3$H$_6$Si(OSiMe$_3$)$_3$, ClCH(Et)SiMe$_3$, ClCH(Pr) SiMe$_3$, ClCH(iPr)SiMe$_3$, ClCH(Bu)SiMe$_3$, ClCH(Me)SiMe$_3$, ClCH(SiMe$_3$)$_2$ and ClCH$_2$OCH$_2$HSiMe$_3$, wherein Me stands for a methyl group, Et stands for an ethyl group, Pr stands for a propyl group, iPr stands for an isopropyl group and Bu stands for a butyl group.

The diiminoisoindoline compound useful as a starting material for the phthalocyanine compound of the present invention is also a novel compound expressed by the following general formula (X):

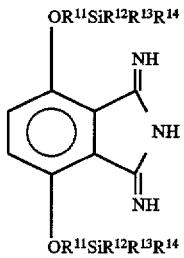

wherein $R^{11}$–$R^{14}$ represent as follows:

$R^{11}$: a straight chain or branched alkylene group which has 1–5 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —OSi($R^{15}$)$_3$ group or a —CH$_2$Si($R^{15}$)$_3$ group, $R^{15}$: an alkyl group having 1–3 carbon atoms. Examples of $R^{11}$–$R^{15}$ may be the same as those described in connection with the general formula (IX).

The diiminoisoindoline compound represented by the general formula (X) may be obtained by reacting at least one phthalonitrile compound expressed by the above general formula (I) with ammonia gas in an alcohol solvent in the presence of sodium (or sodium alkoxide) according to the reaction formula (III) below:

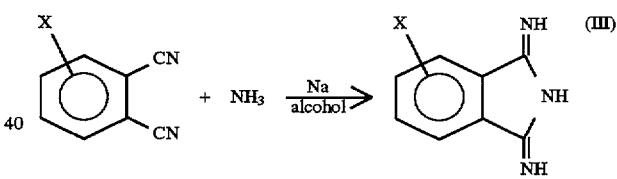

wherein X represents an alkyl group, an alkoxy group, a hydrogen atom, a thioalkyl group, a thioallyl group, a nitro group, an amino group or a halogen atom.

The typical alcohol used in the above reaction is generally methanol.

The above reaction of the phthalonitrile compound expressed by the general formula (IX), however, does not proceed in methanol. For this reason, the present process uses an alcohol having a boiling point higher than that of methanol, namely an alcohol having a boiling point of 70°–140° C., preferably 100°–120° C. Illustrative of suitable alcohols are ethanol, 1-propanol, 2-propanol, 1-butanol, 2-butanol, tert-butanol, 1-pentanol, 2-pentanol and 3-pentanol. These alcohols may be used singly or in combination of two or more. The reaction temperature is preferably 70°–90° C.

As described previously, the novel phthalocyanine near infrared absorbing material according to the present invention is expressed by the general formula (V):

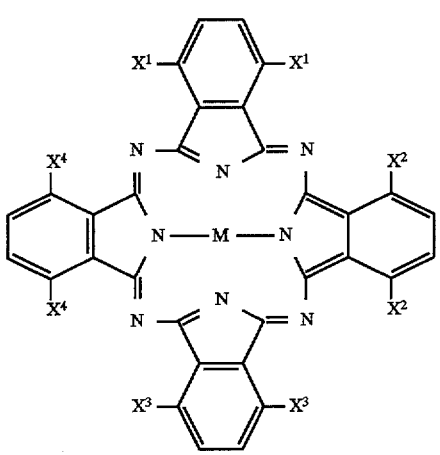

(V)

wherein M and $X^1$-$X^4$ represent as follows:

M: two hydrogen atoms, a metal atom which may contain halogen or oxygen atoms, or a metal atom which may contain —$(OR^5)_p$ or —$(OSiR^6R^7R^8)_q$, $X^1$-$X^4$: independently from each other, a —$OR^{11}SiR^{12}R^{13}R^{14}$ group, $R^{11}$: a straight chain or branched alkylene group which has 1–5 carbon atoms and which may contain a so-called ether linkage of —C—O—C— and may be substituted with a silyl group, $R^{12}$-$R^{14}$: independently from each other, a hydrogen atom, an alkyl group having 1–12 carbon atoms, an alkoxy group having 1–3 carbon atoms, a vinyl group, a —$OSi(R^{15})_3$ group or a —$CH_2Si(R^{15})_3$ group, $R^{15}$: an alkyl group having 1–3 carbon atoms.

In the compounds of the above general formula (V), the metal atom represented by M may be Al, Si, Ca, Cd, Ti, V, Mn, Fe, Co, Ni, Cu, Zn, Ge, Mo, Ru, Rh, Pd, In, Sn, Pt, Pb, etc. $R^{11}$-$R^{15}$ have the same meaning as those in the general formula (IX).

The phthalocyanine near infrared absorbing material represented by the above general formula (V) may be obtained by reacting at least one phthalonitrile compound represented by the formula (IX) or at least one diiminoisoindoline compound represented by the formula (X) with the above (substituted) metal or a derivative thereof. The formation of the phthalocyanine ring is preferably performed in an organic solvent. Thus, at least one (one to four) phthalonitrile or diiminoisoindoline compound as a starting material is reacted with a metal or a derivative thereof in a solvent at a temperature of 90°–160° C. When the reaction temperature is lower than 90° C., a disadvantage is caused because the reaction proceeds slowly or does not proceed. A temperature above 160° C. causes the formation of a large amount of decomposed products and, therefore, causes a disadvantage that the yield is lowered. The amount of the solvent is 1–100 times, preferably 3–25 times the weight of the phthalonitrile or diiminoisoindoline compound. While any solvent may be used as long as it has a boiling point of 90° C. or more, an alcohol is preferably used. Illustrative of alcohols are n-butyl alcohol, n-amyl alcohol, n-hexanol, cyclohexanol, 2-methyl-1-pentanol, 1-heptanol, 2-heptanol, 1-octanol, 2-ethylhexanol, benzyl alcohol, ethylene glycol, propylene glycol, ethoxyethanol, propoxyethanol and butoxyethanol. The metal or metal derivative used for the reaction may be, for example, Al, Si, Ca, Cd, Ti, V, Mn, Fe, Co, Ni, Cu, Zn, Ge, Mo, Ru, Rh, Pd, In, Sn, Pt, Pb, halides thereof, carboxylic derivatives thereof, sulfates thereof, nitrates thereof, carbonyl compounds thereof, oxides thereof and complexes thereof.

The amounts of the metal or metal derivative and the phthalonitrile or diiminoisoindoline compound are preferably such as to provide a molar ratio of 1:3 to 1:6.

As a catalyst for the ring formation reaction, a strong base auxiliary material such as an organic base, e.g. diazabicycloundecene or diazabicyclononene, may be added in an amount of 0.1–10 moles, preferably 0.5–2 moles per mole of the phthalonitrile or diiminoisoindoline compound.

The compound of the above general formula (V) in which M stands for two hydrogen atoms, namely a so-called metal-free phthalocyanine, may be obtained by reacting at least one phthalonitrile compound represented by the formula (IX) or at least one diiminoisoindoline compound represented by the formula (X) with lithium or sodium.

This reaction, too, is preferably performed in an organic solvent, especially an alcohol. Thus, the phthalonitrile or diiminoisoindoline compound is reacted in the presence of Na, Li, $CH_3ONa$, NaH or butyllithium in an alcohol at a temperature of 70°–150° C. The amount of metallic Li or Na is suitably 0.5–4 moles per mole of the phthalonitrile or diiminoisoindoline compound. The specific examples of the alcohol and the amount of the alcohol are the same as those adopted in the production of the metallophthalocyanine. The reaction temperature is not higher than 150° C., since otherwise the decomposition products are produced in a large amount.

BRIEF DESCRIPTION OF THE DRAWINGS

FIG. 4 is an IR spectrum of the phthalonitrile compound obtained in Preparation Example 6;

EXAMPLES

Figure 1A:
FIG. 1 is an illustration showing an example of a layer construction applicable to a recording medium of the present invention.
Figure 1B:
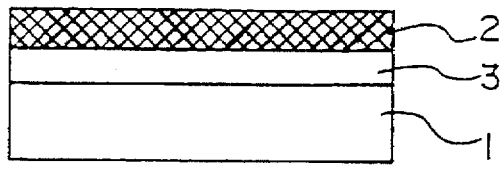
Figure 1C:
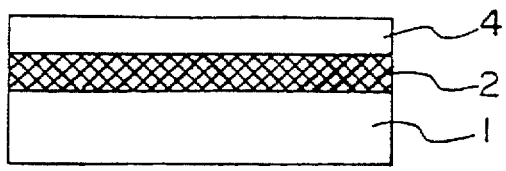
Figure 1D:
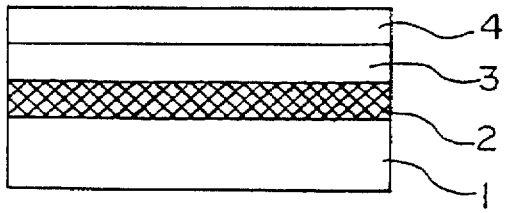
Figure 2A:
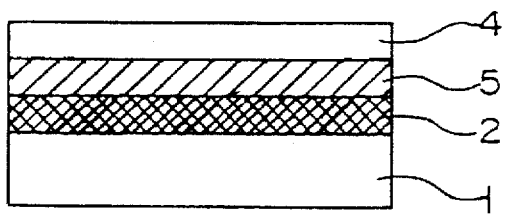
FIG. 2 is an illustration showing another type of a layer construction applicable to a recording medium of the present invention.
Figure 2B:
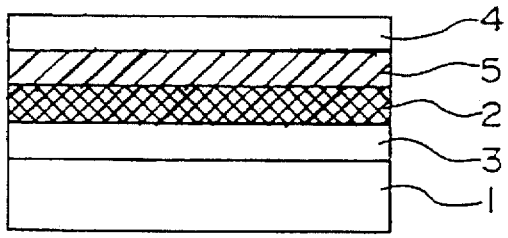

The present invention will be described with respect to examples but is not limited thereto.

Example 1

Guide grooves having a depth of 1,000 Å, a half value width of 0.4 μm and a track pitch of 1.4 μm were formed on a poly(methyl acrylate) plate having a thickness of 1.2 mm using a photopolymer, thereby obtaining a substrate. A solution of Compound No. 1 in Table 1 in 1,2-dichloroethane was applied on the substrate by spinner coating to form a recording layer having a thickness of 800 Å, thereby obtaining a recording medium of a WORM type.

Examples 2–6

Example 1 was repeated in the same manner as described except that Compounds No. 6, No. 10, No. 11, No. 12 and No. 18 shown in Table 1 were each substituted for Compound No. 1, thereby obtaining recording media of Examples 2–6, respectively.

Comparative Example 1

Example 1 was repeated in the same manner as described except that a phthalocyanine compound having the formula (XII) shown below was substituted for Compound No. 1 shown in Table 1, thereby obtaining a recording medium of Comparative Example 1.

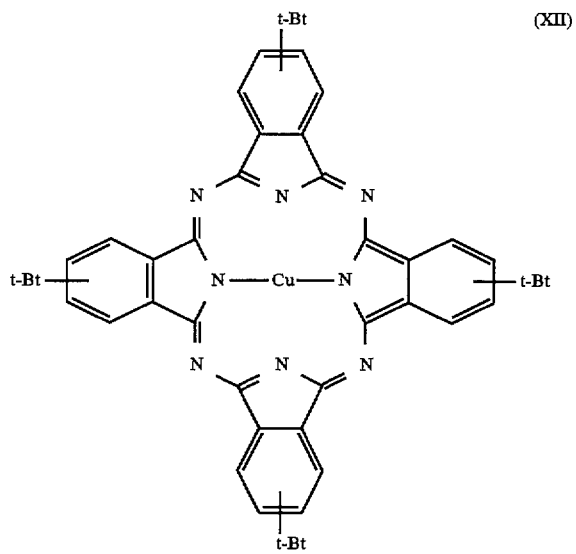

(XII)

The compound is a mixture having t-Bu groups in the formula located at both 2–2''' and 3–3''' positions.

The recording media of Examples 1–6 and Comparative Example 1 were recorded through respective substrates under the recording conditions shown below. The recorded positions were then reproduced with a continuous laser beam for the measurement of C/N under the conditions shown below. Also measured was the reflectance. The results are shown in Table 3.

Recording Conditions:
Linear speed: 2.1 m/sec
Recording frequency: 1.25 MHz
Laser oscillation wave length: 680 nm
Pickup lens: N. A. 0.5
Reproducing Conditions:
Scanning filter: 30 KHz
Band width
Reproduction power: 0.25–0.3 mW

TABLE 3

|  | Initial Value | | After Irradiation* | |
| --- | --- | --- | --- | --- |
|  | Reflectance (%) | C/N (dB) | Reflectance (%) | C/N (dB) |
| Example 1 | 26 | 49 | 25 | 49 |
| Example 2 | 25 | 48 | 24 | 48 |
| Example 3 | 27 | 48 | 27 | 48 |
| Example 4 | 26 | 48 | 26 | 48 |

TABLE 3-continued

|  | Initial Value | | After Irradiation* | |
| --- | --- | --- | --- | --- |
|  | Reflectance (%) | C/N (dB) | Reflectance (%) | C/N (dB) |
| Example 5 | 24 | 47 | 24 | 47 |
| Example 6 | 25 | 48 | 24 | 48 |
| Comparative Example 1 | 13 | 35 | 12 | 32 |

*after 150 hours irradiation with 10,000 lux tungsten light

Example 7

An injection-molded polycarbonate substrate having a thickness of 1.2 mm and having guide grooves having a depth of 1,000 Å, a half value width of 0.45 μm and a track pitch of 1.6 μm was applied with a solution of Compound No. 1 in Table 1 in a mixture of 2,2,2-trifluoroethanol/1,2-dichloroethane/2-methoxyethanol (=7/1.5/1.5 (weight ratio)) by spinner coating to form a recording layer having a thickness of 1,800 Å. The recording layer was overlaid with a reflecting layer of 1,100 Å by vacuum deposition of Au, on which an acrylate-series photopolymer was spinner-coated to form a protecting layer having a thickness of about 3 μm, thereby obtaining a recording medium of a CD-R type.

Examples 8–12

Example 7 was repeated in the same manner as described except that Compounds No. 2, No. 5, No. 6, No. 8 and No. 16 shown in Table 1 were each substituted for Compound No. 1, thereby obtaining recording media of Examples 8–12, respectively.

Comparative Example 2

Example 7 was repeated in the same manner as described except that the phthalocyanine compound used in Comparative Example 1 was substituted for Compound No. 1 shown in Table 1, thereby obtaining a recording medium of Comparative Example 2.

Comparative Example 3

Example 7 was repeated in the same manner as described except that a compound having the formula (XIII) shown below was substituted for Compound No. 1 shown in Table 1, thereby obtaining a recording medium of Comparative Example 3.

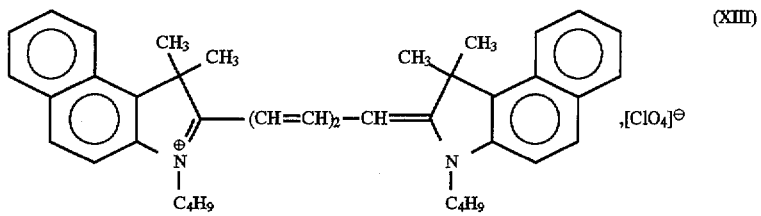

(XIII)

Comparative Example 4

Example 1 was repeated in the same manner as described except that the compound having the above formula (XIII) with which 10% by weight of a nickel complex of the following formula (XIV) was mixed was substituted for Compound No. 1 shown in Table 1, thereby obtaining a recording medium of Comparative Example 4.

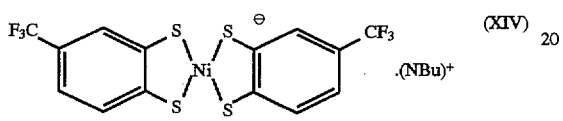

EFM signals were recorded with the recording media of Examples 8–12 and Comparative Examples 2–4 under the recording conditions involving a wave length of 790 nm and a linear speed of 1.4 m/sec for the measurement of reflectance and $C_1$ error counts before the recording and after irradiation with tungsten light. The results are shown in Table 4.

TABLE 4

| | Initial Value | | After Irradiation* | |
|---|---|---|---|---|
| | Reflectance (%) | $C_1$ error count | Reflectance (%) | $C_1$ error count |
| Example 7 | 71 | 2 | 71 | 2 |
| Example 8 | 71 | 3 | 71 | 3 |
| Example 9 | 68 | 6 | 68 | 7 |
| Example 10 | 70 | 5 | 70 | 7 |
| Example 11 | 71 | 2 | 70 | 5 |
| Example 12 | 70 | 2 | 70 | 4 |
| Comparative Example 2 | 31 | >1000 | 31 | >1000 |
| Comparative Example 3 | 72 | 3 | 40 | >3000 |
| Comparative Example 4 | 71 | 5 | 51 | >1000 |

*after 100 hours irradiation with 10,000 lux tungsten light

Preparation Example 1

Figure 3:
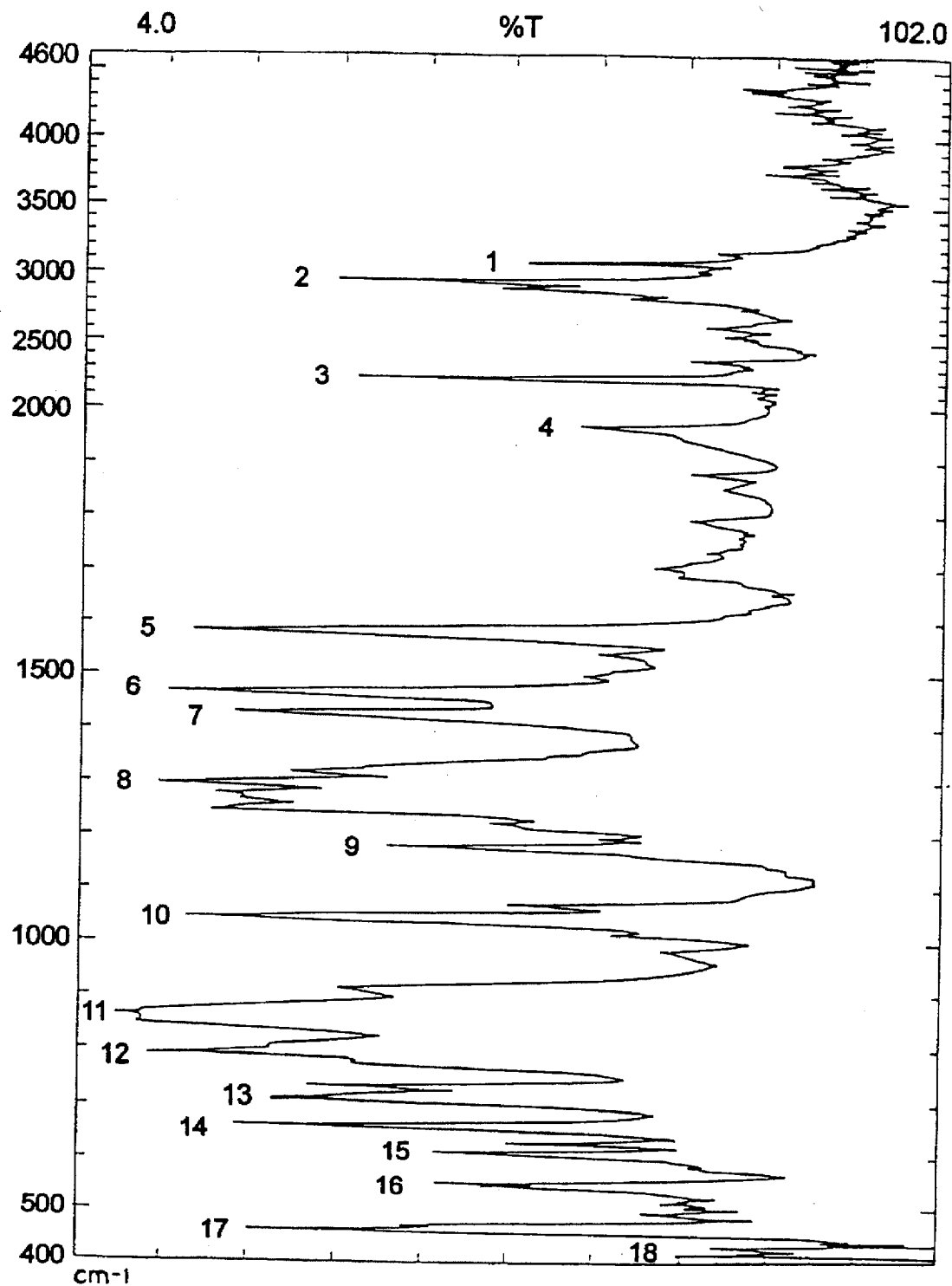
FIG. 3 is an IR spectrum of the phthalonitrile compound obtained in Preparation Example 1.

Preparation of Phthalonitrile:

In 180 ml of N,N-dimethylformamide were dissolved with heating 20 g of 3-hydroxyphthalonitrile and 10.55 g of potassium carbonate, to which 18 g of chloromethyltrimethyl-silane were added dropwise at 40° C. in the atmosphere of argon. After the addition, the mixture was stirred for 30 hours while maintaining the reaction temperature at 80°–90° C. The reaction vessel was then cooled to room temperature and 250 ml of dilute hydrochloric acid was added. The mixture was extracted with 1.2 liters of toluene. The organic layer was washed well with water and water was removed with magnesium sulfate. Thereafter, toluene was removed by distillation and the residue was purified with a toluene/silica gel column to obtain 23.3 g (yield: 73.0%) of a compound having the formula (XII) below. The compound is in the form of white crystals and has a melting point of 112.5° C. The IR spectrum of the compound is shown in FIG. 3.

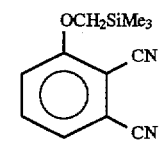

(XV)

Preparation Example 2

Preparation of Phthalonitrile:

In 180 ml of an N,N-dimethylacetamide/1-methyl-2-pyrrolidone (=1/1 volume ratio) mixed solvent were dissolved 30 g of 3-nitrophthalonitrile, to which 11.97 g of sodium nitrite were added. The mixture was stirred at 165° C. for 40 minutes. After being cooled to room temperature, the mixture was added with 16.8 g of potassium carbonate, which was further stirred at 150° C. for 40 minutes and thereafter cooled to 40° C. Then, 25 g of chloromethyltrimethylsilane were added dropwise. After the addition, the mixture was stirred for 28 hours while maintaining the reaction temperature at 80°–90° C. The reaction vessel was then cooled to room temperature and 350 ml of dilute hydrochloric acid was added. The mixture was extracted with 1.5 liters of toluene. The organic layer was washed well with water and water was removed with magnesium sulfate. Thereafter, toluene was removed by distillation and the residue was purified with a toluene/silica gel column to obtain 29.8 g (yield: 74.7%) of a compound having the above-described formula (XV).

Preparation Example 3

Preparation of Diiminoisoindoline:

To 180 ml of methanol were fed 20 g of a phthalonitrile represented by the formula (XV) and 14 g of sodium methoxide. The mixture was stirred at room temperature for 1 hour while blowing ammonia gas thereinto and, then, refluxed with heating for 3 hours with stirring while blowing ammonia gas thereinto. After being cooled to room temperature, the resulting mixture was concentrated as much as possible. The concentrate was dissolved in 700 ml of chloroform and was washed well with water and with hot water. Water in the organic layer was removed with magnesium sulfate and toluene was removed by distillation. The residue was recrystallized from hexane to obtain 19.7 g (yield: 91.7%) of a compound having the following formula (XVI).

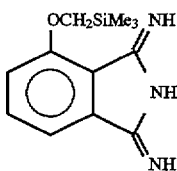

(XVI)

Preparation Example 4

Preparation of Phthalonitrile:

In 200 ml of N,N-dimethylformamide were dissolved with heating 20 g of 4-hydroxyphthalonitrile and 10.55 g of potassium carbonate, to which 20 g of chloroethyltrimethylsilane were added dropwise at 40° C. in the atmosphere of argon. Immediately after the addition, the mixture was stirred for 18 hours while maintaining the reaction temperature at 85°–105° C. The reaction vessel was then cooled to room temperature and 250 ml of dilute hydrochloric acid was added. The mixture was extracted with 1.2 liters of toluene. The organic layer was washed well with water and water was removed with magnesium sulfate. Thereafter, toluene was removed by distillation and the residue was purified with a toluene/silica gel column to obtain 24.6 g (yield: 77.0%) of a compound having the formula (XVII) below.

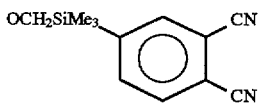

(XVII)

Preparation Example 5

Figure 4:
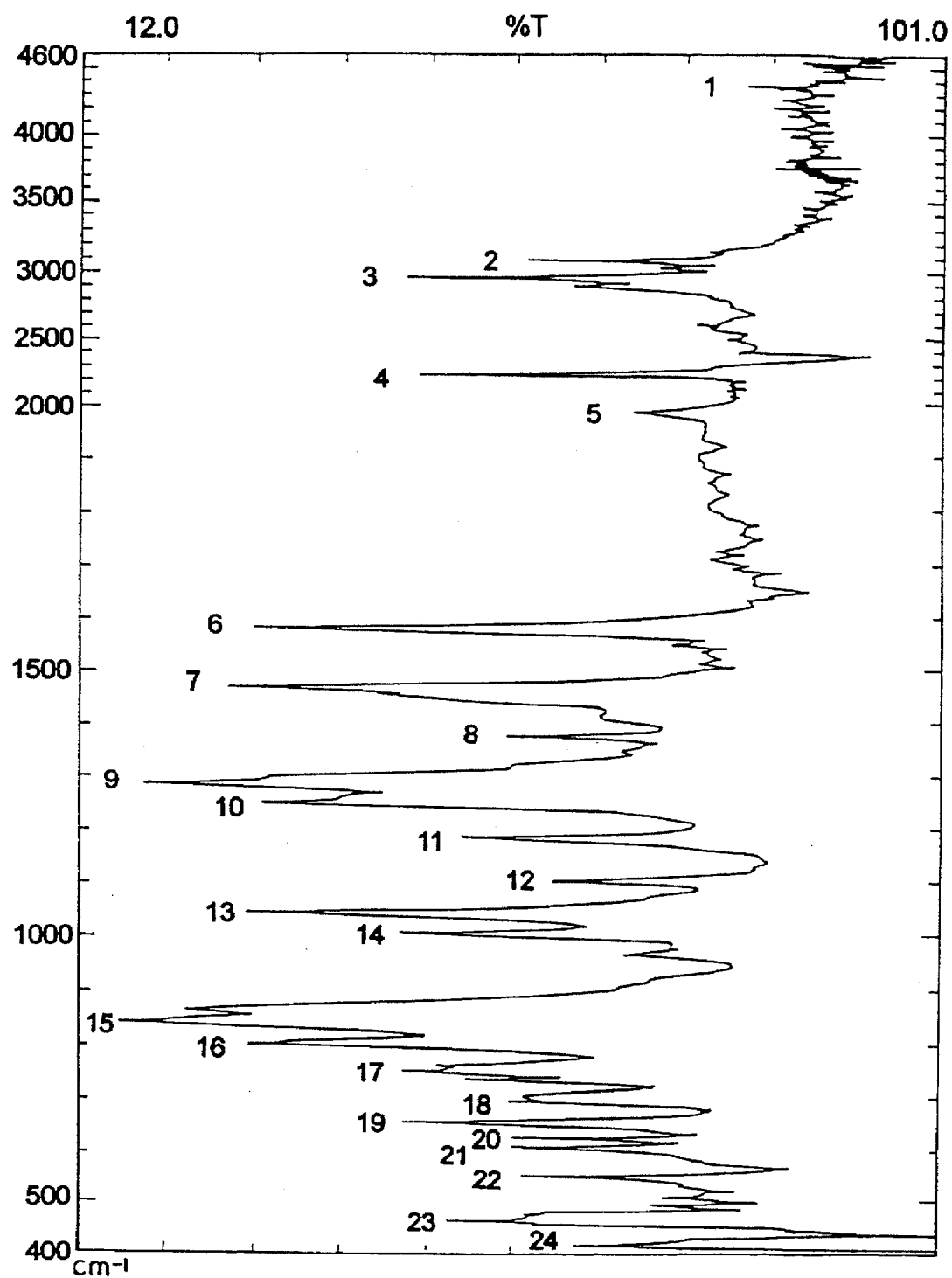
FIG. 4 is an IR spectrum of the phthalonitrile compound obtained in Preparation Example 5.

Preparation of Phthalonitrile:

In 200 ml of N,N-dimethylformamide were dissolved with heating 20 g of 3-hydroxyphthalonitrile and 10.55 g of potassium carbonate, to which 20 g of 1-chloroethyltrimethylsilane were added dropwise at 30° C. in the atmosphere of argon. Immediately after the addition, the mixture was stirred for 36 hours while maintaining the reaction temperature at 85°–100° C. The reaction vessel was then cooled to room temperature and 200 ml of dilute hydrochloric acid was added. The mixture was extracted with 1 liter of toluene. The organic layer was washed well with water and water was removed with magnesium sulfate. Thereafter, toluene was removed by distillation and the residue was purified with a toluene/silica gel column to obtain 16.9 g (yield: 49.9%) of a compound having the formula (XVIII) below. The compound is in the form of white crystals and has a melting point of 67.5° C. The IR spectrum of the compound is shown in FIG. 4.

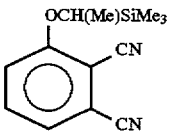

(XVIII)

Preparation Example 6

Figure 5:
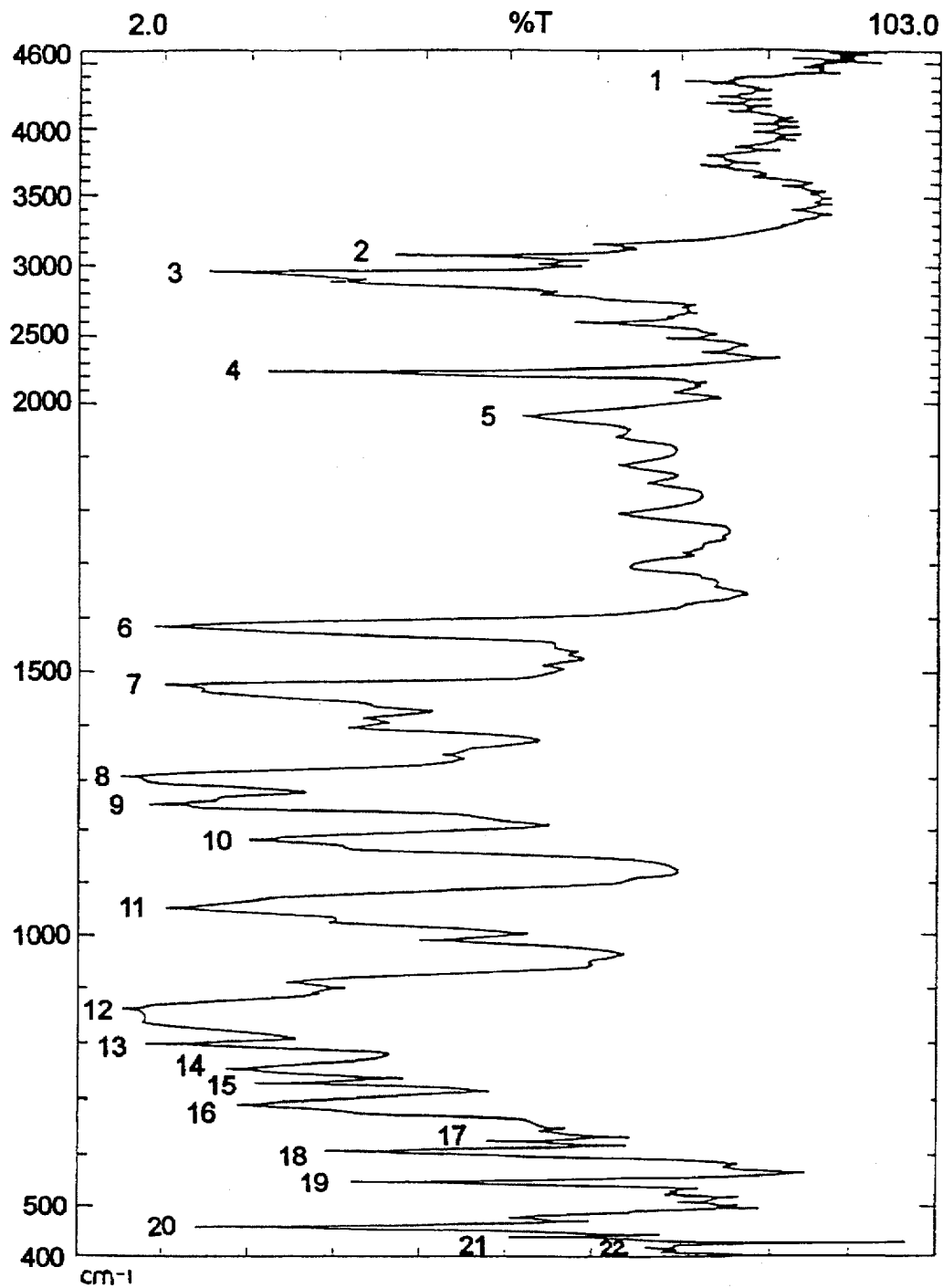

Preparation of Phthalonitrile:

In 150 ml of an N,N-dimethylacetamide/dimethylsulfoxide (=5/1 volume ratio) mixed solvent were dissolved 20 g of 3-hydroxyphthalonitrile and 10.55 g of potassium carbonate, to which 31.4 g of 3-chloropropyltrimethylsilane were added dropwise at 45° C. Immediately after the addition, the mixture was stirred for 24 hours while maintaining the reaction temperature at 90°–110° C. The reaction mixture was then cooled to room temperature and 180 ml of dilute hydrochloric acid was added. The mixture was extracted with 1.2 liters of toluene. The organic layer was washed well with water, followed by the removal of water with magnesium sulfate and the purification with a toluene/silica gel column, thereby to obtain 25.5 g (yield: 71.2%) of a compound having the following formula (XIX). The compound is in the form of white crystals and has a melting point of 145° C. The IR spectrum of the compound is shown in FIG. 5.

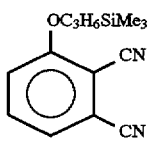

(XIX)

Comparative Example 5

In 60 ml of N,N-dimethylformamide were dissolved 20 g of trimethylsilylmethanol. This was maintained at 5° C. in a water bath and 4.6 g of sodium hydride were added thereto in the atmosphere of argon. The resulting mixture was stirred at 5° C. for 1 hour. Thereafter, 33.3 g of 3-nitrophthalonitrile dissolved in 160 ml of N,N-dimethylformamide were added dropwise to the mixture. After completion of the addition, the ice bath was removed and the mixture was stirred at room temperature for 24 hours. The reaction product was then added with 200 ml of dilute hydrochloric acid and extracted with 1 liter of toluene. The organic layer was washed well with water, followed by the removal of water with magnesium sulfate and the purification with a toluene/silica gel column. However, the desired compound shown by the above formula (XV) was hardly obtained. The yield was about 1% and 3-methoxyphthalonitrile as a by-product was yielded in an amount of several times that of the compound (XV).

Example 13

Preparation of Phthalocyanine:

In 32 g of hexanol were dissolved 10 g of the phthalonitrile of the formula (XV) with heating, to which 4 g of diazabicyclononene and 1.8 g of nickel chloride were successively added. The mixture was then stirred at 120°–130° C. for 24 hours in the atmosphere of argon. The reaction mixture was then cooled to room temperature and filtered to remove undissolved matters. After the removal of hexanol therefrom as much as possible, the filtrate was treated with a toluene/silica gel column to obtain 5.6 g (yield: 52.6%) of a mixture of compounds of the formulas (1A), (1B), (1C) and (1D) with a proportion of (1A)/(1B)/(1C)/(1D) of 30/48/22/0. This mixture showed $\lambda_{max}$ in chloroform of 700 nm.

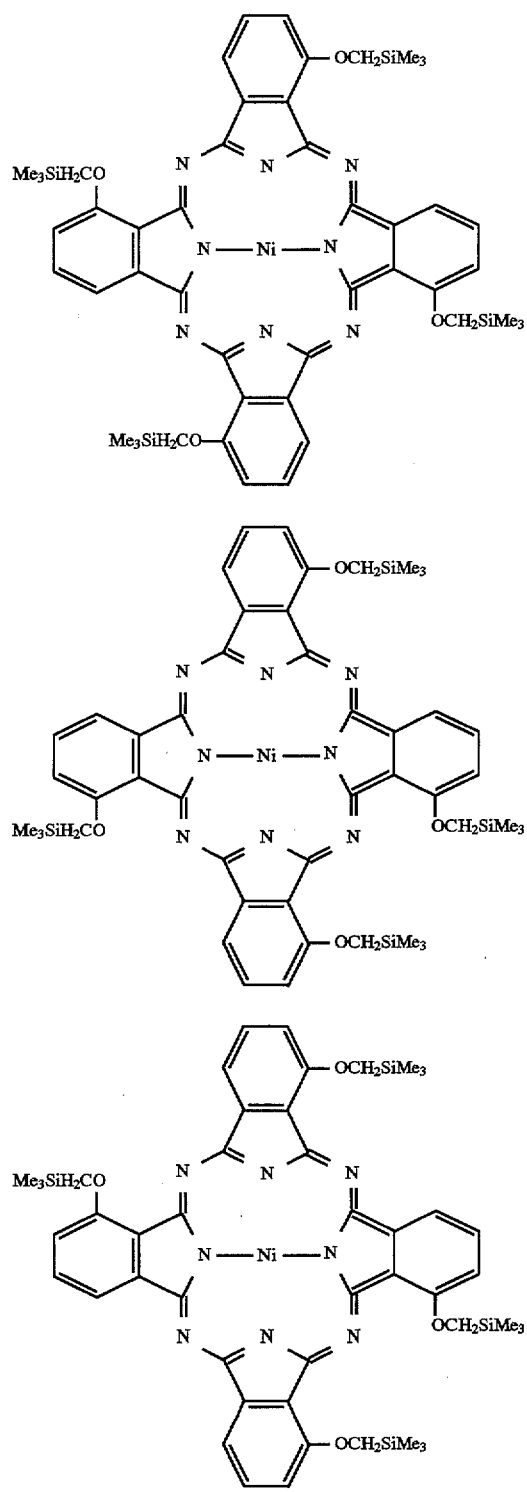

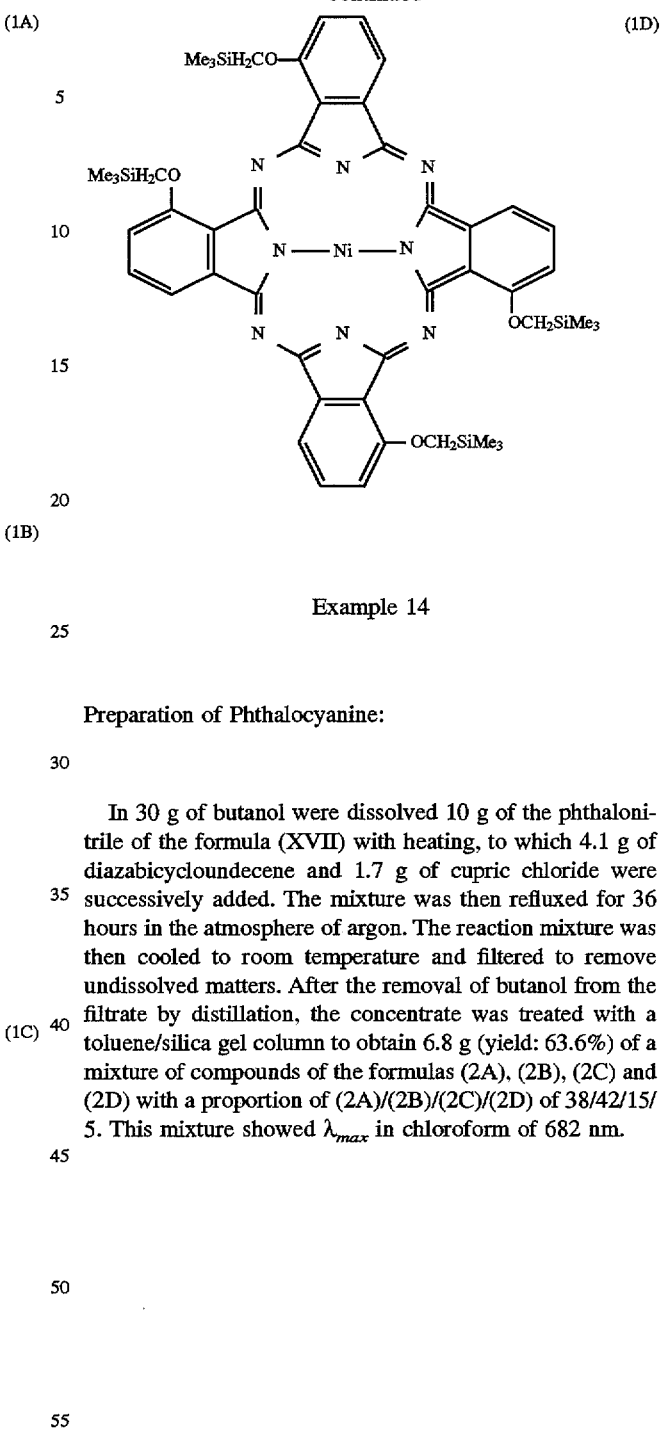

Example 14

Preparation of Phthalocyanine:

In 30 g of butanol were dissolved 10 g of the phthalonitrile of the formula (XVII) with heating, to which 4.1 g of diazabicycloundecene and 1.7 g of cupric chloride were successively added. The mixture was then refluxed for 36 hours in the atmosphere of argon. The reaction mixture was then cooled to room temperature and filtered to remove undissolved matters. After the removal of butanol from the filtrate by distillation, the concentrate was treated with a toluene/silica gel column to obtain 6.8 g (yield: 63.6%) of a mixture of compounds of the formulas (2A), (2B), (2C) and (2D) with a proportion of (2A)/(2B)/(2C)/(2D) of 38/42/15/5. This mixture showed $\lambda_{max}$ in chloroform of 682 nm.

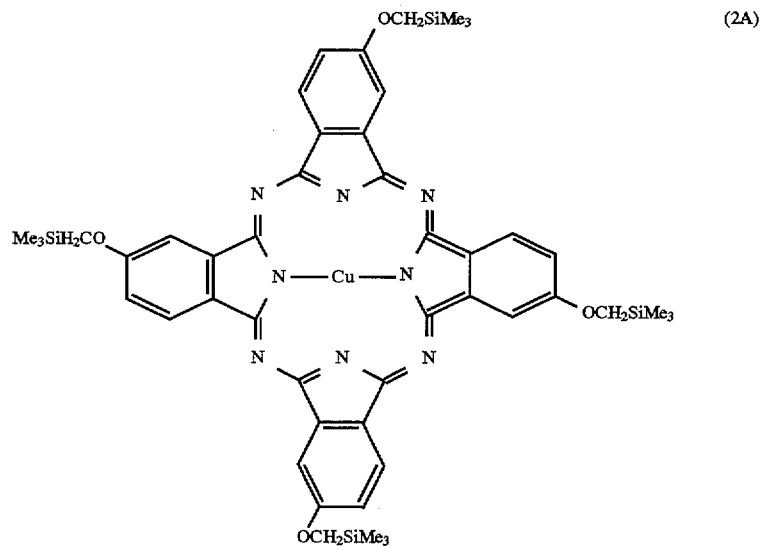
(2A)
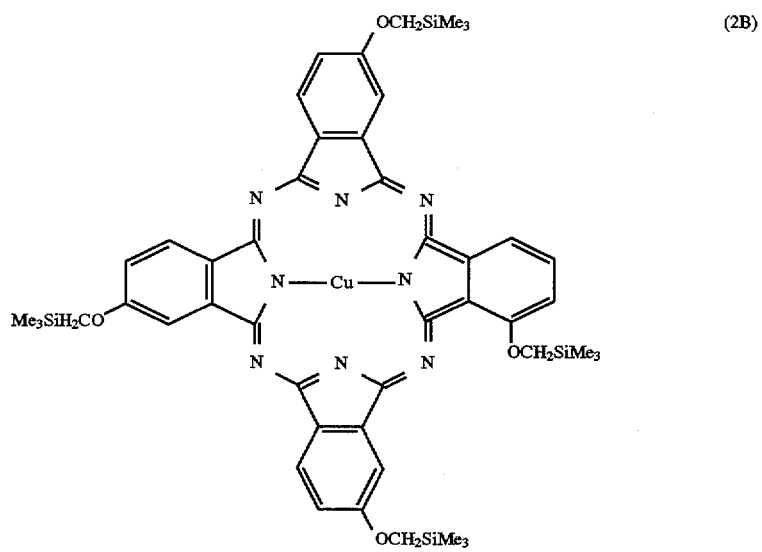
(2B)
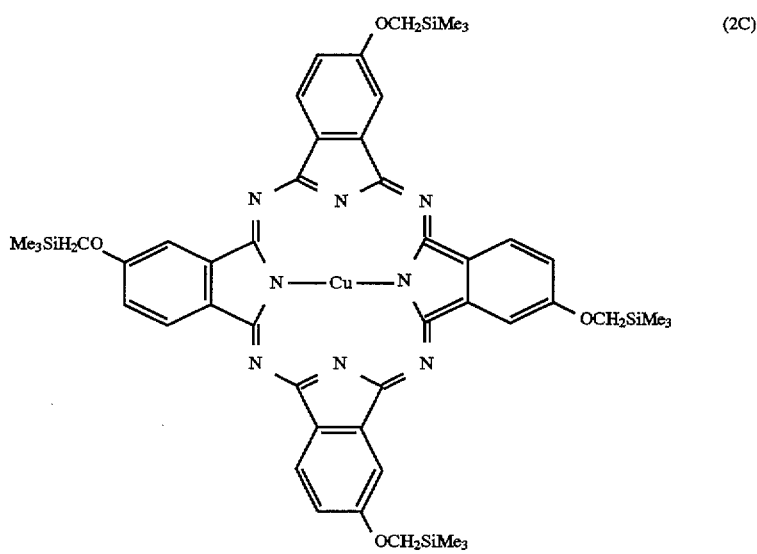
(2C)

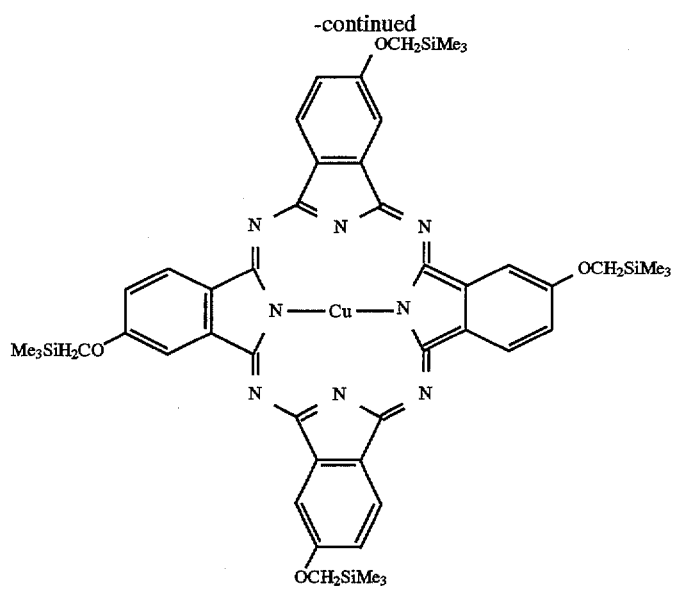

(2D)

Example 15

Preparation of Phthalocyanine:

In 30 g of n-amylalcohol were dissolved 10 g of the diiminoisoindoline of the formula (XVI) with heating, to which 2 g of palladium chloride were added. The mixture was then refluxed for 28 hours in the atmosphere of argon. The reaction mixture was then cooled to room temperature and filtered to remove undissolved matters. After the removal of amylalcohol therefrom, the filtrate was treated with a toluene/silica gel column to obtain 6.2 g (yield: 59.7%) of a mixture of compounds of the formulas (3A), (3B), (3C) and (3D) with a proportion of (3A)/(3B)/(3C)/(3D) of 40/40/20/0. This mixture showed $\lambda_{max}$ in chloroform of 693 nm.

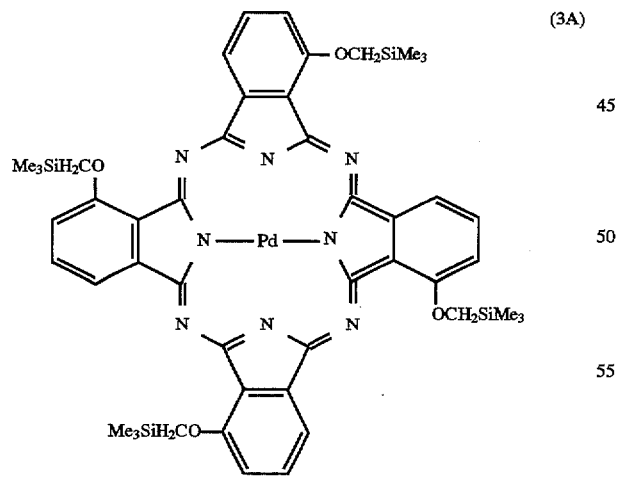

(3A)

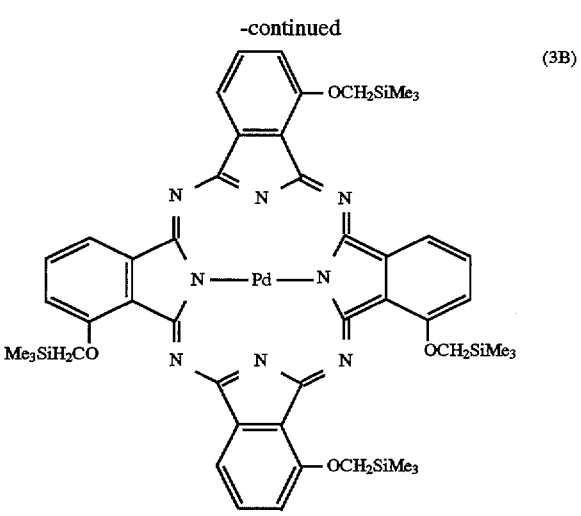

(3B)

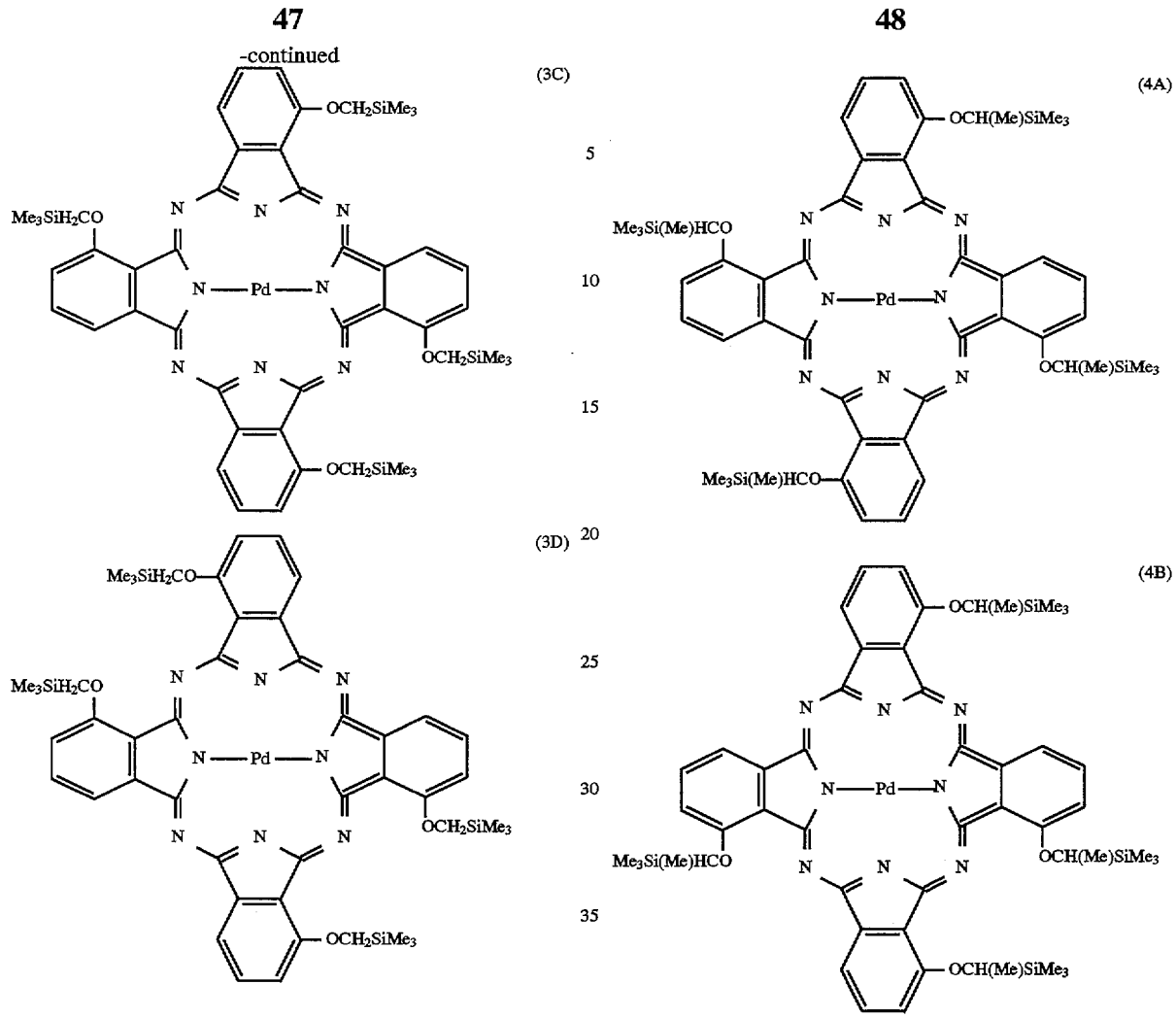

Example 16

Preparation of Phthalocyanine:

In 25 g of n-amylalcohol were dissolved 10 g of the phthalonitrile of the formula (XVIII) with heating, to which 4.5 g of diazabicycloundecene and 2.3 g of palladium chloride were successively added. The mixture was then stirred at 120–°125° C. for 32 hours in the atmosphere of argon. The reaction mixture was then cooled to room temperature and filtered to remove undissolved matters. After the removal of amylalcohol therefrom, the filtrate was treated with a toluene/silica gel column to obtain 4.8 g (yield: 43.3 of a mixture of compounds of the formulas (4A), (4B), (4C) and (4D) with a proportion of (4A)/(4B)/(4C)/(4D) of 10/80/10/0. This mixture showed $\lambda_{max}$ in chloroform of 699 nm.

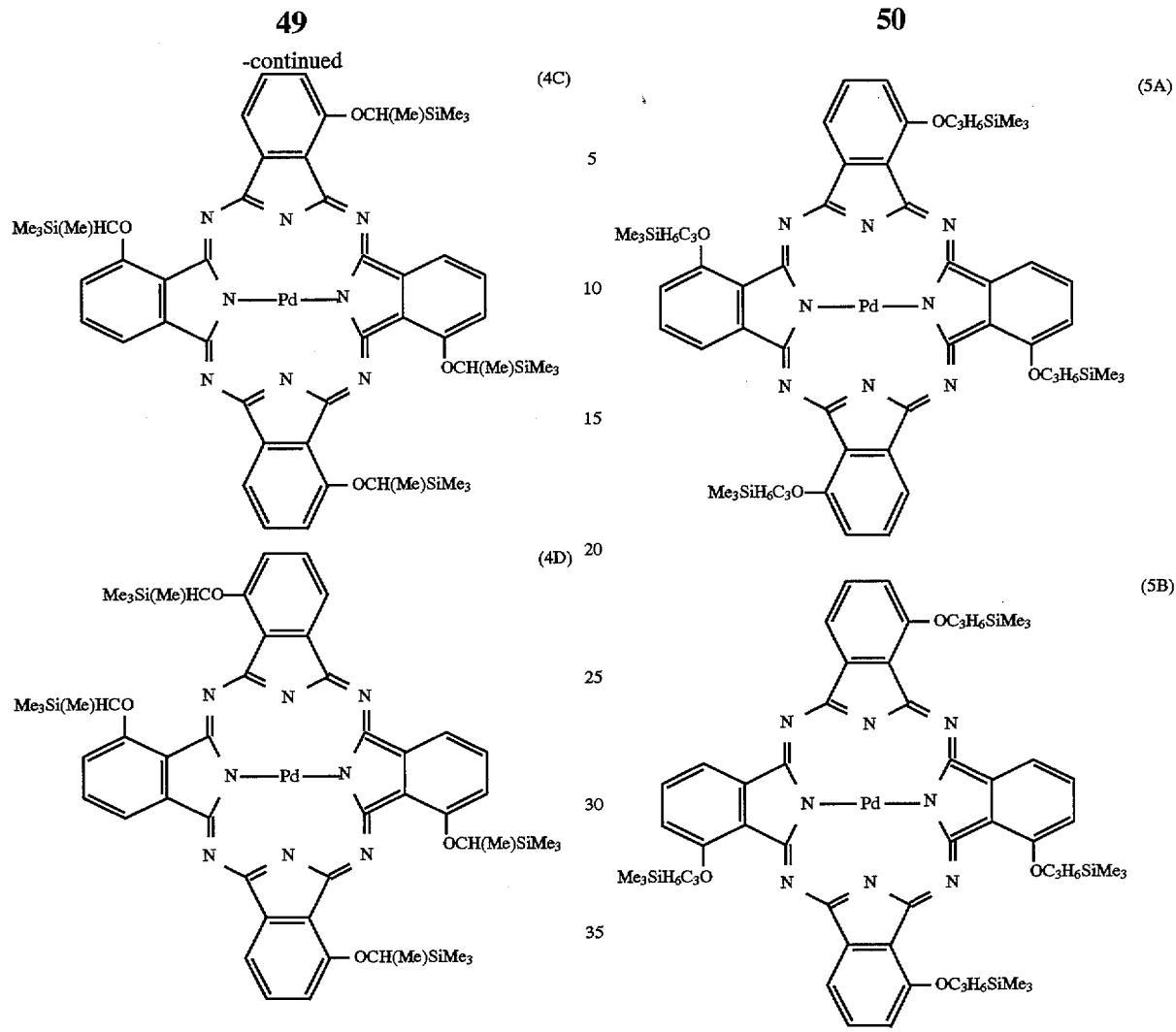

Example 17

Preparation of Phthalocyanine:

In 40 g of n-amylalcohol were dissolved 10 g of the phthalonitrile of the formula (XIX) with heating, to which 4 g of diazabicycloundecene and 2 g of palladium chloride were successively added. The mixture was then stirred at 115°–130° C. for 27 hours in the atmosphere of argon. The reaction mixture was then cooled to room temperature and filtered to remove undissolved matters. After the removal of amylalcohol therefrom, the filtrate was treated with a toluene/chloroform (1/1 (volume ratio))/silica gel column to obtain 5.8 g (yield: 52.6%) of a mixture of compounds of the formulas (5A), (5B), (5C) and (5D) with a proportion of (5A)/(5B)/(5C)/(5D) of 20/80/0/0. This mixture showed $\lambda_{max}$ in chloroform of 691 nm.

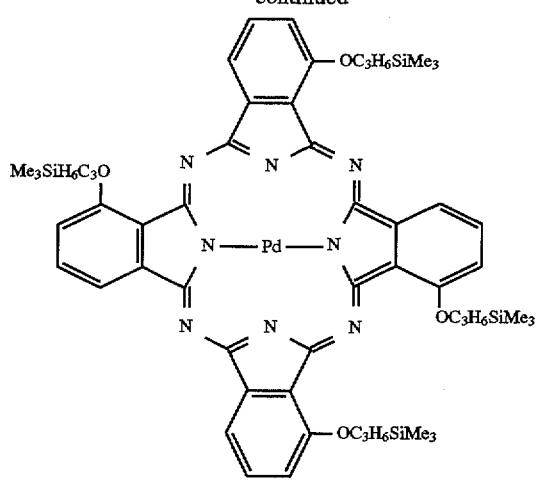

(5C)

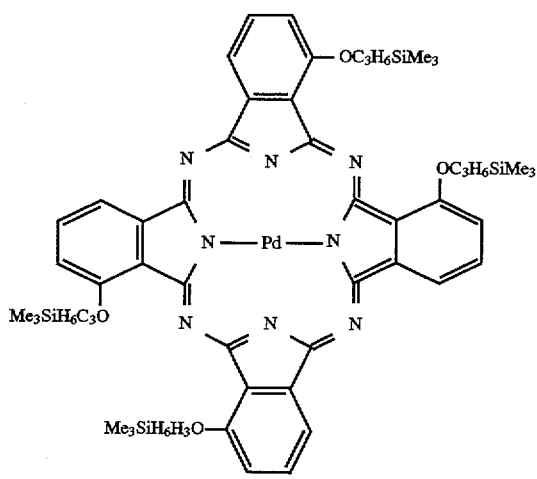

(5D)

Example 18

Halogenation of Phthalocyanine:

The mixture of phthalocyanines obtained in Example 15 was dissolved in a mixed solvent containing dichloromethane and water, to which bromine was added. The mixture was heated at 40°–60° C. After cooling, the organic layer was concentrated to obtain a mixture of compounds of the formulas (6A), (6B), (6C) and (6D) with a proportion of (6A)/(6B)/(6C)/(6D) of 40/40/20/0. The $\lambda_{max}$ of this mixture in chloroform was found to be shifted to a long wave length side of 707 nm. The phthalocyanine mixtures obtained in Examples 13, 14, 16 and 17 may also be halogenated.

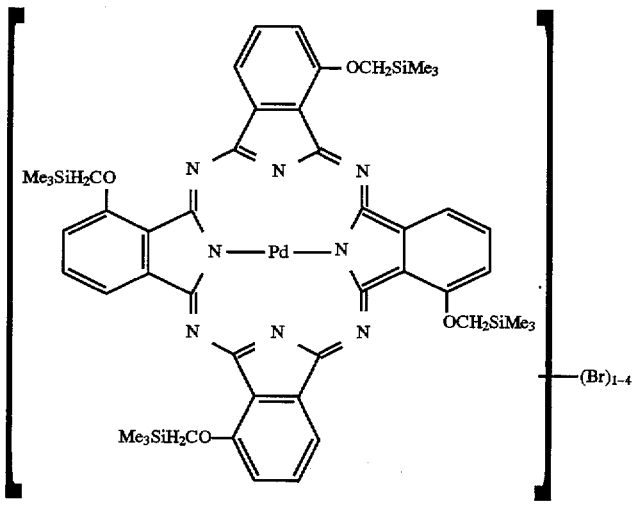

(6A)

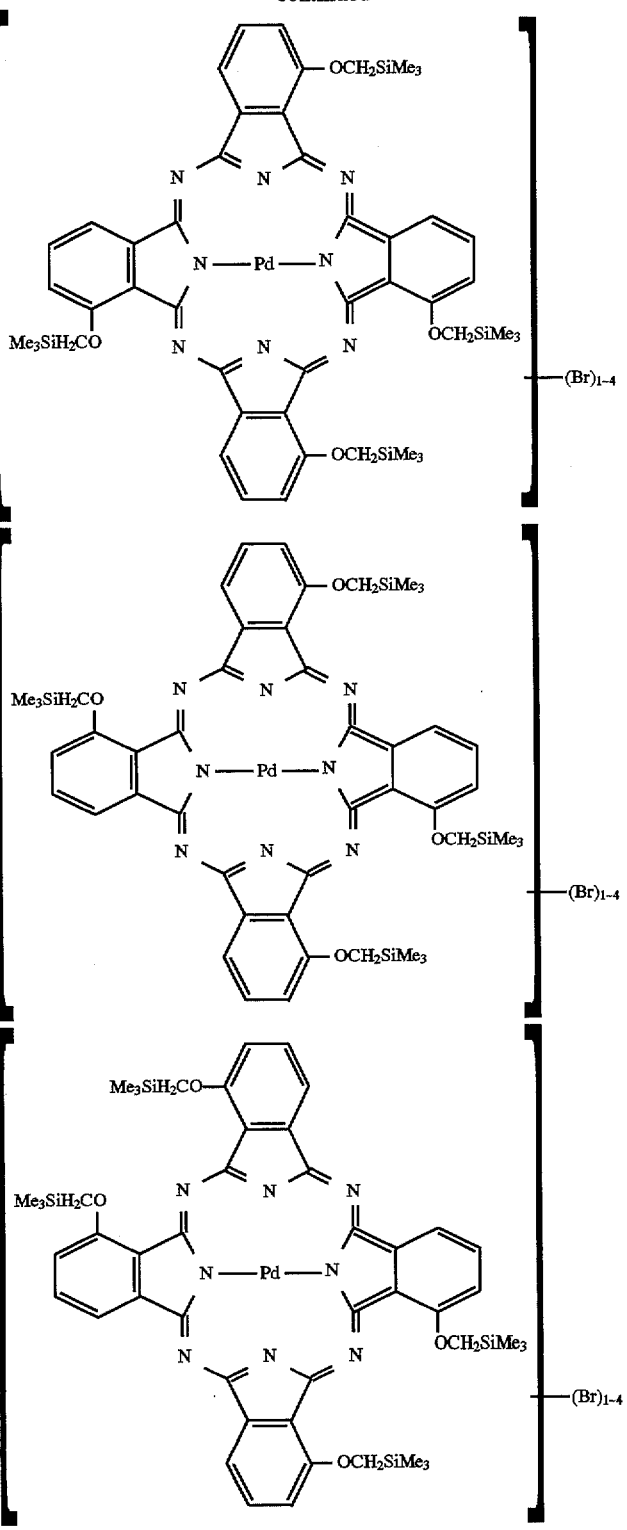
Examples of phthalonitriles and diiminoisoindolines other than those obtained in Preparation Examples 1–6 are shown in Table 5.

TABLE 5

| Compound No. | X |
|---|---|
| 51 | —OC$_2$H$_4$SiMe$_3$ |
| 52 | —OCH(Et)SiMe$_3$ |
| 53 | —OCH(Pr)SiMe$_3$ |
| 54 | —OCH(iPr)SiMe$_3$ |
| 55 | —OCH(Bu)SiMe$_3$ |
| 56 | —OCH$_2$Si(Me)$_2$H |
| 57 | —OCH$_2$Si(Me)$_2$C$_4$H$_9$ |
| 58 | —OCH(SiMe$_3$)SiMe$_3$ |
| 59 | —OC$_3$H$_6$Si(Me)[(C$_2$)$_2$(CH$_3$)]$_2$ |
| 60 | —OCH$_2$Si(Me)$_2$CH=CH$_2$ |
| 61 | —OCH$_2$OCH$_2$Si(Me)$_3$ |
| 62 | —OCH$_2$Si(OMe)$_3$ |

Evaluation:

The phthalocyanine compounds obtained in Examples 13–17 are soluble in various solvents and able to easily give coatings by solvent coating methods. Additionally, the compounds show excellent absorption power in a near infrared region.

Example 19

Guide grooves having a depth of 1,000 Å, a half value width of 0.4 μm and a track pitch of 1.4 μm were formed on a poly(methyl acrylate) plate having a thickness of 1.2 mm using a photopolymer, thereby obtaining a substrate. A solution of the mixture of the above formulas (6A)–(6D) in 1,2-dichloroethane was applied on the substrate by spinner coating to form a recording layer having a thickness of 1,000 Å, thereby obtaining a recording medium of a tracking type.

Examples 20–23

Example 19 was repeated in the same manner as described except that Compounds No. 25, No. 28, No. 29 and No. 36 shown in Table 2 were each substituted for the mixture of the formulas (6A)–(6D), thereby obtaining recording media of Examples 20–23, respectively.

Comparative Example 6

Example 19 was repeated in the same manner as described except that a phthalocyanine compound having the formula (XX) shown below was substituted for the mixture of the formulas (6A)–(6D), thereby obtaining a recording medium of Comparative Example 6.

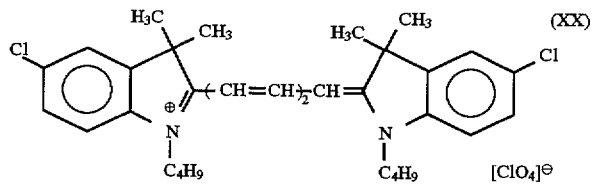

The recording media of Examples 19–23 and Comparative Example 6 were recorded through respective substrates under the recording conditions shown below. The recorded positions were then reproduced with a continuous laser beam for the measurement of C/N under the conditions shown below. Also measured was the reflectance. The results are shown in Table 6.

Recording Conditions:
Linear speed: 2.1 m/sec
Recording frequency: 1.25 MHz
Laser oscillation wave length: 680 nm
Pickup lens: N.A. 0.5
Reproducing Conditions:
Scanning filter: 30 KHz
Band width
Reproduction power: 0.25–0.3 mW

TABLE 6

| | Initial Value | | After Irradiation* | |
|---|---|---|---|---|
| | Reflectance (%) | C/N (dB) | Reflectance (%) | C/N (dB) |
| Example 19 | 25 | 48 | 25 | 48 |
| Example 20 | 24 | 47 | 24 | 47 |
| Example 21 | 23 | 48 | 23 | 48 |
| Example 22 | 24 | 47 | 24 | 47 |
| Example 23 | 25 | 49 | 25 | 49 |
| Comparative Example 6 | 27 | 49 | 9 | 32 |

*after 150 hours irradiation with 10,000 lux tungsten light

Example 24

An injection-molded polycarbonate substrate having a thickness of 1.2 mm and having guide grooves having a depth of 1,000 Å, a half value width of 0.45 μm and a track pitch of 1.6 μm was applied with a solution of the mixture of the above formulas (6A)–(6D) in a mixed solvent of ethylcellosolve/THF by spinner coating to form a recording layer having a thickness of 1,800 Å. The recording layer was overlaid with a reflecting layer of 1,100 Å by vacuum deposition of Au, on which an acrylate-series photopolymer was spinner-coated to form a protecting layer having a thickness of about 6 μm, thereby obtaining a recording medium of a CD-R type.

Examples 25–28

Example 24 was repeated in the same manner as described except that Compounds No. 25, No. 26, No. 36 and 38 shown in Table 2 were each substituted for the mixture of the formulas (6A)–(6D), thereby obtaining recording media of Examples 25–28, respectively.

Comparative Example 7

Example 24 was repeated in the same manner as described except that the a ⅔ mixture of brominated alkoxyphthalocyanine isomers shown in the following formulas (7A) and (7B) was substituted for the mixture of the formulas (6A)–(6D), thereby obtaining a recording medium of Comparative Example 7.

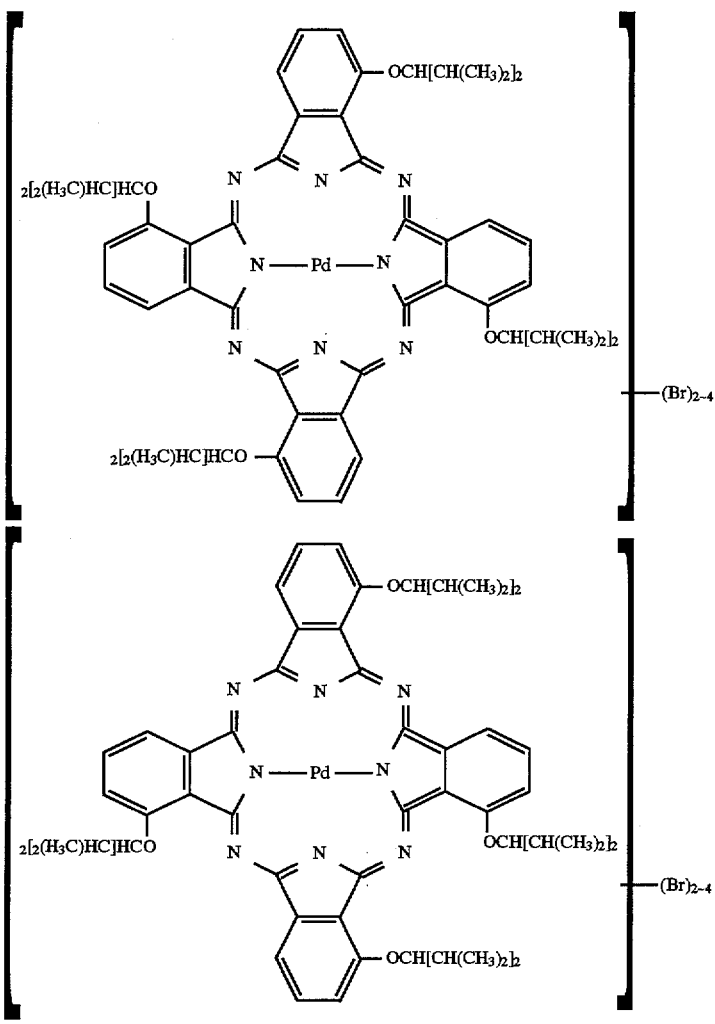
(7A)
(7B)
Comparative Example 8
Example 24 was repeated in the same manner as described except that the a ⅖ mixture of brominated alkoxyphthalocyanine isomers shown in the following formulas (7C) and (7D) was substituted for the mixture of the formulas (6A)–(6D), thereby obtaining a recording medium of Comparative Example 8.
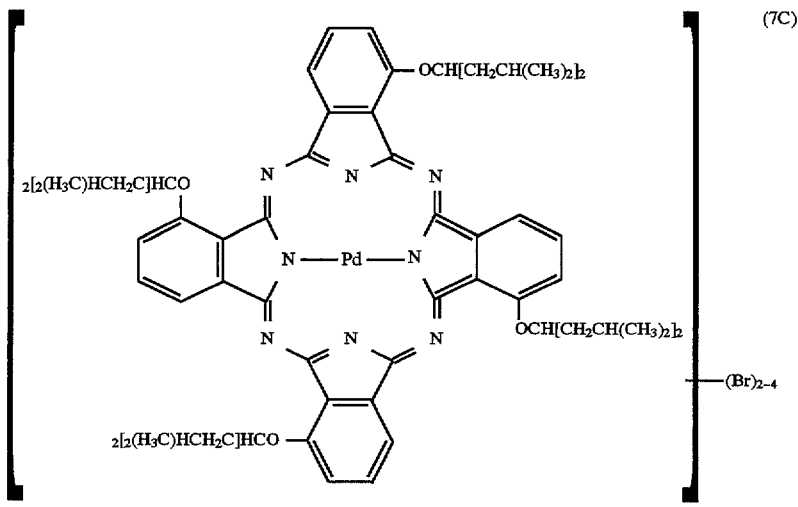
(7C)

-continued

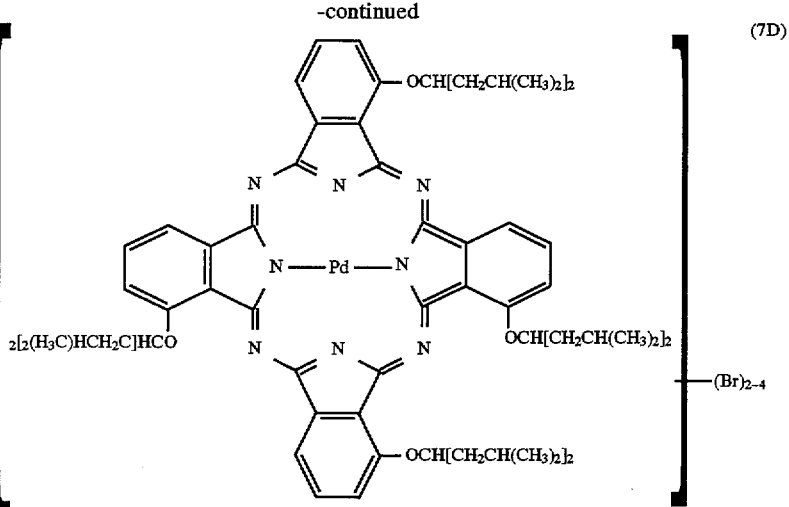

(7D)

EFM signals were recorded with the recording media of Examples 24–28 and Comparative Examples 7–8 under the recording conditions involving a wave length of 790 nm and a linear speed of 1.4 m/sec for the measurement of $C_1$ errors at the optimum recording power $P_0$ and at 0.82×(optimum recording power) as well as $C_1$ error counts at $P_0$ after 700 hours irradiation at 75,000 Lux. The results are shown in Table 7.

TABLE 7

|  | Initial Value | | After Irradiation* | |
| --- | --- | --- | --- | --- |
|  | $C_1$ error count at $P_0$ | $C_1$ error count at 0.82 × $P_0$ | $C_1$ error count at $P_0$ | $C_1$ error count at 0.82 × $P_0$ |
| Example 24 | 2 | 7 | 5 | 32 |
| Example 25 | 3 | 8 | 6 | 21 |
| Example 26 | 1 | 5 | 3 | 18 |
| Example 27 | 5 | 10 | 10 | 19 |
| Example 28 | 1 | 6 | 2 | 30 |
| Comparative Example 7 | 2 | 68 | 150 | >500 |
| Comparative Example 8 | 3 | 75 | 360 | >1000 |

*after 700 hours irradiation with 75,000 lux

Preparation Example 7

Figure 6:
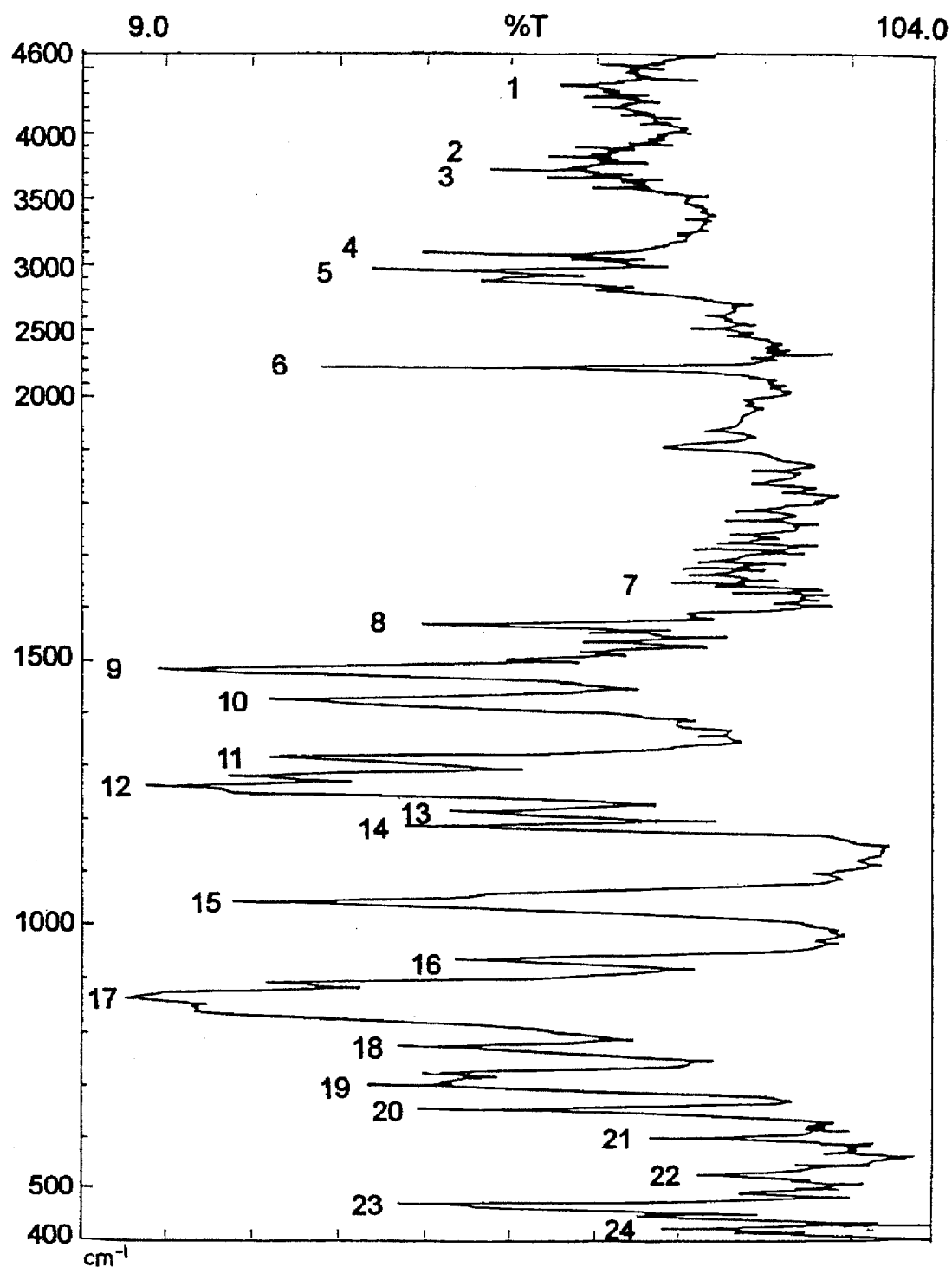
FIG. 6 is an IR spectrum of the phthalonitrile compound obtained in Preparation Example 7.
Figure 7:
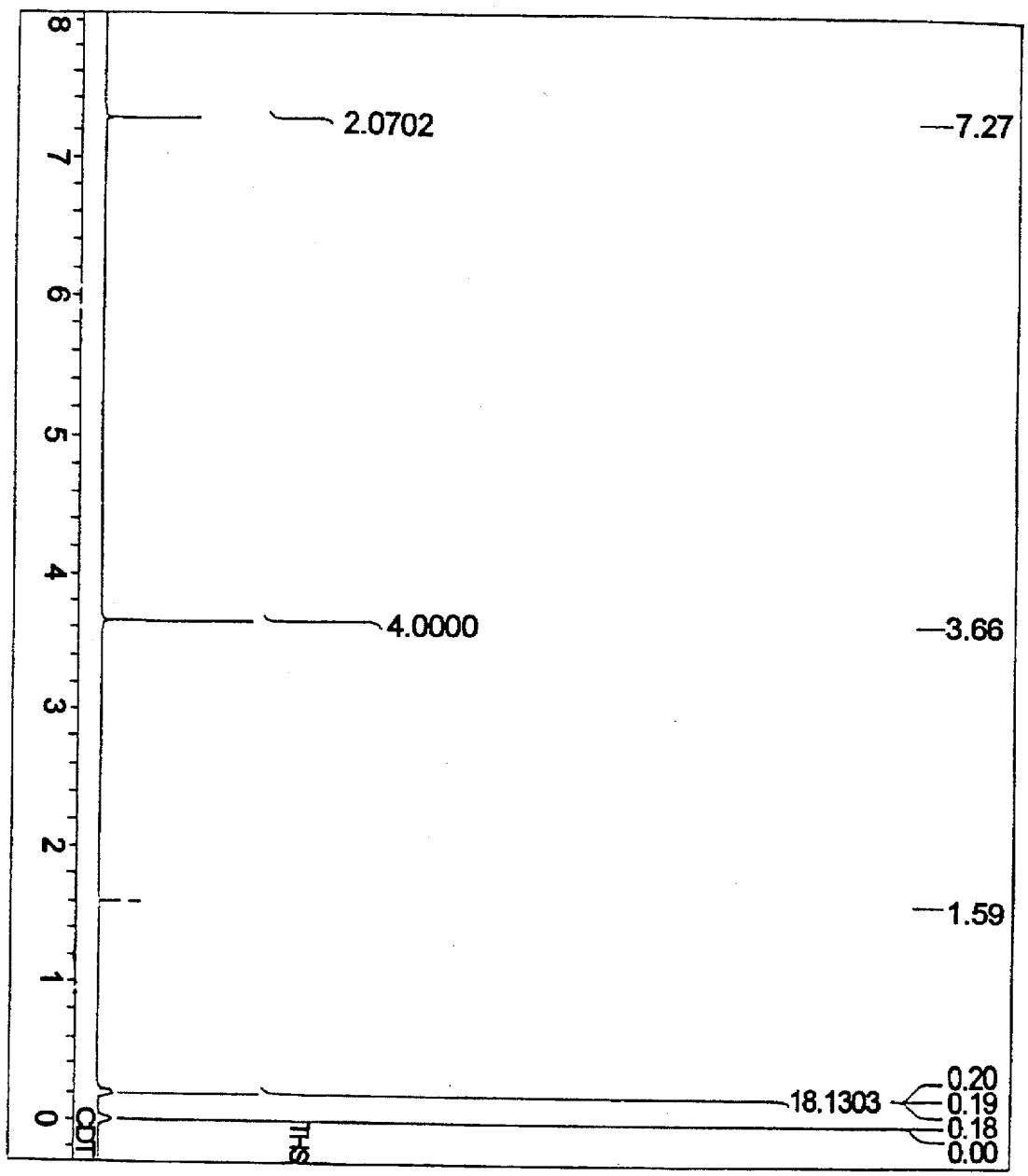
FIG. 7 is an NMR spectrum of the phthalonitrile compound obtained in Preparation Example 7.

Preparation of Phthalonitrile:

In 200 ml of N,N-dimethylformamide were dissolved with heating 30 g (0.1875 mole) of 2,3-dicyanohydroquinone and 25.91 g (0.1875 mole) of potassium carbonate, to which 50.5 g (0.4125 mole) of chloromethyltrimethylsilane were added dropwise at 40° C. in the atmosphere of argon. After the addition, the mixture was stirred for 30 hours while maintaining the reaction temperature at 80°–90° C. The reaction vessel was then cooled to room temperature and 300 ml of dilute hydrochloric acid was added. The mixture was extracted with 1.5 liters of chloroform. The organic layer was washed well with water and water was removed with magnesium sulfate. Thereafter, chloroform was removed by distillation and the residue was purified with a toluene/silica gel column to obtain 52.8 g (yield: 84.8%) of a compound having the formula (XXI) below. The compound is in the form of white crystals and has a melting point of 143°–144° C. The IR spectrum and NMR spectrum of the compound are shown in FIGS. 6 and 7, respectively.

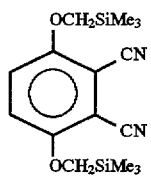

(XXI)

The above reaction was performed using each of ClC(CH$_3$)HSiMe$_3$, ClCH$_2$SiMe$_2$H and ClCH$_2$CH$_2$CH$_2$SiMe$_3$ in place of chloromethylsilane, thereby obtaining corresponding substituted phthalonitriles.

Preparation Example 8

Figure 8:
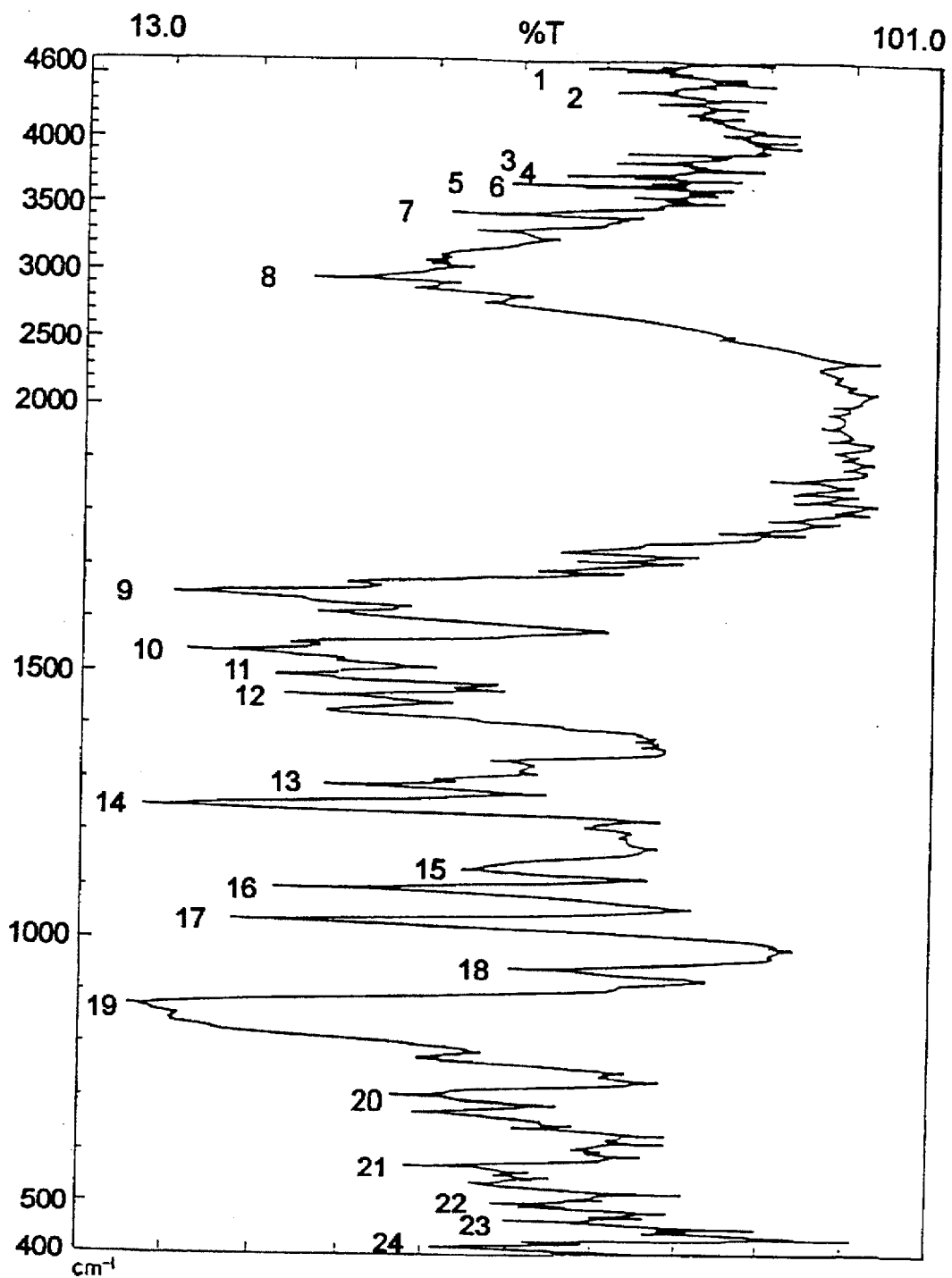
FIG. 8 is an IR spectrum of the phthalonitrile compound obtained in Preparation Example 8.

Preparation of Diiminoisoindoline:

To 180 ml of n-butanol were fed 21 g (0.06325 mole) of a phthalonitrile represented by the formula (XXI) and 8.54 g (0.1581 mole) of sodium methoxide. The mixture was stirred at room temperature for 1 hour while blowing NH$_3$ gas thereinto and, then, stirred with heating at 70°–80° C. for 3 hours (while blowing NH$_3$ gas). After being cooled to room temperature, n-BuOH was removed by distillation. The concentrate was dissolved in 800 ml of chloroform and was washed well with water and with hot water. Water in the organic layer was removed with magnesium sulfate and chloroform was removed by distillation. The residue was recrystallized from hexane to obtain 21 g (yield: 95.1%) of a compound having the following formula (XXII). The compound is in the form of light yellow crystals and shows no melting point and a decomposition point of 205° C. The IR spectrum of this compound is shown in FIG. 8.

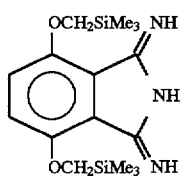

(XXII)

Example 29

Figure 9:
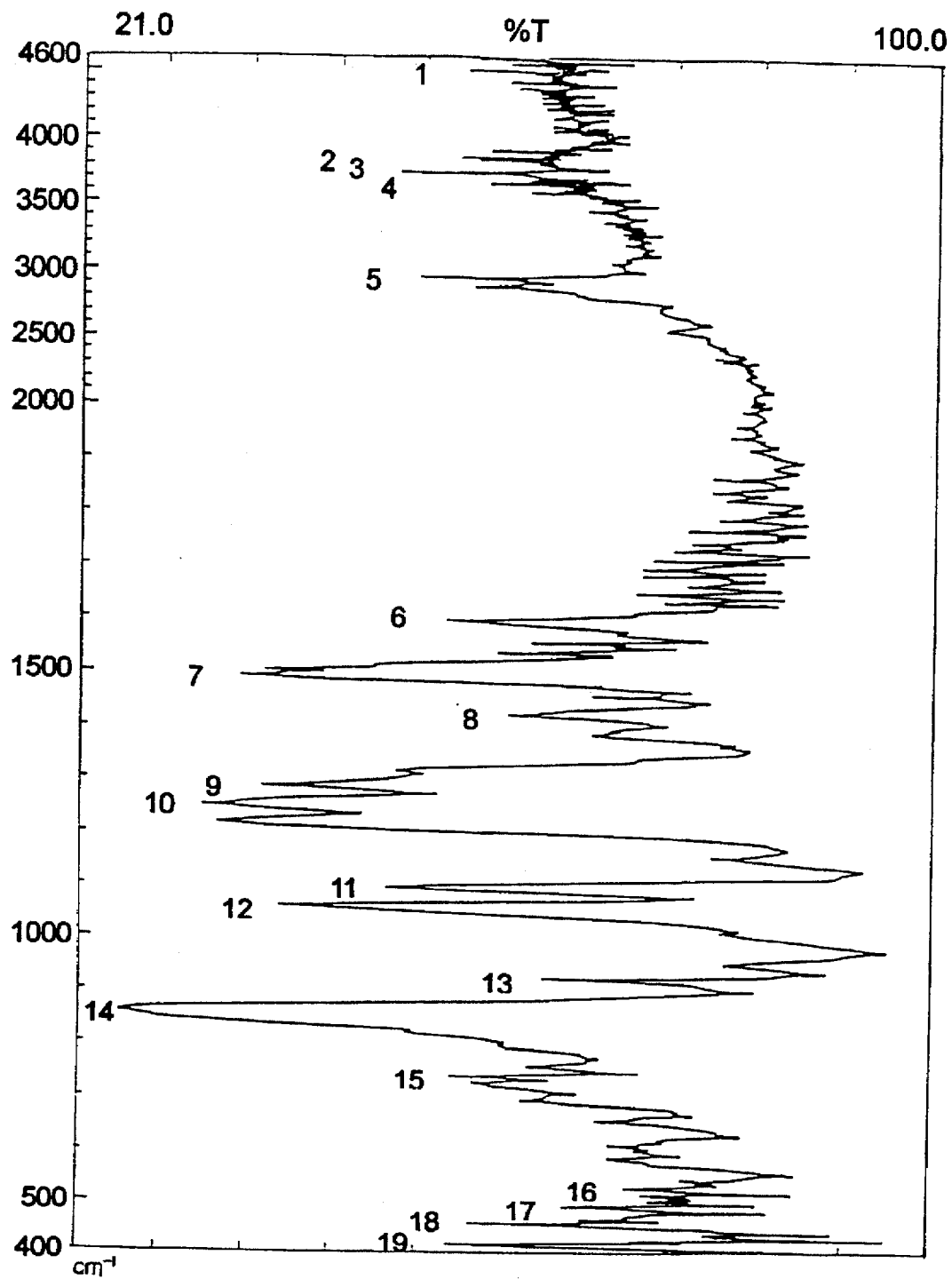
FIG. 9 is an IR spectrum of The phthalonitrile compound obtained in Example 29.

Preparation of Phthalocyanine:

In 20 g of n-amylalcohol were dissolved 10 g (0.02865 mole) of the diiminoisoindoline of the formula (XXXII) and 4.36 g (0.02863 mole) of diazabicycloundecene, to which 0.92 g (0.0071 mole) of nickel chloride was added. The mixture was then heated under reflux for 30 hours. The reaction mixture was then cooled to room temperature and poured into 120 ml of methanol. The crystals thus precipitated were washed with a small amount of methanol and the resulting crystals were purified with a chloroform/THF (=9/1 (weight ratio))/silica gel column to obtain 2.1 g (yield: 25.2%) of a phthalocyanine compound of the formula (XXIII) below. This compound showed $_{max}$ in toluene of 749 nm and logC- of 5.10. The IR spectrum of this compound is shown in FIG. 9.

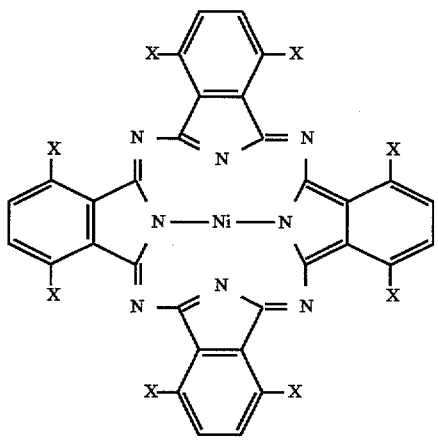

(XXIII)

Example 30

Figure 10:
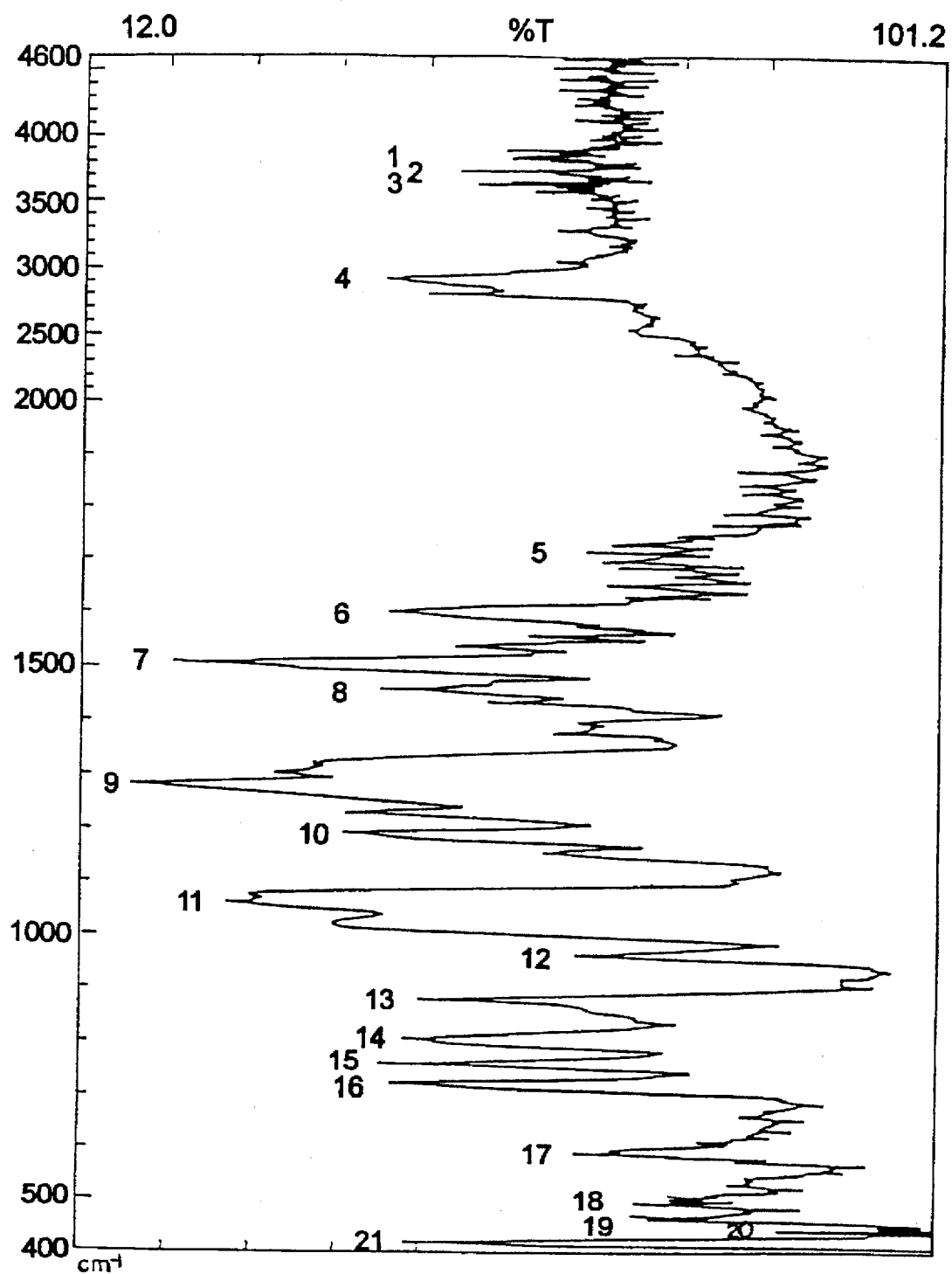
FIG. 10 is an IR spectrum of the metal-free phthalonitrile compound obtained in Example 30.

Preparation of Metal-Free Phthalocyanine:

In 40 g of n-amylalcohol were dissolved 10 g (0.03 mole) of a phthalonitrile represented by the formula (XXI) and 1.63 g (0.03 mole) of sodium methoxide. The mixture was heated reacted under reflux for 3 hours. The reaction mixture was then cooled to room temperature and poured into 200 ml of 1/1 water/methanol. The crystals thus precipitated were washed with a small amount of methanol and the resulting crystals were purified with a chloroform/THF (=9/1 (weight ratio))/silica gel column to obtain 30 g (yield: 36.0%) of a phthalocyanine compound of the formula (XXIV) below. This compound showed max in toluene of 754 (728) nm and logC- of 4.97 (4.91). The IR spectrum of this compound is shown in FIG. 10.

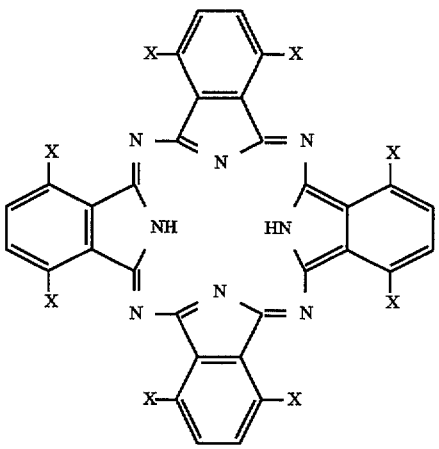

(XXIV)

In the formula, X represents a —$OCH_2SiMe_3$ group.

Evaluation:

The phthalocyanine compounds obtained in Examples 29–30 are soluble in various solvents. Specifically, the compounds are dissolved in halogen-series solvents in an amount of 1% by weight or more, in cellosolve-series solvent and in toluene in an amount of 0.5% by weight or more, and in tetrahydrofuran in an amount of about 1% by weight. These compounds were able to give coatings by solvent coating methods.

INDUSTRIAL APPLICABILITY:

The optical information recording medium according to the present invention, which contains a phthalocyanine compound having the above-described structure, exhibits the following excellent effects and has extremely high industrial applicability:

1) Because of strong light absorptivity and light reflectivity in a wave length of 630–700 nm, the recording medium is applicable for the pick up with a laser of 630–700 nm, permitting high density recording and can achieve such a high density recording as to provide 1.6–1.7 times as high recording density as that attained by currently employed recording media which are adapted to 780–810 nm.

2) Because of a high index of refraction at a wave length of 770–830 nm and of high stability, a CD-R recording medium having high reflectance, excellent storage stability and excellent reproduction stability can be provided.

The phthalocyanine near infrared absorbing material according to the present invention contains a sterically bulky silyl substituent on the ring, so that it is soluble in various organic solvents and yet exhibits high near infrared ray absorbing power while retaining a stability to heat and light which is inherent to phthalocyanine compounds. Therefore, it permits the formation of coatings by a solvent coating method and the utilization in wide variety manners. In particular, it is useful for an optical recording medium.

We claim:

1. An optical information recording medium comprising a substrate, a recording layer provided directly or through a primer layer on said substrate, and, optionally, a protecting layer provided on said recording layer, wherein said recording layer contains a phthalocyanine compound having the following general formula (I)

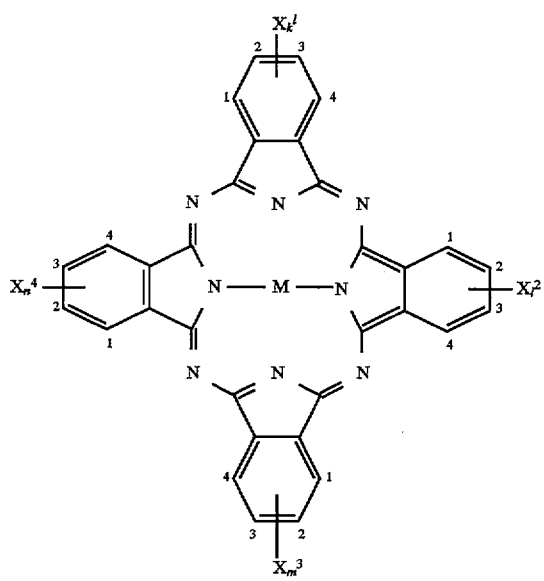

wherein M, $X^1$-$X^4$ and k-n represent as follows:

M: two hydrogen atoms, a metal atom which may contain halogen or oxygen atoms, or a metal atom which may contain —$(OR^5)_p$ or —$(OSiR^6R^7R^8)_q$, $R^5$-$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $X^1$-$X^4$: independently from each other, a —$OR^1SiR^2R^3R^4$ group, $R^1$: independently from each other, a substituted or non-substituted divalent aliphatic hydrocarbon group, a substituted or non-substituted divalent aliphatic hydrocarbon group having an ether linkage, a substituted or non-substituted divalent aromatic hydrocarbon group, or a substituted or non-substituted divalent aromatic heterocyclic group, $R^2$-$R^4$: independently from each other, a hydrogen atom, a substituted or non-substituted monovalent aliphatic hydrocarbon group, a substituted or non-substituted monovalent aromatic hydrocarbon group, a substituted or non-substituted monovalent aromatic heterocyclic group, or a —$OR^9$ group, $R^9$: a hydrogen atom, a substituted or non-substituted monovalent aliphatic hydrocarbon group, a substituted or non-substituted monovalent aromatic heterocyclic group, or a silyl group, and k, l, m, n: independently from each other, an integer of 0–4 with the proviso that not all of k, l, m and n are simultaneously zero and that when k, l, m and n are each 3 or less the other substituent or substituents on respective benzene rings are hydrogen atoms or halogen atoms.

2. An optical information recording medium wherein the phthalocyanine compound is one or a mixture of two or more of the four compounds having the following general formulas (II-a)–(II-d):

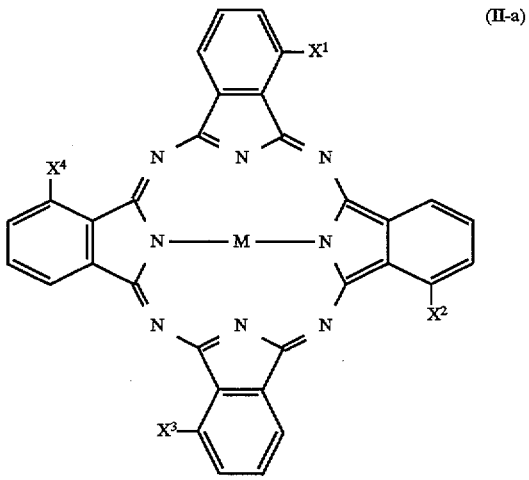

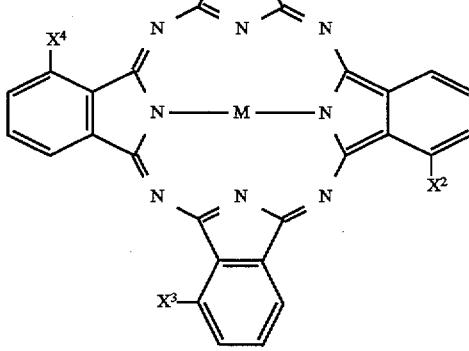

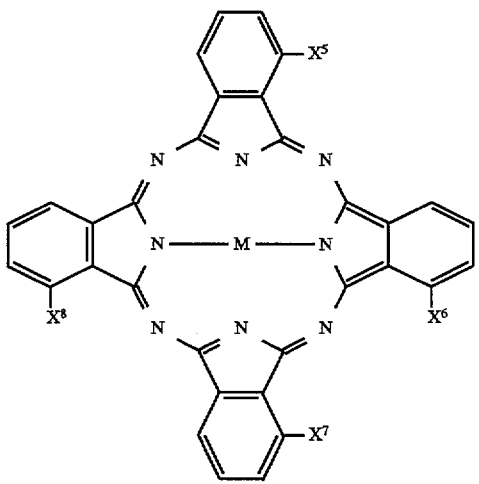

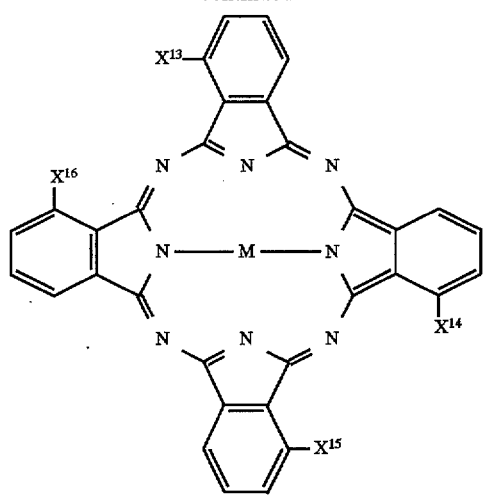

(II-d)

wherein M and $X^1$–$X^{16}$ represent as follows:

M: two hydrogen atoms, a metal atom which may contain halogen or oxygen atoms, or a metal atom which may contain $—(OR^5)_p$ or $—(OSiR^6R^7R^8)_q$, $R^5$–$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $X^1$–$X^{16}$: independently from each other, a $—OR^1SiR^2R^3R^4$ group, $R^1$: independently from each other, a substituted or non-substituted divalent aliphatic hydrocarbon group, a substituted or non-substituted divalent aliphatic hydrocarbon group having an ether linkage, a substituted or non-substituted divalent aromatic hydrocarbon group, or a substituted or non-substituted divalent aromatic heterocyclic group, $R^2$–$R^4$: independently from each other, a hydrogen atom, a substituted or non-substituted monovalent aliphatic hydrocarbon group, a substituted or non-substituted monovalent aromatic hydrocarbon group, a substituted or non-substituted monovalent aromatic heterocyclic group, or a $—OR^9$ group, $R^9$: a hydrogen atom, a substituted or non-substituted monovalent aliphatic hydrocarbon group, a substituted or non-substituted monovalent aromatic heterocyclic group, or a silyl group, and atoms, other than $X^1$–$X^{16}$, bonded to the benzene ring: hydrogen atoms or halogen atoms.

3. An optical information recording medium wherein the phthalocyanine compound is one or a mixture of two or more of the four compounds having the following general formulas (III-a)–(III-d):

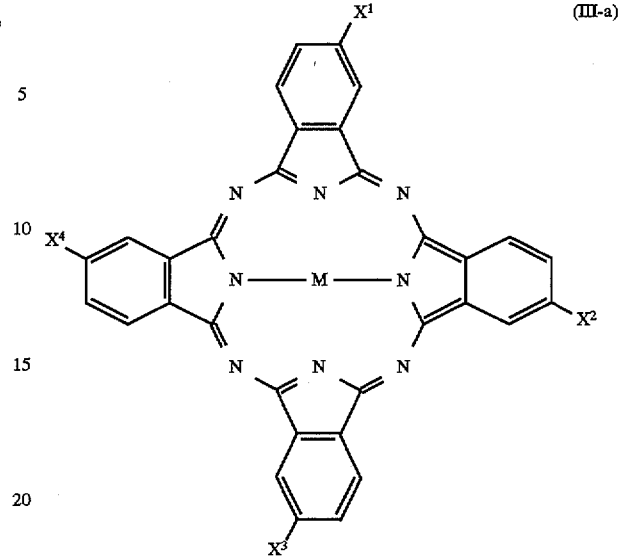

(III-a)

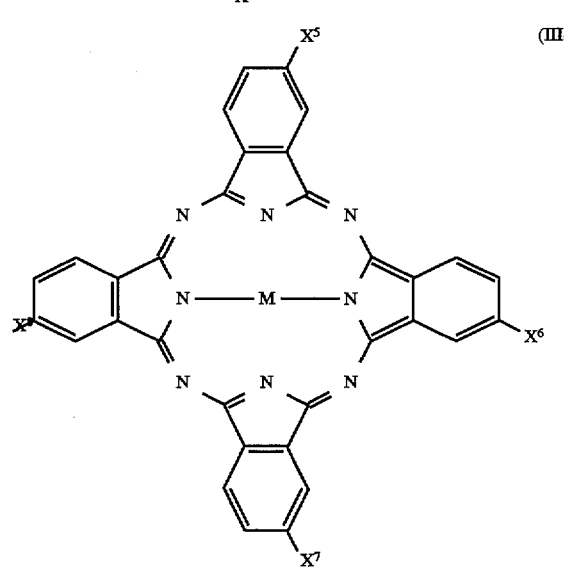

(III-b)

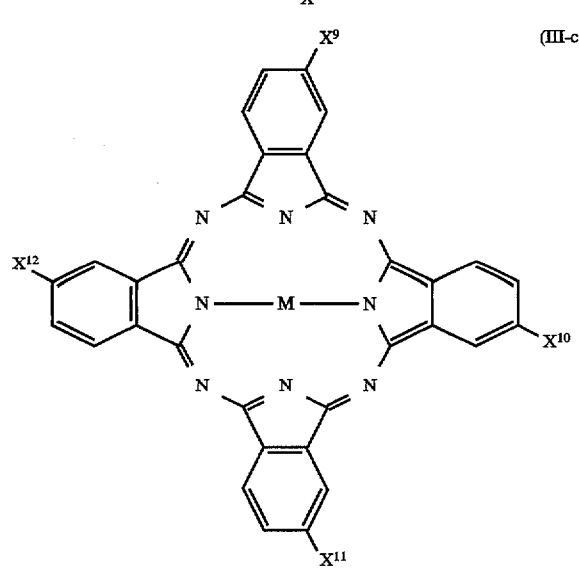

(III-c)

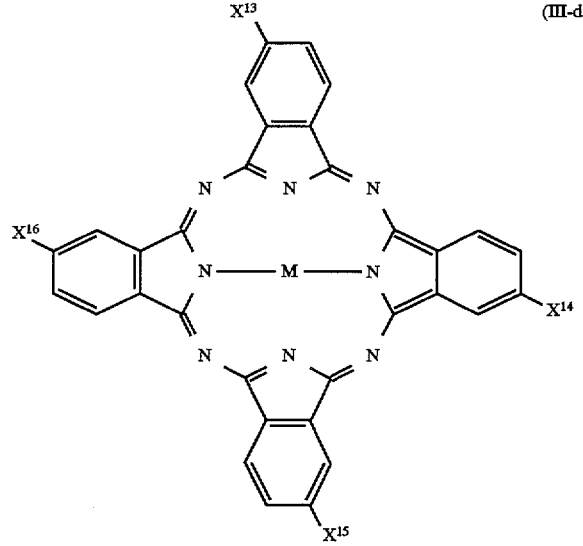

(III-d)

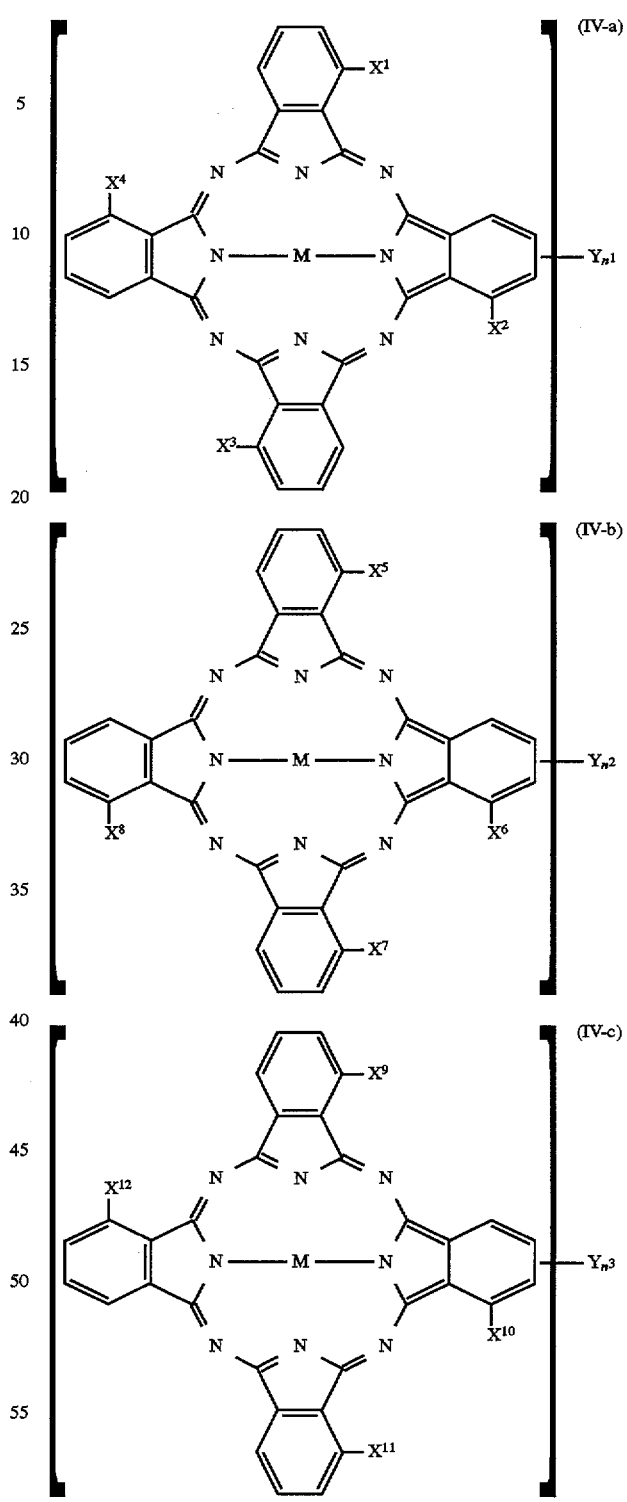

(IV-a)

(IV-b)

(IV-c)

wherein M and $X^1$–$X^{16}$ represent as follows:

M: two hydrogen atoms, a metal atom which may contain halogen or oxygen atoms, or a metal atom which may contain —$(OR^5)_p$ or —$(OSiR^6R^7R^8)_q$, $R^5$–$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $X^1$–$X^{16}$: independently from each other, a —$OR^1SiR^2R^3R^4$ group, $R^1$: independently from each other, a substituted or non-substituted divalent aliphatic hydrocarbon group, a substituted or non-substituted divalent aliphatic hydrocarbon group having an ether linkage, a substituted or non-substituted divalent aromatic hydrocarbon group, or a substituted or non-substituted divalent aromatic heterocyclic group, $R^2$–$R^4$: independently from each other, a hydrogen atom, a substituted or non-substituted monovalent aliphatic hydrocarbon group, a substituted or non-substituted monovalent aromatic hydrocarbon group, a substituted or non-substituted monovalent aromatic heterocyclic group, or a —$OR^9$ group, $R^9$: a hydrogen atom, a substituted or non-substituted monovalent aliphatic hydrocarbon group, a substituted or non-substituted monovalent aromatic heterocyclic group, or a silyl group, and atoms, other than $X^1$–$X^{16}$, bonded to the benzene ring: hydrogen atoms or halogen atoms.

4. An optical information recording medium wherein the phthalocyanine compound is one or a mixture of two or more of the four compounds having the following general formulas (IV-a)–(IV-d):

-continued

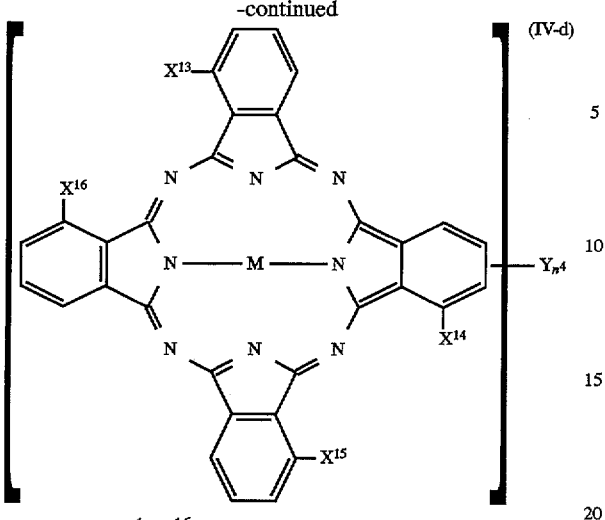

(IV-d)

wherein M, $X^1$–$X^{16}$, Y and n1–n4 represent as follows:

M: two hydrogen atoms, a metal atom which may contain halogen or oxygen atoms, or a metal atom which may contain —(OR$^5$)$_p$ or —(OSiR$^6$R$^7$R$^8$)$_q$, R$^5$–R$^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $X^1$–$X^{16}$: independently from each other, a —OR$^1$SiR$^2$R$^3$R$^4$ group, R$^1$: independently from each other, a substituted or non-substituted divalent aliphatic hydrocarbon group, a substituted or non-substituted divalent aliphatic hydrocarbon group having an ether linkage, a substituted or non-substituted divalent aromatic hydrocarbon group, or a substituted or non-substituted divalent aromatic heterocyclic group, R$^2$–R$^4$: independently from each other, a hydrogen atom, a substituted or non-substituted monovalent aliphatic hydrocarbon group, a substituted or non-substituted monovalent aromatic hydrocarbon group, a substituted or non-substituted monovalent aromatic heterocyclic group, or a —OR$^9$ group, R$^9$: a hydrogen atom, a substituted or non-substituted monovalent aliphatic hydrocarbon group, a substituted or non-substituted monovalent aromatic heterocyclic group, or a silyl group, atoms, other than $X^1$–$X^{16}$, bonded to the benzene ring: hydrogen atoms or halogen atoms, Y: a halogen atom, and n1–n4: independently from each other, an integer of 1–4 showing the number of the halogen substituents.

5. An optical information recording medium as recited in claim 1, characterized in that a reflecting metal layer is provided between said recording layer and said protecting layer so that said recording medium is of a WORM type compact disc for recording signals of a CD format.

6. A phthalocyanine-type near infrared absorbing material comprising one or a mixture of two or more of the four compounds having the following general formulas (II'-a)–(II'-d):

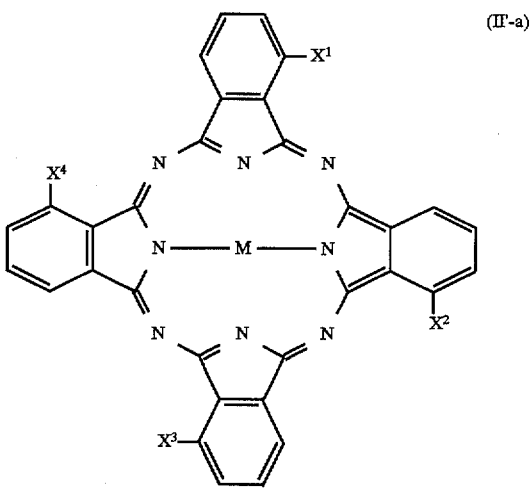

(II'-a)

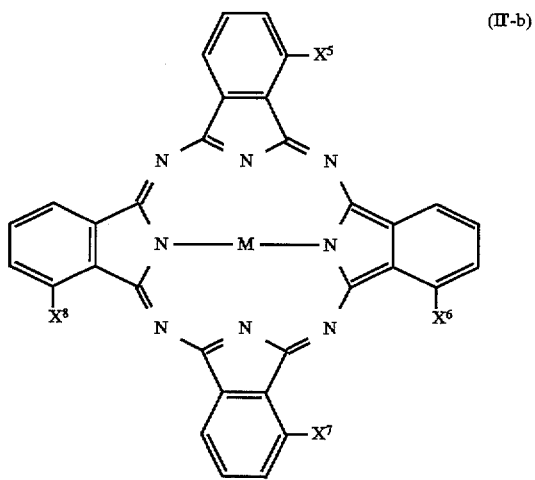

(II'-b)

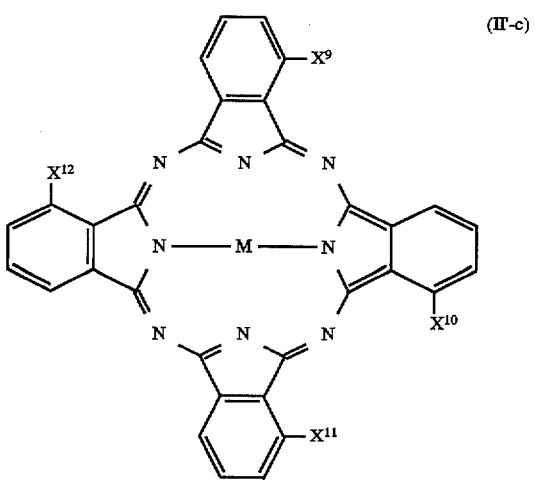

(II'-c)

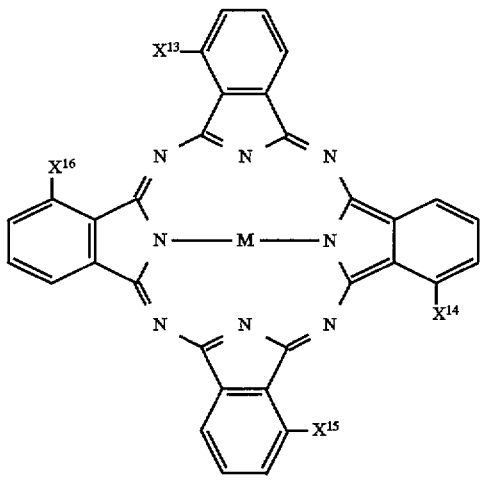

wherein M and $X^1$–$X^{16}$ represent as follows:

M: two hydrogen atoms, a metal atom which may contain halogen or oxygen atoms, or a metal atom which may contain —$(OR^5)_p$ or —$(OSiR^6R^7R^8)_q$, $X^1$–$X^{16}$: independently from each other, a —$OR^{11}SiR^{12}R^{13}R^{14}$ group, $R^5$–$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $R^{11}$: a straight chain or branched alkylene group which has 1–8 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —$OSi(R^{15})_3$ group or a —$CH_2Si(R^{15})_3$ group, $R^{15}$: an alkyl group having 1–3 carbon atoms, and atoms, other than $X^1$–$X^{16}$, bonded to the benzene ring: hydrogen atoms or halogen atoms.

7. A phthalocyanine-type near infrared absorbing material comprising one or a mixture of two or more of the four compounds having the following general formulas (III'-a)–(III'-d):

-continued (III'-d)
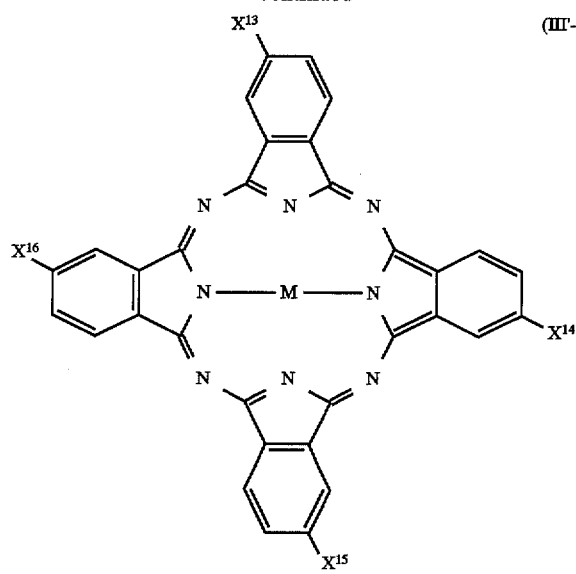

wherein M and $X^1$–$X^{16}$ represent as follows:

M: two hydrogen atoms, a metal atom which may contain halogen or oxygen atoms, or a metal atom which may contain —$(OR^5)_p$ or —$(OSiR^6R^7R^8)_q$, $X^1$–$X^{16}$: independently from each other, a —$OR^{11}SiR^{12}R^{13}R^{14}$ group, $R^5$–$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $R^{11}$: a straight chain or branched alkylene group which has 1–8 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —$OSi(R^{15})_3$ group or a —$CH_2Si(R^{15})_3$ group, $R^{15}$: an alkyl group having 1–3 carbon atoms, and atoms, other than $X^1$–$X^{16}$, bonded to the benzene ring: hydrogen atoms or halogen atoms.

8. A phthalocyanine-type near infrared absorbing material comprising one or a mixture of two or more of the four compounds having the following general formulas (IV'-a)–(IV'-d):

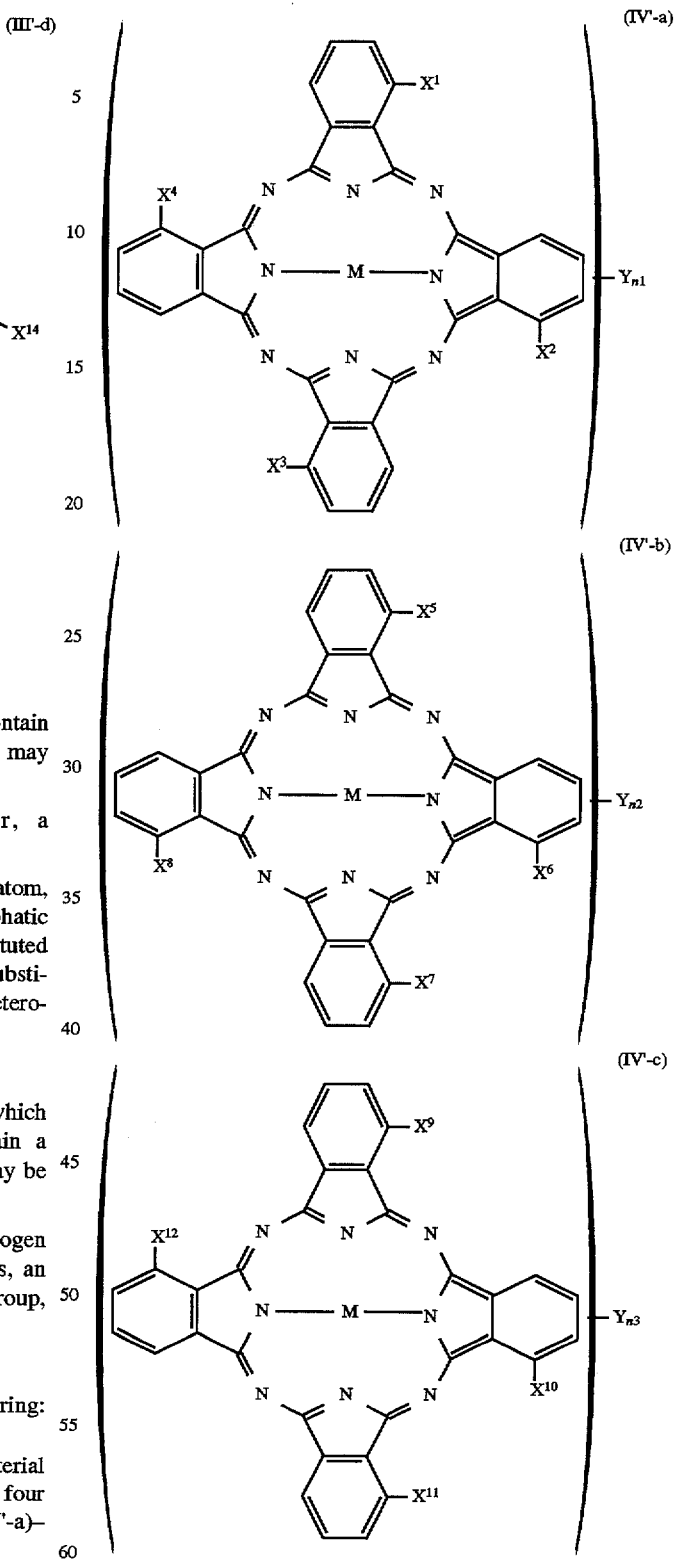

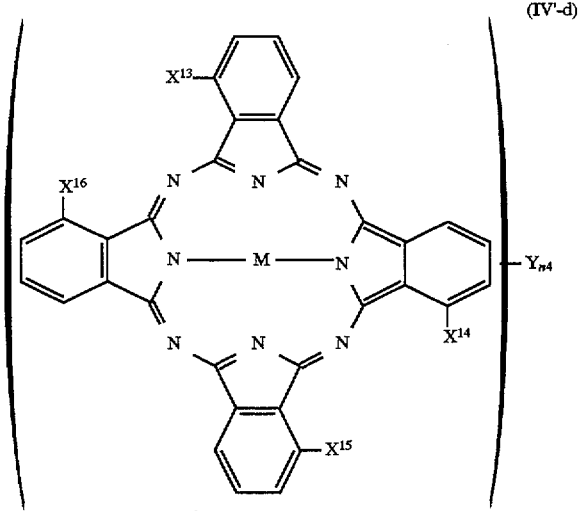

(IV'-d)

wherein M, $X^1$–$X^{16}$, Y and n1–n4 represent as follows:

M: two hydrogen atoms, a metal atom which may contain halogen or oxygen atoms, or a metal atom which may contain —$(OR^5)_p$ or —$(OSiR^6R^7R^8)_q$, $X^1$–$X^{16}$: independently from each other, a —$OR^{11}SiR^{12}R^{13}R^{14}$ group, $R^5$–$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $R^{11}$: a straight chain or branched alkylene group which has 1–8 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —$OSi(R^{15})_3$ group or a —$CH_2Si(R^{15})_3$ group, $R^{15}$: an alkyl group having 1–3 carbon atoms, atoms, other than $X^1$–$X^{16}$, bonded to the benzene ring: hydrogen atoms or halogen atoms, Y: a halogen atom, and n1–n4: independently from each other, an integer of 1–4 showing the number of the halogen substitution.

9. A phthalocyanine-type near infrared absorbing material having the following general formula (V):

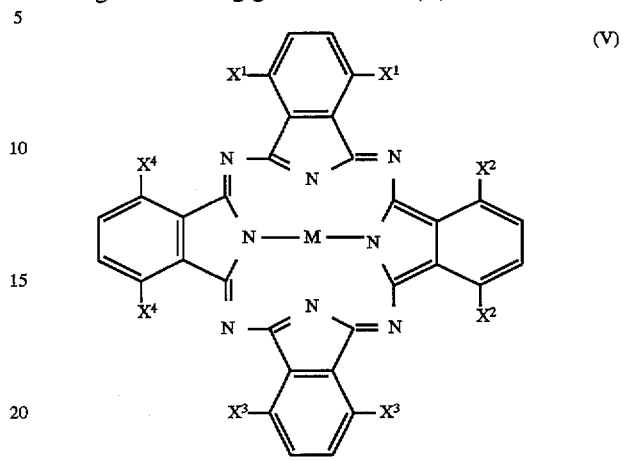

(V)

wherein M and $X^1$–$X^4$ represent as follows:

M: two hydrogen atoms, a metal atom which may contain halogen or oxygen atoms, or a metal atom which may contain —$(OR^5)_p$ or —$(OSiR^6R^7R^8)_q$, and $X^1$–$X^4$: independently from each other, a —$OR^{11}SiR^{12}R^{13}R^{14}$ group, $R^5$–$R^8$: independently from each other, a hydrogen atom, a substituted or non-substituted monovalent aliphatic hydrocarbon group, a substituted or non-substituted monovalent aromatic hydrocarbon group, or a substituted or non-substituted monovalent aromatic heterocyclic group, p, q: an integer of 0–2, $R^{11}$: a straight chain or branched alkylene group which has 1–5 carbon atoms and which may contain a so-called ether linkage of —C—O—C— and may be substituted with a silyl group, $R^{12}$–$R^{14}$: independently from each other, a hydrogen atom, an alkyl group having 1–12 carbon atoms, an alkoxy group having 1–3 carbon atoms, a vinyl group, a —$OSi(R^{15})_3$ group or a —$CH_2Si(R^{15})_3$ group, $R^{15}$: an alkyl group having 1–3 carbon atoms.

* * * * *